US011258279B1

(12) United States Patent
Kahn et al.

(10) Patent No.: US 11,258,279 B1
(45) Date of Patent: Feb. 22, 2022

(54) SAFE BATTERY ENERGY MANAGEMENT SYSTEMS, BATTERY MANAGEMENT SYSTEM NODES, AND METHODS

(71) Applicant: Element Energy, Inc., San Francisco, CA (US)

(72) Inventors: Seth Marshall Kahn, San Francisco, CA (US); Anthony John Stratakos, San Anselmo, CA (US); Corrado Cammi, Mountain View, CA (US); Anderson Rennie John, Santa Clara, CA (US)

(73) Assignee: Element Energy, Inc., Menlo Park, CA (US)

( * ) Notice: Subject to any disclaimer, the term of this patent is extended or adjusted under 35 U.S.C. 154(b) by 0 days.

(21) Appl. No.: 17/212,787

(22) Filed: Mar. 25, 2021

Related U.S. Application Data

(62) Division of application No. 17/066,238, filed on Oct. 8, 2020, now Pat. No. 10,992,149.

(51) Int. Cl.
*H02J 7/00* (2006.01)
*H01M 10/42* (2006.01)

(52) U.S. Cl.
CPC ....... *H02J 7/0036* (2013.01); *H01M 10/4235* (2013.01); *H01M 10/4257* (2013.01); *H02J 7/0063* (2013.01); *H01M 2010/4271* (2013.01)

(58) Field of Classification Search
CPC .. H02J 7/0036; H02J 7/0063; H01M 10/4257; H01M 10/4235; H01M 2010/4271
(Continued)

(56) References Cited

U.S. PATENT DOCUMENTS 6,160,441 A 12/2000 Stratakos et al.
6,262,558 B1 7/2001 Weinberg
(Continued)

FOREIGN PATENT DOCUMENTS

CA 2667825 A1 * 5/2008 .............. H02G 3/00
EP 0762591 A2 * 3/1997 ........... H02H 1/0015
(Continued)

OTHER PUBLICATIONS

Martinez et al., (Martinez), Arc Fault Management by SOlid State Switches for Enhanced Automotive Safety, Jan. 2005, IEEE, pp. 1029-1034 (Year: 2005).*
(Continued)

*Primary Examiner* — M Baye Diao
(74) *Attorney, Agent, or Firm* — PdZ Patent Law, PLLC

(57) ABSTRACT

A system and method for hierarchical arc fault monitoring in an energy storage system, where the energy storage system includes a plurality of stacks that are electrically coupled together. Each stack includes a plurality of battery management system nodes that are electrically coupled together. The method includes (1) obtaining respective electrical measurement values for each stack; (2) determining, for each stack, that the stack is free of arc faults, using the respective electrical measurement values for the stack; (3) obtaining electrical measurement values for the energy storage system; and (4) determining that the energy storage system is free of arc faults outside of the plurality of stacks, using (a) the electrical measurement values for the energy storage system and (b) a subset of the respective electrical measurement values for each stack.

14 Claims, 30 Drawing Sheets

(58) Field of Classification Search
USPC .......................................................... 320/135
See application file for complete search history.

(56) References Cited

U.S. PATENT DOCUMENTS

| | | | |
|---|---|---|---|
| 6,445,244 B1 | 9/2002 | Stratakos et al. | |
| 6,777,953 B2 * | 8/2004 | Blades | G01R 1/07 324/530 |
| 6,835,491 B2 | 12/2004 | Gartstein et al. | |
| 6,876,203 B2 * | 4/2005 | Blades | G01R 1/07 324/536 |
| 6,984,970 B2 | 1/2006 | Capel | |
| 7,068,017 B2 | 6/2006 | Willner et al. | |
| 7,391,218 B2 * | 6/2008 | Kojori | H02H 1/0015 324/520 |
| 8,158,877 B2 | 4/2012 | Klein et al. | |
| 8,395,519 B2 | 3/2013 | Cassidy | |
| 8,503,137 B2 * | 8/2013 | Panetta | H02H 1/0015 361/10 |
| 8,686,693 B2 | 4/2014 | Bhowmik et al. | |
| 8,817,431 B2 * | 8/2014 | Tomimbang | H02H 1/0015 361/42 |
| 8,837,097 B2 * | 9/2014 | Zuercher | H02H 7/10 361/42 |
| 8,879,218 B2 * | 11/2014 | Tomimbang | H02H 1/0015 361/42 |
| 9,132,734 B2 * | 9/2015 | Auguet | B60L 3/12 |
| 9,172,120 B2 * | 10/2015 | Pariseau | H01M 10/48 |
| 9,257,729 B2 * | 2/2016 | Hermann | B60L 58/13 |
| 9,331,497 B2 | 5/2016 | Beaston | |
| 9,425,631 B2 | 8/2016 | Furtner | |
| 9,515,496 B1 * | 12/2016 | Ying | H02J 7/0031 |
| 9,564,762 B2 * | 2/2017 | Lee | H02J 7/0016 |
| 9,705,341 B2 | 7/2017 | Komatsu et al. | |
| 9,806,545 B2 | 10/2017 | Fink | |
| 9,865,901 B2 | 1/2018 | Hwang | |
| 9,893,385 B1 * | 2/2018 | Nayar | H01M 10/486 |
| 9,965,007 B2 * | 5/2018 | Amelio | H05B 47/165 |
| 10,018,682 B2 | 7/2018 | Kaupp et al. | |
| 10,153,651 B2 | 12/2018 | Taylor et al. | |
| 10,270,262 B2 | 4/2019 | Kim et al. | |
| 10,553,851 B2 | 2/2020 | Kim | |
| 10,714,974 B2 | 7/2020 | Clifton et al. | |
| 10,804,690 B2 | 10/2020 | Ronne et al. | |
| 10,928,461 B1 * | 2/2021 | Stafl | B60L 3/0046 |
| 10,992,149 B1 * | 4/2021 | Kahn | H01M 10/4235 |
| 2005/0121067 A1 | 6/2005 | Toyomura et al. | |
| 2005/0139258 A1 | 6/2005 | Liu et al. | |
| 2005/0151513 A1 | 7/2005 | Cook et al. | |
| 2007/0223165 A1 * | 9/2007 | Itri | H04M 3/18 361/115 |
| 2008/0236648 A1 | 10/2008 | Klein et al. | |
| 2008/0303503 A1 | 12/2008 | Wolfs | |
| 2009/0284078 A1 | 11/2009 | Zhang et al. | |
| 2009/0284232 A1 | 11/2009 | Zhang et al. | |
| 2009/0284240 A1 | 11/2009 | Zhang et al. | |
| 2009/0284998 A1 | 11/2009 | Zhang et al. | |
| 2010/0207455 A1 | 8/2010 | Erickson, Jr. et al. | |
| 2010/0253150 A1 | 10/2010 | Porter et al. | |
| 2010/0288327 A1 | 11/2010 | Lisi et al. | |
| 2010/0327659 A1 | 12/2010 | Lisi et al. | |
| 2011/0062784 A1 | 3/2011 | Wolfs | |
| 2011/0090607 A1 * | 4/2011 | Luebke | H01L 31/02021 361/42 |
| 2011/0141644 A1 | 6/2011 | Hastings et al. | |
| 2011/0301772 A1 | 12/2011 | Zuercher et al. | |
| 2012/0013201 A1 | 1/2012 | Pariseau et al. | |
| 2012/0043818 A1 | 2/2012 | Stratakos et al. | |
| 2012/0043823 A1 | 2/2012 | Stratakos et al. | |
| 2012/0043923 A1 | 2/2012 | Ikriannikov et al. | |
| 2012/0044014 A1 | 2/2012 | Stratakos et al. | |
| 2012/0089266 A1 * | 4/2012 | Tomimbang | H02H 1/0015 700/293 |
| 2012/0112760 A1 | 5/2012 | Yoscovich et al. | |
| 2012/0119746 A1 | 5/2012 | Macris | |
| 2012/0133521 A1 | 5/2012 | Rothkppf et al. | |
| 2012/0313560 A1 | 12/2012 | Hambitzer et al. | |
| 2013/0092208 A1 | 4/2013 | Robbins | |
| 2013/0106194 A1 | 5/2013 | Jergovic et al. | |
| 2013/0170084 A1 | 7/2013 | Strobl et al. | |
| 2013/0176401 A1 | 7/2013 | Monari et al. | |
| 2014/0253045 A1 | 9/2014 | Poznar | |
| 2014/0368205 A1 | 12/2014 | Svensson et al. | |
| 2014/0373894 A1 | 12/2014 | Stratakos et al. | |
| 2016/0261127 A1 * | 9/2016 | Worry | H01M 10/425 |
| 2016/0372940 A1 | 12/2016 | Canadi | |
| 2017/0123008 A1 | 5/2017 | Frias et al. | |
| 2018/0147947 A1 | 5/2018 | Gebhart | |
| 2018/0252195 A1 | 9/2018 | Ciaccio et al. | |
| 2019/0198938 A1 | 6/2019 | Fujita et al. | |
| 2019/0212383 A1 * | 7/2019 | Elliott | H05K 1/181 |
| 2019/0361075 A1 | 11/2019 | Lee et al. | |
| 2020/0021107 A1 * | 1/2020 | Collins | H02H 3/385 |
| 2020/0127489 A1 | 4/2020 | Chen et al. | |
| 2020/0207219 A1 | 7/2020 | Slepchenkov et al. | |
| 2020/0212959 A1 * | 7/2020 | Eriksen | H01R 13/7135 |
| 2020/0254882 A1 | 8/2020 | Kwon et al. | |
| 2020/0350779 A1 | 11/2020 | Tikhonski et al. | |
| 2021/0096398 A1 * | 4/2021 | Hekmat | G02C 7/04 |
| 2021/0119455 A1 * | 4/2021 | Jaipaul | H02J 7/005 |

FOREIGN PATENT DOCUMENTS

| | | | |
|---|---|---|---|
| EP | 3550581 A1 * | 10/2019 | ............ H01H 33/04 |
| EP | 3599653 A1 * | 1/2020 | ............ H01M 10/48 |
| WO | 2015200366 A1 | 12/2015 | |

OTHER PUBLICATIONS

Walker, Geoffrey R., et al., "Cascaded DC-DC Converter Connection of Photovoltaic Modules", IEEE Transactions on Power Electronics, vol. 19, No. 4, (Jul. 2004), 1130-1139.

Wolfs, Peter, et al., "Distributed Maximum Power Tracking for High Performance Vehicle Solar Arrays", Australian Universities Power Engineering Conference (AUPEC 2004), (Sep. 2004), 6 pgs.

* cited by examiner $V_{Stack} = V1 + V_2 + V_3 \ldots + V_N + V_{Arc}$

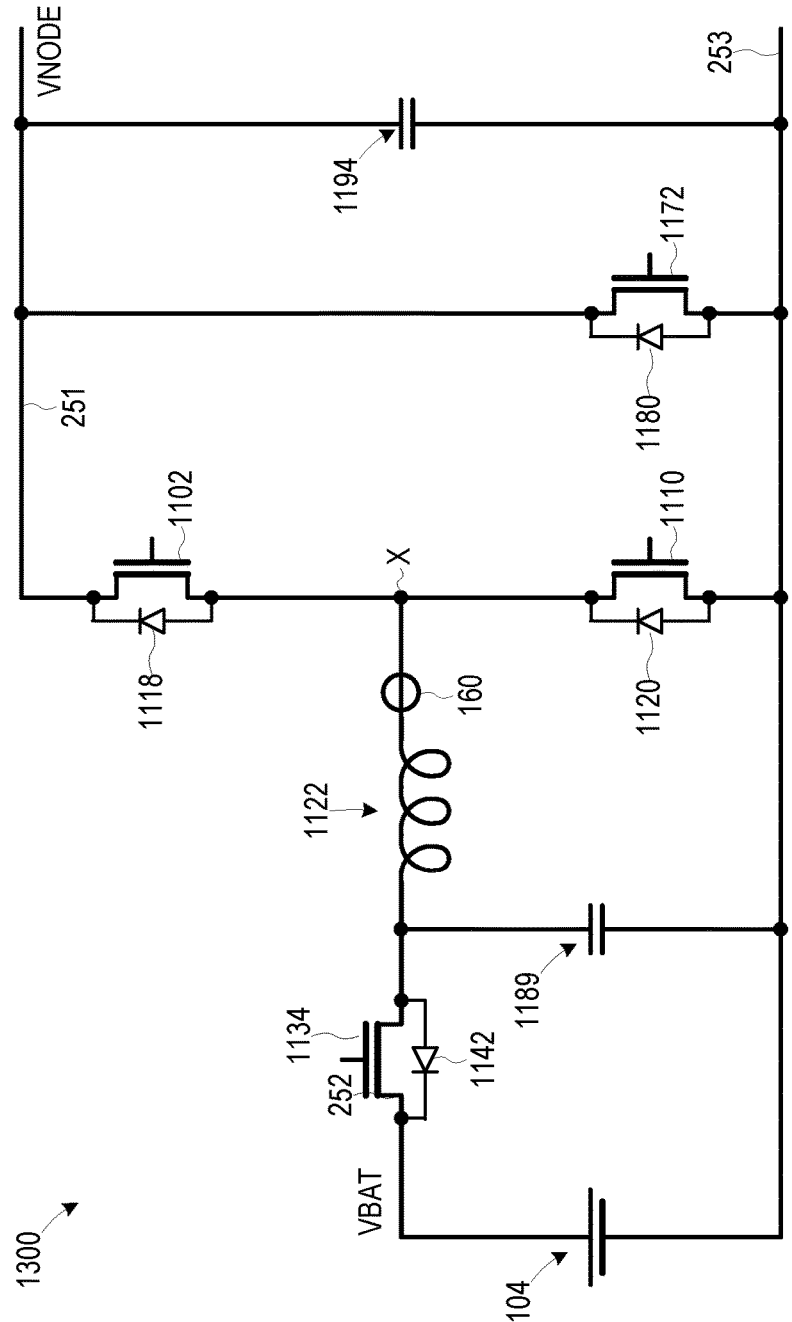
FIG. 13A
FIG. 13B
FIG. 13C

SAFE BATTERY ENERGY MANAGEMENT SYSTEMS, BATTERY MANAGEMENT SYSTEM NODES, AND METHODS

RELATED APPLICATIONS

This application is a divisional of U.S. patent application Ser. No. 17/066,238, filed on Oct. 8, 2020, which is incorporated herein by reference.

BACKGROUND

Battery packs, or arrangements of multiple battery devices coupled together, are used as power sources in a wide range of devices. A battery management system can be used to keep individual single battery devices of a battery pack within their safe operating ranges by monitoring physical quantities such as charge, current, voltage and temperature. Based on these quantities, not only can a battery device be operated safely, but also state of charge and state of health can be determined. A battery management system also performs battery cell balancing. In a battery stack, single battery cells can be arranged in parallel and in series in order to achieve a required capacity and operating voltage. Battery manufacturers attempt to provide stacks with identical battery cells, but this generally is not physically possible. Battery cells, even if accurately manufactured and selected, usually show at least slight differences from each other. Any mismatch in capacity between the battery cells within a pack can result in a reduction of the overall pack capacity. Even small differences lead to different charge or discharge levels, with the weakest battery cell in a stack disproportionately affecting overall stack performance. Energy management systems also are used for battery cell balancing, which involves techniques to equalize the voltage and state of charge among the battery cells when they are at full charge.

SUMMARY

In a first aspect, a method for hierarchical arc fault monitoring in an energy storage system including a plurality of stacks electrically coupled together, where each stack includes a plurality of battery management system nodes that are electrically coupled together, includes the following steps: (1) obtaining respective electrical measurement values for each stack; (2) determining, for each stack, that the stack is free of arc faults, using the respective electrical measurement values for the stack; (3) obtaining electrical measurement values for the energy storage system; and (4) determining that the energy storage system is free of arc faults outside of the plurality of stacks, using (a) the electrical measurement values for the energy storage system and (b) a subset of the respective electrical measurement values for each stack.

In an embodiment of the first aspect, the method further includes obtaining the respective electrical measurement values for each stack and the electrical measurement values for the energy storage system at a common time.

In another embodiment of the first aspect, obtaining the respective electrical measurement values for each stack includes, for a first stack of the plurality of stacks: (1) sending a measurement command to each battery management system node of the first stack; and (2) simultaneously obtaining one or more respective electrical measurement values for each battery management system node of the first stack at a common time prescribed by the measurement command.

In another embodiment of the first aspect, the method further includes propagating electrical measurement values for a first node of the plurality of battery management system nodes through at least one other node of the plurality of battery management system nodes.

In another embodiment of the first aspect, obtaining the respective electrical measurement values for each stack includes, for a first stack of the plurality of stacks: (1) sending a measurement command to each battery management system node of the first stack; and (2) at each battery management system node of the first stack, obtaining, from storage of the battery management system node, one or more respective saved electrical measurement values corresponding to a time prescribed by the measurement command.

In another embodiment of the first aspect, the method further includes determining, for each stack, that the stack is free of series arc faults in response to a sum of voltages across each battery management system node of the stack being consistent with a measured voltage across the stack.

In another embodiment of the first aspect, the method further includes (1) determining that a series arc fault has occurred in a first stack of the plurality of stacks in response to a mismatch between a sum of voltages across each battery management system node of the first stack and a measured voltage across the first stack; and (2) in response to determining that the series arc fault has occurred in the first stack, transitioning the first stack from an operational mode to a floating mode by isolating a respective battery in each battery management system node of the first stack.

In another embodiment of the first aspect, the method further includes determining that the energy storage system is free of series arc faults outside the plurality of stacks in response to a measured voltage across a load electrically coupled to the energy storage system being consistent with respective measured voltages across each stack.

In another embodiment of the first aspect, the load is capable of both receiving electrical power from the energy storage system and providing electrical power to the energy storage system.

In another embodiment of the first aspect, the method further includes determining that an arc fault has occurred in series with a first stack of the plurality of stacks in response to a mismatch between the measured voltage across the load and a measured voltage across the first stack.

In another embodiment of the first aspect, the method further includes transitioning the first stack from an operational mode to a floating mode by isolating the first stack from remaining stacks of the plurality of stacks, in response to determining that the arc fault has occurred in series with the first stack.

In another embodiment of the first aspect, the method further includes transitioning the first stack from an operational mode to a safe mode by reducing one or more of a voltage and a current of the first stack, in response to determining that the arc fault has occurred in series with the first stack.

In another embodiment of the first aspect, the method further includes determining, for each stack, that the stack is free of parallel arc faults in response to respective measured currents flowing through each battery management system node of the stack being consistent with a measured current flowing through the stack.

In another embodiment of the first aspect, the method further includes determining, for a first stack of the plurality of stacks, that a parallel electrical arc has occurred between two battery management system nodes of the first stack, in response to a mismatch between respective currents flowing through the two battery management system nodes of the first stack.

In another embodiment of the first aspect, the method further includes, in response to determining that the parallel arc fault has occurred between the two battery management system nodes of the first stack, transitioning the first stack from an operational mode to a floating mode by isolating a respective battery in each battery management system node of the first stack.

In another embodiment of the first aspect, the method further includes determining that the energy storage system is free of parallel arc faults outside the plurality of stacks in response to a measured current through a load electrically coupled to the energy storage system being consistent with respective measured currents flowing through each stack.

In another embodiment of the first aspect, the method further includes transitioning each stack from an operational mode to a safe mode by reducing one or more of a respective voltage and a respective current of each stack, in response to determining that a parallel arc fault has occurred in the battery management system outside of the plurality of stacks.

In another embodiment of the first aspect, the method further includes (1) removing power conversion switching noise and associated harmonics from the respective electrical measurement values for each stack, before determining, for each stack, that the stack is free of arc faults; and (2) removing power conversion switching noise and associated harmonics from the electrical measurement values for the energy storage system, before determining that the energy storage system is free of arc faults outside of the plurality of stacks.

In another embodiment of the first aspect, (1) removing power conversion switching noise and associated harmonics from the respective electrical measurement values for each stack is performed using a first low-pass filter; (2) removing power conversion switching noise and associated harmonics from the electrical measurement values for the energy storage system is performed using a second low-pass filter; and (3) the first and second low-pass filters have substantially the same bandwidth.

In a second aspect, an energy storage system includes (1) a plurality of stacks electrically coupled together, each stack including a plurality of battery management system nodes that are electrically coupled together; and (2) a control subsystem configured to (1) obtain respective electrical measurement values for each stack, (2) determine, for each stack, that the stack is free of arc faults, using the respective electrical measurement values for the stack, (3) obtain electrical measurement values for the energy storage system, and (4) determine that the energy storage system is free of arc faults outside of the plurality of stacks, using (i) the electrical measurement values for the energy storage system and (ii) a subset of the respective electrical measurement values for each stack.

In an embodiment of the second aspect, the control subsystem is further configured to determine, for each stack, that the stack is free of series arc faults in response to a sum of voltages across each battery management system node of the stack being consistent with a measured voltage across the stack.

In another embodiment of the second aspect, the control subsystem is further configured to determine that energy storage system is free of series arc faults outside the plurality of stacks in response to a measured voltage across a load electrically coupled to the energy storage system being consistent with respective measured voltages across each stack.

In another embodiment of the second aspect, the control subsystem is further configured to determine, for each stack, that the stack is free of parallel arc faults in response to respective measured currents flowing through each battery management system node of the stack being consistent with a measured current flowing through the stack.

In another embodiment of the second aspect, the control subsystem is further configured to determine that energy storage system is free of parallel arc faults outside the plurality of stacks in response to a measured current through a load electrically coupled to the energy storage system being consistent with respective measured currents flowing through each stack.

In a third aspect, a method for managing an energy storage system, including a stack of a plurality of battery management system nodes that are electrically coupled together, includes the following steps: (1) sending a measurement command to each battery management system node; (2) at each battery management system node, in response to the measurement command, obtaining one or more respective electrical measurement values for the battery management system node, each of the one or more respective electrical measurement values for the battery management system node corresponding to a time prescribed by the measurement command; and (3) using the one or more respective electrical measurement values for each battery management system node, managing at least one aspect of the energy storage system.

In an embodiment of the third aspect, the method further includes simultaneously obtaining the one or more respective electrical measurement values for each battery management system node.

In another embodiment of the third aspect, the method further includes propagating electrical measurement values for a first node of the plurality of battery management system nodes through at least one other node of the plurality of battery management system nodes.

In another embodiment of the third aspect, the method further includes obtaining the one or more respective electrical measurement values for each battery management system node from respective storage of the battery management system node.

In another embodiment of the third aspect, managing at least one aspect of the energy storage system comprises determining that the stack is free of arc faults, using the one or more respective electrical measurement values for each battery management system node.

In another embodiment of the third aspect, the method further includes determining that the stack is free of series arc faults in response to a sum of voltages across each battery management system node being consistent with a measured voltage across the stack.

In another embodiment of the third aspect, the method further includes determining that the stack is free of parallel arc faults in response to respective measured currents flowing through each battery management system node being consistent with a measured current flowing through the stack.

In another embodiment of the third aspect, managing at least one aspect of the energy storage system includes controlling at least one of charging and discharging of respective batteries of the plurality of battery management system nodes.

In a fourth aspect, an energy storage system includes (1) a stack including a plurality of battery management system nodes that are electrically coupled together, each battery management system node being configured to, in response to a measurement command, obtain one or more respective electrical measurement values for the battery management system node, each of the one or more respective electrical measurement values for the battery management system node corresponding to a time prescribed by the measurement command; and (2) a control subsystem configured to: (a) send the measurement command to each battery management system node, and (b) manage at least one aspect of the energy storage system, using the one or more respective electrical measurement values for each battery management system node.

In an embodiment of the fourth aspect, the control subsystem is further configured to manage at least one aspect of the energy storage system by determining that the stack is free of arc faults, using the one or more respective electrical measurement values for each battery management system node.

In another embodiment of the fourth aspect, the control subsystem is further configured to manage at least one aspect of the energy storage system by controlling at least one of charging and discharging of respective batteries of the plurality of battery management system nodes.

In a fifth aspect, a method for addressing an arc fault in an energy storage system, including a stack of a plurality of battery management system nodes that are electrically coupled together, includes the following steps: (1) determining that an arc fault has occurred in the stack; and (2) in response to determining that the arc fault has occurred in the stack, electrically isolating a respective battery of each battery management system node at least partially by opening a respective isolation switch electrically coupled to the battery.

In an embodiment of the fifth aspect, the method further includes causing the stack to operate in a floating mode by causing a respective node output shorting switch electrically coupled across an output port of each battery management system node to operate in its off state, in response to determining that the arc fault has occurred in the stack.

In another embodiment of the fifth aspect, the arc fault in the stack is a series arc fault in the stack, and the method further includes (1) obtaining electrical measurement values for the stack; and (2) determining that the series arc fault has occurred in the stack in response to a mismatch between a sum of voltages across each battery management system node of the stack and a measured voltage across the stack.

In another embodiment of the fifth aspect, the method further includes (1) sending a measurement command to each battery management system node; and (2) at each battery management system node, in response to the measurement command, obtaining a respective subset of the electrical measurement values for the stack, each subset of the electrical measurement values for the stack corresponding to a time prescribed by the measurement command.

In another embodiment of the fifth aspect, the method further includes propagating electrical measurement values for a first node of the plurality of battery management system nodes through at least one other node of the plurality of battery management system nodes.

In another embodiment of the fifth aspect, the method further includes removing power conversion switching noise and associated harmonics from the electrical measurement values for the stack, before determining that the series arc fault has occurred in the stack.

In another embodiment of the fifth aspect, the arc fault in the stack is a parallel arc fault in the stack, and the method further includes (1) obtaining electrical measurement values for the stack, and (2) determining that the parallel electrical arc fault has occurred in the stack in response to a mismatch between respective currents flowing through two battery management system nodes of the stack.

In another embodiment of the fifth aspect, the method further includes removing power conversion switching noise and associated harmonics from the electrical measurement values for the stack, before determining that the parallel arc fault has occurred in the stack.

In another embodiment of the fifth aspect, the method further includes performing a controlled discharge of each battery within its respective battery management system node, in response to determining that the arc fault has occurred in the stack.

In a sixth aspect, a method for safe operation of an energy storage system, including at least a first stack of a plurality of battery management system nodes with respective output ports electrically coupled in series, includes the following steps: (a) causing the battery management system nodes to operate in respective operational modes, such that each battery management system node is capable of providing electric power to a load electrically coupled to the energy storage system; and (b) in response to a signal for the first stack to operate in a safe mode, causing a first subset of the battery management system nodes to operate in respective bypass modes, while causing a second subset of the battery management system nodes to continue to operate in respective operational modes, to reduce at least one of a voltage and a current of the first stack.

In an embodiment of the sixth aspect, causing the first subset of the battery management system nodes to operate in respective bypass modes includes, for each battery management system node of the first subset, the following steps: (1) isolating a battery of the battery management system node from a direct-current to direct-current (DC-DC) converter of the battery management system node; and (2) electrically short circuiting an output port of the battery management system node.

In another embodiment of the sixth aspect, causing the second subset of the battery management system nodes to continue to operate in respective operational modes includes, for each battery management system node of the second subset, causing a DC-DC converter of the battery management system node to transform a battery voltage to a voltage across an output port of the battery management system node.

In another embodiment of the sixth aspect, each battery management system node of the first stack is a member of either the first subset of the battery management system nodes or the second subset of the battery management system nodes.

In another embodiment of the sixth aspect, the method further includes changing a division of battery management system nodes of the first stack between the first and second subsets of battery management system nodes.

In another embodiment of the sixth aspect, the method further includes periodically changing the division of battery management system nodes of the first stack between the first and second subsets of battery management system nodes.

In another embodiment of the sixth aspect, the method further includes changing the division of battery management system nodes of the first stack between the first and second subsets in response to a signal to change one or more of a voltage and a current of the first stack.

In another embodiment of the sixth aspect, the method further includes generating the signal for the first stack to operate in the safe mode in response to detection of a fault in the energy storage system outside of the first stack.

In another embodiment of the sixth aspect, the fault in the energy storage system is an arc fault in the energy storage system outside of the first stack.

In another embodiment of the sixth aspect, the fault in the energy storage system is a failure of a communication subsystem in the energy storage system.

In another embodiment of the sixth aspect, the method further includes generating the signal for the first stack operate in the safe mode in response to a user command.

In a seventh aspect, a method for safe operation of an energy storage system, including at least a first stack of a plurality of battery management system nodes with respective output ports electrically coupled in series, includes the following steps: (1) causing the battery management system nodes to operate in respective operational modes, such that each battery management system node is capable of providing electric power to a load electrically coupled to the energy storage system; and (2) in response to a failure of a communication subsystem of the energy storage system, causing the first stack to operate in either a bypass mode or a floating mode.

In an embodiment of the seventh aspect, causing the first stack to operate in the bypass mode includes causing a respective node output shorting switch electrically coupled across an output port of each battery management system node to operate in its on state.

In another embodiment of the seventh aspect, causing the first stack to operate in the floating mode includes (1) electrically isolating a respective battery of each battery management system node at least partially by opening a respective isolation switch electrically coupled to the battery; and (2) causing a respective node output shorting switch electrically coupled across an output port of each battery management system node to operate in its off state.

In another embodiment of the seventh aspect, the method further includes performing, within each battery management system node, a controlled discharge of a respective battery of the battery management system node, in response to the failure of the communication subsystem of the energy storage system.

In an eighth aspect, an energy storage system includes (1) a first stack of a plurality of battery management system nodes with respective output ports electrically coupled in series; and (2) a control subsystem configured to: (a) cause the battery management system nodes to operate in respective operational modes, such that each battery management system node is capable of providing electric power to a load electrically coupled to the energy storage system, and (b) in response to a signal for the first stack to operate in a safe mode, cause a first subset of the battery management system nodes to operate in respective bypass modes, while causing a second subset of the battery management system nodes to continue to operate in respective operational modes, to reduce at least one of a voltage and a current of the first stack.

In an embodiment of the eighth aspect, the control subsystem is further configured to change a division of battery management system nodes of the first stack between the first and second subsets of battery management system nodes.

In a ninth aspect, a method for safe operation of an energy storage system, including at least a first stack of a plurality of battery management system nodes, includes the following steps: (1) detecting a fault in the energy storage system; and (2) in response to detecting the fault in the energy storage system, reducing at least one (a) a voltage of the first stack to a non-zero value, and (b) a current of the first stack to a non-zero value, such that the first stack operates in a safe mode.

In an embodiment of the ninth aspect, the fault in the energy storage system is an arc fault in series with the first stack.

In another embodiment of the ninth aspect, the fault in the energy storage system is a parallel arc fault in the energy storage system outside of the first stack.

In another embodiment of the ninth aspect, the method further includes reducing at least one of a voltage and a current of a second stack of a plurality of battery management system nodes, in response to detecting the fault in the energy storage system.

In a tenth aspect, a method for safe operation of an energy storage system, including a plurality of battery management system nodes that are electrically coupled together, includes the following steps: (1) obtaining measurement values of a first battery of a first battery management system node of the plurality of battery management system nodes; (2) comparing the measurement values to expected values; (3) determining that the first battery is unsafe in response to the measurement values differing from the expected values by at least a threshold amount; and (4) in response to determining that the first battery is unsafe, electrically isolating the first battery from respective batteries of other battery management system nodes of the plurality of battery management system nodes.

In an embodiment of the tenth aspect, the measurement values of the first battery include at least one of an instantaneous voltage of the first battery, an instantaneous current of the first battery, and an instantaneous temperature of the first battery.

In another embodiment of the tenth aspect, the measurement values of the first battery include at least one of a rate of change of a voltage of the first battery, a rate of change of current flowing through the first battery, and a rate of change of a temperature of the first battery.

In another embodiment of the tenth aspect, the method further includes performing a controlled discharge of the first battery, within the first battery management system node, in response to determining that the first battery is unsafe.

In another embodiment of the tenth aspect, performing the controlled discharge of the first battery includes electrically coupling a resistor to the first battery within the first battery management system node.

In another embodiment of the tenth aspect, performing the controlled discharge of the first battery includes discharging the first battery via a current source electrically coupled to the first battery within the first battery management node.

In another embodiment of the tenth aspect, the method further includes commanding a load electrically coupled to the energy storage system to increase power drawn from the energy storage system, in response to determining that the first battery is unsafe.

In another embodiment of the tenth aspect, the method further includes commanding the load electrically coupled to the energy storage system to change a magnitude of the power drawn from the energy storage system, in response to a parameter of the first battery crossing a threshold value.

In another embodiment of the tenth aspect, the parameter of the first battery includes one of a state of charge (SOC) of the first battery and a voltage of the first battery.

In another embodiment of the tenth aspect, the load electrically coupled to the energy storage system includes an inverter.

In another embodiment of the tenth aspect, the method further includes inhibiting charging of the first battery, in response to determining that the first battery is unsafe.

In another embodiment of the tenth aspect, the method further includes increasing a discharge rate of the first battery, in response to determining that the first battery is unsafe.

In an eleventh aspect, a method for safe operation of an energy storage system, including a plurality of battery management system nodes that are electrically coupled together, includes the following steps: (1) receiving a signal indicating that a first battery of a first battery management system node of the plurality of battery management system nodes is unsafe; and (2) in response to receiving the signal indicating that the first battery is unsafe, performing a controlled discharge of the first battery within the first battery management system node.

In an embodiment of the eleventh aspect, performing the controlled discharge of the first battery includes electrically coupling a resistor to the first battery within the first battery management system node.

In another embodiment of the eleventh aspect, performing the controlled discharge of the first battery includes discharging the first battery via a current source electrically coupled to the first battery within the first battery management system node.

In another embodiment of the eleventh aspect, the method further includes commanding a load electrically coupled to the energy storage system to increase power drawn from the energy storage system in response to receiving the signal indicating that the first battery is unsafe.

In another embodiment of the eleventh aspect, the method further includes commanding the load electrically coupled to the energy storage system to change a magnitude of the power drawn from the energy storage system, in response to a parameter of the first battery crossing a threshold value.

In another embodiment of the eleventh aspect, the parameter of the first battery includes one of a state of charge (SOC) of the first battery and a voltage of the first battery.

In another embodiment of the eleventh aspect, the load electrically coupled to the energy storage system includes an inverter.

In another embodiment of the eleventh aspect, the method further includes inhibiting charging of the first battery, in response to receiving the signal indicating that the first battery is unsafe.

In another embodiment of the eleventh aspect, the method further includes increasing a discharge rate of the first battery, in response to receiving the signal indicating that the first battery is unsafe.

In a twelfth aspect, an energy storage system includes (1) a plurality of battery management system nodes that are electrically coupled together; and (2) a control subsystem configured to: (a) obtain measurement values of a first battery of a first battery management system node of the plurality of battery management system nodes, (b) compare the measurement values to expected values, (c) determine that the first battery is unsafe in response to the measurement values differing from the expected values by at least a threshold amount, and (d) in response to determining that the first battery is unsafe, electrically isolate the first battery from respective batteries of other battery management system nodes of the plurality of battery management system nodes.

In a thirteenth aspect, an energy storage system includes (1) a plurality of battery management system nodes that are electrically coupled together; and (2) a control subsystem configured to: (b) receive a signal indicating that a first battery of a first battery management system node of the plurality of battery management system nodes is unsafe, and (b) in response to receiving the signal indicating that the first battery is unsafe, cause a controlled discharge of the first battery to be performed within the first battery management system node.

In a fourteenth aspect, a method for safe operation of an energy storage system, including a first battery and a first direct-current to direct-current (DC-DC) converter electrically coupled to the first battery, includes the following steps: (1) controlling the first DC-DC converter to discharge the first battery into a load electrically coupled to the first DC-DC converter, to at least partially power the load from the first battery; and (2) in response to a signal to perform a controlled discharge of the first battery, controlling the first DC-DC converter to increase a rate of discharge of the first battery into the load.

In an embodiment of the fourteenth aspect, the method further includes commanding the load to increase power drawn from the energy storage system, in response to the signal to perform a controlled discharge of the first battery.

In another embodiment of the fourteenth aspect, the method further includes commanding the load to change a magnitude of the power drawn from the energy storage system, in response to a parameter of the first battery crossing a threshold value.

In another embodiment of the fourteenth aspect, the parameter of the first battery includes a state of charge (SOC) of the first battery or a voltage of the first battery.

In another embodiment of the fourteenth aspect, the load includes an inverter.

In another embodiment of the fourteenth aspect, the method further includes inhibiting charging of the first battery, in response to the signal to perform a controlled discharge of the first battery.

In a fifteenth aspect, a battery management system node with reverse voltage failure mode protection includes (1) a battery including a positive terminal and a negative terminal; (2) a direct-current to direct-current (DC-DC) converter including an output port configured to electrically couple in series with one or more additional battery management system nodes; (3) a first isolation switch electrically coupling the battery to the DC-DC converter and configured to selectably connect and disconnect the battery from the DC-DC converter; and (4) a second isolation switch configured to prevent flow of electric current in event of a short circuit with one or more of the additional battery management system nodes.

In an embodiment of the fifteenth aspect, the battery management system node further includes a controller configured to open each of the first and second isolation switches in response to a signal to electrically isolate the battery.

In another embodiment of the fifteenth aspect, the first isolation switch is electrically coupled between the positive terminal of the battery and the DC-DC converter, and the second isolation switch is electrically coupled between the negative terminal of the battery and the DC-DC converter.

In another embodiment of the fifteenth aspect, (1) the first isolation switch includes a first transistor including a first body diode, an anode of the first body diode being connected to the DC-DC converter, and a cathode of the first body diode being connected to the positive terminal of the battery;

and (2) the second isolation switch includes a second transistor including a second body diode, an anode of the second body diode being connected to the negative terminal of the battery, and a cathode of the second body diode being connected to the DC-DC converter.

In another embodiment of the fifteenth aspect, the second isolation switch is electrically coupled to the output port of the DC-DC converter.

In another embodiment of the fifteenth aspect, (1) the first isolation switch includes a first transistor electrically coupled between the positive terminal of the battery and the DC-DC converter, the first transistor including a first body diode, an anode of the first body diode being electrically coupled to the DC-DC converter, and a cathode of the first body diode being electrically coupled to the battery; and (2) the second isolation switch includes a second transistor including a second body diode, a cathode of the second body diode being connected to a positive terminal of the output port of the DC-DC converter.

In another embodiment of the fifteenth aspect, (1) the first isolation switch includes a first transistor electrically coupled between the negative terminal of the battery and the DC-DC converter, the first transistor including a first body diode, an anode of the first body diode being electrically coupled to the negative terminal of the battery, and a cathode of the first body diode being electrically coupled to the DC-DC converter; and (2) the second isolation switch comprises a second transistor including a second body diode, a cathode of the second body diode being connected to a positive terminal of the output port of the DC-DC converter.

In another embodiment of the fifteenth aspect, the DC-DC converter includes one of a boost converter and a buck converter.

In a sixteenth aspect, a battery management system stack includes (1) a first battery management system node, including a first battery with a positive terminal and a negative terminal, a first direct-current to direct-current (DC-DC) converter, and a first isolation switch electrically coupling one of the positive and negative terminals of the first battery to the first DC-DC converter; and (2) a second battery management system node, including a second battery with a positive terminal and a negative terminal, a second DC-DC converter, a second isolation switch electrically coupling one of the positive and negative terminals of the second battery to the second DC-DC converter, and a third isolation switch configured to prevent flow of electric current in event of a short circuit between the first and second battery management system nodes.

In an embodiment of the sixteenth aspect, the first isolation switch is electrically coupled between the positive terminal of the first battery and the first DC-DC converter, the second isolation switch is electrically coupled between the positive terminal of the second battery and the second DC-DC converter, and the third isolation switch is electrically coupled between the negative terminal of the second battery and the second DC-DC converter.

In another embodiment of the sixteenth aspect, the third isolation switch includes a transistor including a body diode, an anode of the body diode being connected to the negative terminal of the second battery, and a cathode of the body diode being connected to the second DC-DC converter.

In another embodiment of the sixteenth aspect, the third isolation switch is electrically coupled to an output port of the second DC-DC converter.

In another embodiment of the sixteenth aspect, the third isolation switch includes a transistor including a body diode, a cathode of the body diode being connected to a positive terminal of the output port of the second DC-DC converter.

In another embodiment of the sixteenth aspect, each of the first DC-DC converter and the second DC-DC converter comprises a respective boost converter.

BRIEF DESCRIPTION OF DRAWINGS

FIG. 13A is an illustrative circuit diagram of an example bi-directional DC-DC converter circuit for use in an example node.

FIG. 13B is an illustrative signal diagram representing discharge and charge of a battery comprising the bi-directional DC-DC converter of FIG. 13A by the load.

FIG. 13C is an illustrative signal diagram representing discharge, with no charge, of the battery of FIG. 13A by the load.

DETAILED DESCRIPTION

While previous battery energy management systems and battery management system nodes generally have been effective, there have been shortcomings with their use. For example, conventional battery management system nodes are not capable of identifying and extinguishing an arc fault. Moreover, a battery isolation switch can isolate a weak or failed battery from a remainder of an energy storage system, but previous isolation switches ordinarily do not protect good batteries from a failed battery. Consequently, a good battery coupled within a failed battery can transfer short circuit voltages and currents to adjacent batteries, which can lead to fire. Furthermore, in general, only failed batteries are bypassed or de-energized. However, there is a need to be able to bypass a good battery when a battery energy management system fails but the battery is good. For example, during installation and maintenance, it is useful to have non-zero but safe voltage to power battery stacks to troubleshoot and test whether a system is properly functioning before full voltage and power power-up. There also is a need to be able to keep battery voltages at safe levels to humans, and low enough to easily extinguish most arcs. Although a battery generally is bypassed when it is determined to be possibly unsafe, merely bypassing an unsafe battery does not prevent it from catching fire and the fire spreading to other healthy batteries. Thus, there is a need to both identify and discharge unsafe, albeit not yet failed, batteries.

Disclosed herein are safe battery energy management systems, safe battery management system nodes, and associated methods which at least partially overcome one or more the above-discussed drawbacks of conventional systems, nodes, and methods. For example, certain embodiments are configured to perform a hierarchical arc fault detection method which can identify an electrical arc anywhere in a system. Additionally, some embodiments can operate in a plurality of modes, to promote safety as well as ease of system maintenance and troubleshooting. Furthermore, particular embodiments are configured to safely discharge a battery, such as in response to fault or a user command to discharge the battery. Moreover, certain embodiments are configured to prevent short circuit current flow in response to a reverse voltage.

Battery Management System Node Example

Figure 1:
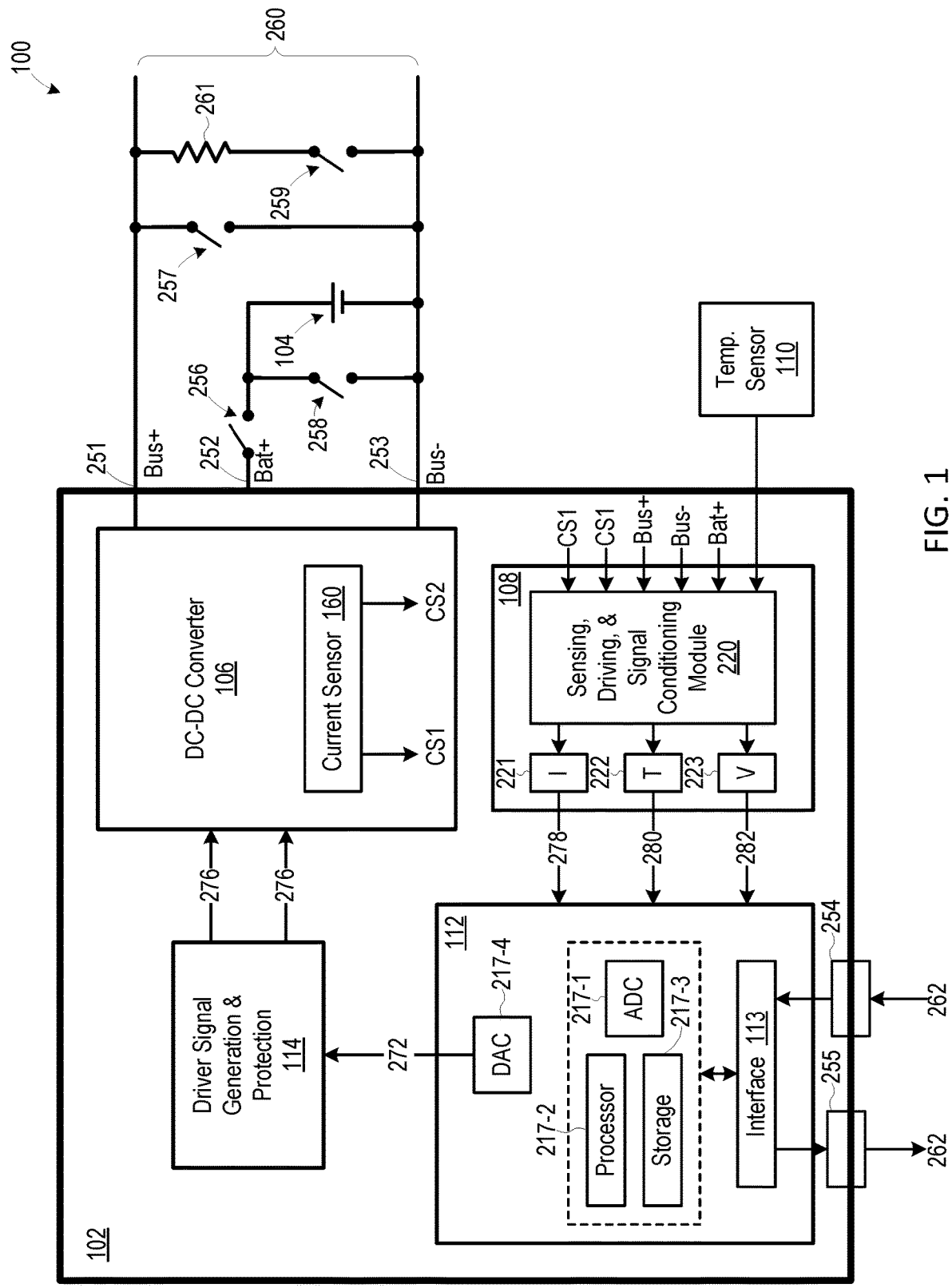
FIG. 1 is an illustrative block diagram of an example battery management system (BMS) node.

FIG. 1 is an illustrative block diagram of an example battery management system (BMS) node 100. The example BMS node 100 includes a control circuit 102 and battery 104. In this document, the term "battery" includes a single electrochemical cell as well as a device including a plurality of electrochemical cells. Accordingly, the battery 104 may be a single electrochemical cell. Additionally, the battery 104 may be a multi-cell assembly including a plurality of electrochemical cells that are electrically coupled together in series and/or parallel. The battery 104 may be a stand-alone device, or the battery 104 may be co-packaged with, or part of, another device.

The example node 100 includes a positive power bus (Bus+) terminal 251, a positive battery terminal (Bat+) 252, and a negative battery/power bus terminal (Bus−, Cell−) (the 'negative battery terminal') 253. The node 100 is coupled to the communication bus 262. More particularly, the node 100 includes a communication bus input terminal 254 and a communication bus output terminal 255. In an example node 100, the communication bus 262 comprises a serial data bus.

The control circuit 102 includes a bidirectional DC-DC converter 106, a sensing and measurement system 108, a temperature sensor 110, a processing and communications system 112, and a drive signal generation system 114. The converter 106 receives as input voltage, a battery voltage across terminals 252 and 253, and provides as output voltage, a node output voltage across terminals 251 and 253. Thus, the converter 106 transforms, e.g. either increases or decreases, a battery voltage across terminals 252 and 253 to an output node voltage across terminals 251 and 253, or vice versa. The sensing system 108 monitors battery temperature, battery current and battery voltage characteristics over time and provides that information to the processing and communication system 112. The sensing system 108 also monitors node output voltage output current and DC-DC converter temperature and/or temperature of the battery 104. The node output voltage is output voltage of the DC-DC converter 106, which is provided across positive power bus (Bus+) terminal 251 and the negative battery 253, which is the voltage output of the DC-DC converter 106. Node current flows through the battery, which is coupled to the DC-DC converter 106. The node output voltage and/or the node output current can be used to identify an arc fault, such as discussed below with respect to FIGS. 5A-8C. The DC-DC converter temperature can be used as a proxy for temperature of the battery 104 to ensure safe discharge. Alternately, BMS node 100 can directly measure temperature of battery 104, and the temperature can be used to ensure safe discharge.

An example node 100 performs periodic voltage, current and temperature (WIT') measurements. More particularly, battery voltage, battery current, battery temperature and node output voltage measurements are used, as explained more fully below, to determine state of charge estimates for the battery 104 and/or to dynamically control charge and discharge of the battery 104. An example node performs voltage, current and temperature (NIT') measurements at least once every 5-10 milliseconds, for example.

In one aspect, the processing and communication system 112 processes the information from the sensing system 108 based on stored control information that specifies how to control the DC-DC converter 106 depending on the VIT measurements, and then outputs information to the drive system 114 for appropriately controlling the converter 106 to convert a battery voltage to a node output voltage while achieving enhanced performance of the battery 104. In another aspect, the processing and communication system 112 controls opening and closing of a node battery isolation switch 256 to selectably isolate the battery 104 from the converter 106. In yet another aspect, the processing and control system 112 controls energy drain circuitry 258, which provides a mechanism to safely discharge the battery 104 within the BMS node 100 without providing a node output voltage. Although energy drain circuitry 258 is depicted as being a single switch, energy drain circuitry 258 can take other forms, such as discussed below with respect to FIGS. 11 and 12, as long as energy drain circuitry 258 can perform a controlled discharge of the battery 104 within the BMS node 100.

The battery 104 provides a voltage across positive battery terminal 252 and the negative battery terminal 253. The converter 106 provides a node output voltage across the positive power bus terminal 251 and the negative power terminal 253. The positive power bus terminal 251 and the negative power terminal 253 together act as an output port 260 at which the node output voltage is provided. Some embodiments of BMS node 100 additionally include a node output shorting switch 257 electrically coupled across output port 260, i.e. across the positive power bus terminal 251 and the negative power terminal 253. Additionally, BMS node 100 optionally includes a soft shorting switch 259 and a resistor 261 electrically coupled in series across output port 260. As discussed below, controller 102 closes soft shorting switch 259, for example, to equalize node output voltages among a plurality of BMS node 100 instances during certain off states. Resistor 261 need not be a discrete resistor but could instead be parasitic resistance of soft shorting switch 259.

The converter 106 converts the battery voltage, which is provided across positive battery terminal 252 and the negative battery terminal 253 to a node output voltage, which is provided across the positive power bus terminal 251 and the negative battery terminal 253. The exemplary sensing and measurement system 108 includes a sensing, driving, and signal conditioning module 220 with electrical connections to the outputs CS1 and CS2 of a current sensor 160 that measures battery current, to a temperature sensor 110 that measures temperature of the converter and/or the battery 104, to positive power bus terminal 251, to positive battery terminal 252, and negative power terminal 253. The sensing, driving, and signal conditioning module 220 prepares and conditions the current, temperature, and voltage input signals to be measured over time at current measurement module 221, temperature measurement module 222, and voltage measurement module 223. The sensing and measurement system 108 includes current, temperature and voltage signal lines 278, 280, 282 coupled to transmit the measured values to the processing and communication system 112.

The processing and communication system 112 is coupled to receive signals from the sensing system 108. The processing system 112 also includes an output connection to the drive system 114. The drive system 114 includes an input signal connection 272 from the processing system 112 and one or more output signal connections 276 to the DC-DC converter 106.

Processing and communications system 112 includes a module 217 that contains an analog-to-digital converter (ADC) circuit 217-1, a processor circuit 217-2, digital storage 217-3, and an optional digital-to-analog converter 217-4 (DAC). The analog-to-digital converter 217-1 converts the analog measurements of voltage, current, and temperature received from sensing system 108 into corresponding digital values. In one aspect, the processor circuit 217-2 correlates the current, temperature, and voltage data with instructions contained within digital storage 217-3, and processes cell charge/discharge algorithms to determine control signals to send to the drive system 114. In some embodiments, the DAC 217-4 converts the control signals generated by processor circuit 217-2 from digital to analog form before the control signals are transmitted to the drive system 114. An example processing and communications module 112 of node 100 sends data to and receives data and instructions from a stack controller 210, described below with reference to FIG. 2, over the communication bus 262. An alternative example node (not shown) can use wireless communications to send data and instructions to and to receive data and instructions from a stack controller. For example, in some alternate embodiments, communication bus input terminal 254 and communication bus output terminal 255 are replaced with one or more wireless transceivers to enable node 100 to wirelessly communicate with stack controller 210 and/or other node 100 instances. In these alternate embodiments, communication bus 262 is optionally omitted.

Drive system 114 processes control signals received from the processing and communication system 112 and produces drive control signals to control the DC-DC converter 106 to control battery charge operations and battery discharge operations.

Processing and communications system 112 includes bus interface circuitry 113 to send and to receive information over the communication bus 262. In some embodiments, the bus interface circuitry 113 receives input information at communication bus input terminal 254 and provides output information at communication bus output terminal 255, for sequential transfer of information among multiple BMS node 100 instances. An example communication bus 262 includes a differential daisy chain circuit. An alternative example node (not shown) includes a wireless communication interface for communication with a stack controller (not shown) and/or other nodes. In some alternate embodiments, data need not be sent or received sequentially but could instead be sent or received using another data transmission technique. For example, in some alternate embodiments, data is transmitted between BMS node 100 and two or more other points, such as other BMS nodes, in parallel.

The example processing and communication circuitry 112 sends commands to the drive system 114 to control the DC-DC converter 106 based upon voltage, current and temperature measurements obtained by the sensing system 108 and based upon algorithms stored as instructions and lookup tables within the digital storage 217-3. An example node 100 receives the instructions and lookup tables from a host controller 212 via a stack controller 210 described below with reference to FIG. 2. The algorithms are coded to adjust the voltage and/or current characteristics of a battery 104 (via converter 106) to achieve the performance desired. For example, if it is determined by the processing system 112 based upon VIT measurements, for example, that the present discharge rate of a particular battery 104 (assessed via measurements from sensing system 108) suggests that the cell's lifetime will be two months too short than what is required, an algorithm looks up in a look-up table an appropriate adjustment to be applied to the converter 106 of that battery 104 based upon the calculated lifetime shortfall and the present current and voltage operating characteristics of the battery 104. An example battery management system node 100 is disclosed in U.S. Pat. No. 8,686,693, which is expressly incorporated herein in its entirety by this reference.

Energy Storage System Example

Figure 2:
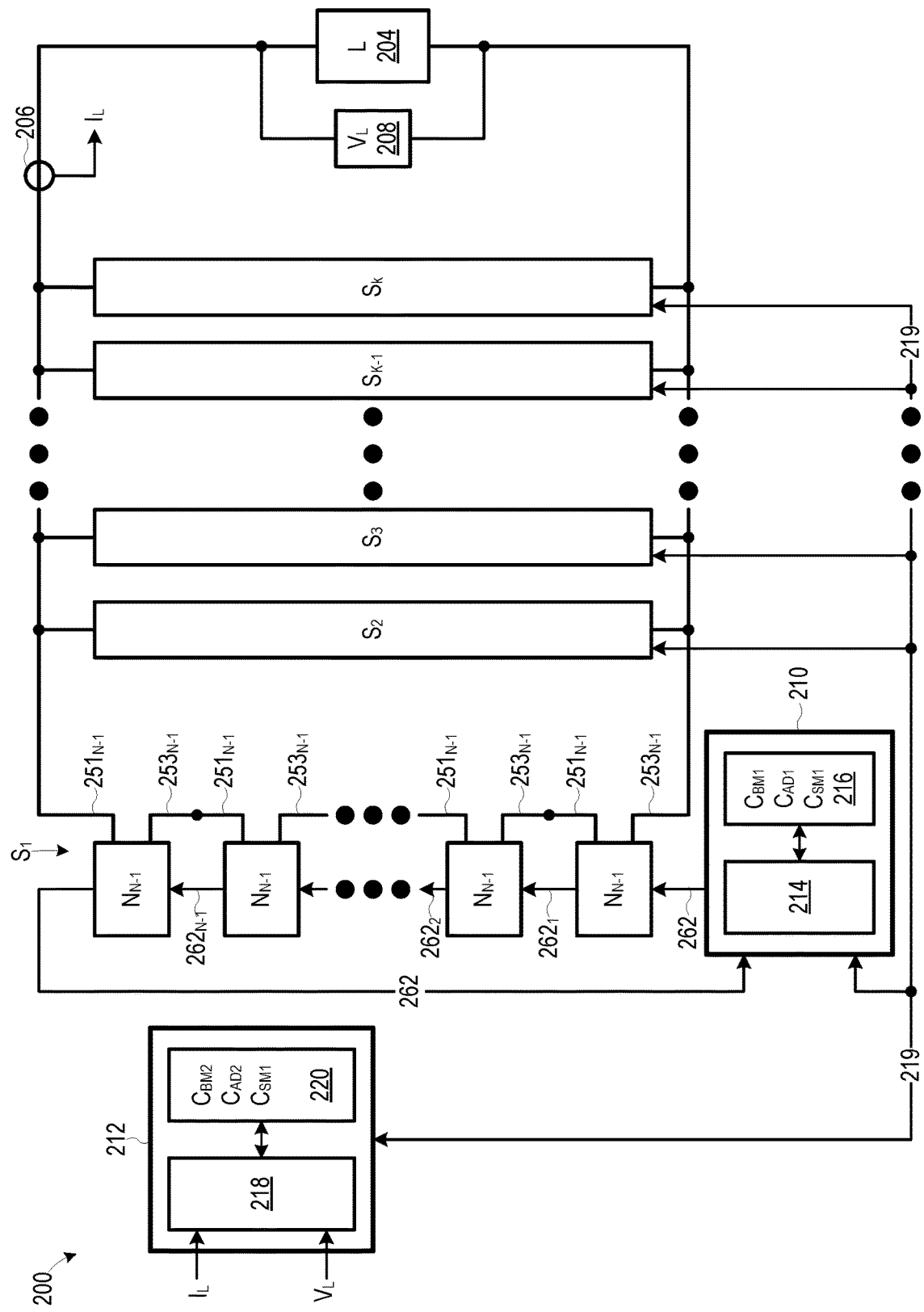
FIG. 2 is an illustrative block diagram of an example energy storage system that includes multiple BMS stacks coupled in parallel with an electrical load, each stack including multiple nodes coupled in series.

FIG. 2 is an illustrative block diagram of an example energy storage system 200 that includes multiple BMS battery stacks $S_1$-$S_K$ with node output voltages coupled in parallel with electrical load 204. Batteries within each stack $S_1$-$S_K$ are stacked in series to produce sufficient voltage. As discussed above with respect to FIG. 1, each battery 104 may be either (a) a single electrochemical cell or (b) a multi-cell assembly including a plurality of electrochemical cells that are electrically coupled in series and/or parallel. To avoid unnecessary complexity of presentation and to promote illustrative clarity of explanation, details of a stack $S_1$ are explained and stacks $S_2$-$S_K$ are shown in block form with details omitted. However, it will be understood that the details and principles of operation explained with reference to stack $S_1$ also apply to the other stacks $S_2$-$S_K$. Stack $S_1$ includes multiple nodes $N_1$-$N_N$ with the sum of their node output voltages $V_1$-$V_N$ coupled in parallel with an electrical load 204. The load 204, for example, can be a Photovoltaic (PV) system and an inverter attached to a power grid. Alternatively, for example, the load 204 can be an electric motor and battery charger of an electric vehicle (EV). Accordingly, the load 204 can both receive power from energy storage system 200 as well as provide power to energy storage system 200 for charging the batteries 104. Each node in the example BMS stacks $S_1$-$S_K$ is equivalent to the node 100 of FIG. 1, although details of nodes $N_1$-$N_N$ are not shown to simplify the drawing.

The stack $S_1$ includes multiple nodes $N_1$-$N_N$. Each node converts a cell voltage of its respective battery 104 to a respective node output voltage, as discussed above with respect to FIG. 1. The multiple nodes $N_1$ to $N_N$ of $S_1$ have their node output voltages $V_1$ to $V_N$ coupled in series. For example, a negative power bus terminal $253_N$ of Node $N_N$ is coupled to a positive power bus terminal $251_{N-1}$ of node $N_{N-1}$. Also, for example, a negative power bus terminal $253_2$ of Node $N_2$ is coupled to a positive power bus terminal $251_1$ of node $N_1$. The series-coupled node output voltages $V_1$-$V_N$ of the nodes $N_1$-$N_N$ of the stack $S_1$ are electrically coupled in parallel with the electrical load 204. The example stack $S_1$ includes a stack controller 210 coupled to supervise operation of the nodes $N_1$-$N_N$ of the stack $S_1$. A host controller 212 is operatively coupled to the stack controller 210. In some alternate embodiments, two or more stacks $S_1$-$S_K$ share a common stack controller 210, such that each stack need not necessarily have its own stack controller 210. Additionally, although host controller 212 is depicted as a discrete entity, some or all aspects of host controller 212 could be incorporated in one more stack controllers 210. Furthermore, host controller 212 could be partially or completely implemented by one or more computing devices that are remote from the remainder of energy storage system 200, such as in a distributed or cloud computing system. Moreover, in some embodiments, host controller 212 is not dedicated to energy storage system 200 but is instead configured to at least partially control a plurality of energy storage systems. Additionally, in certain other alternate embodiments, host controller 212 and each stack controller 210 are implemented by a single controller (not shown).

For grid-tied energy storage, for example, stack voltages of hundreds of volts to over a thousand volts are common. With battery voltage (per battery cell) of approximately four (4) volts, battery stacks of one hundred (100) to three hundred (300) or more series battery cells are common. Assuming a boost ratio of 1.2, for example, stacks typically would include from fifty (50) to one-hundred and fifty (150) or more nodes per stack. The number of parallel stacks sets the total power and energy capability of the example system 200 and typically is in a range from one to many ten (10) or more, or one hundred (100) or more, for example. For large-format batteries used in a known automobile, for example, a stack of nodes that includes one hundred (100) batteries would be a twenty-four (24) kWh system. So, approximately fifty (50) parallel stacks would provide a 1 MWh system for commercial applications. Utility scale systems often can be one hundred (100) MWh and larger. Of course, there would be a practical limit to how many parallel stacks to use, such as the number of stacks that could physically (and safely) fit in a standard shipping container. A load current measurement circuit 206 is coupled to measure a load current $I_L$ through the load 204. A load voltage measurement circuit 208 is coupled to measure a voltage $V_L$ across the load. The host controller 212 is coupled to receive the $I_L$ measurements and to receive the $V_L$ measurements.

During normal operation, DC-DC converters of respective nodes $N_1$, $N_2$, . . . , $N_{N-1}$, $N_N$ of stack $S_1$ charge and discharge their associated batteries $104_{N1}$, $104_{N2}$, . . . , $104_{N-1}$, $104_{NN}$ independently of one another such that the voltage, current and other parameters of the one battery can be managed independently of the other batteries in the stack $S_1$. Moreover, each node includes a respective node cell isolation switch 256 to selectably connect and disconnect the node's DC-DC converter 106 to and from the node's battery 104 during a safe mode operation described below.

The example stack $S_1$ includes a communication bus 262 that couples the nodes of the stack to send information to and to receive information from the $S_1$ stack controller 210. The communication bus 262 communicates information to and from the nodes according to a sequential ordering of the nodes $N_1$ to $N_N$. In an example stack $S_1$, the sequential communication bus 262 has a daisy chain architecture in which communication bus segments $262_1$ to $262_N$ are provided between sequentially ordered nodes. Signals are transmitted sequentially from node-to-node according to node ordering. In the example stack $S_1$, node ordering progresses sequentially from the stack controller 210 to a first node in the sequence $N_1$, to a second node in the sequence $N_2$, ... to a last node in the sequence $N_N$. The example sequential bus has a ring topology in which the last node $N_N$ of the sequence is coupled in a loop through the stack controller 210 to the start of the sequence.

In an example system, the nodes $N_1$-$N_N$ of a stack 51 are coupled to form a communications controller area network in which control and data signals are communicated between the nodes and stack controller 210. More particularly, in an example system, the communication bus 262 includes two wires, i.e. low and high. However, communication bus 262 can have other configurations without departing from the scope hereof. For example, communication bus 262 could be an alternative type of wireline communication bus. As another example, communication bus 216 could be a wireless communication bus or a hybrid wireline-wireless communication bus. Each node can prepare and broadcast information (e.g. voltage, current and temperature data) via the bus 262 in response to commands received from the stack controller 210 over the bus 262. The broadcasted data can be accepted by all other nodes on the communication bus 262. Each node checks information received over the communication bus 262 and decides whether to process it, ignore it, or pass it along to the next node in the network.

An example stack controller 210 includes stack processor circuitry 214 operatively coupled to a storage device 216 that includes first battery management code ($C_{BM1}$), first arc detection code ($C_{AD1}$), and first safety management code ($C_{SM1}$) that are accessible to, and executable by, the processor circuitry 214.

In the example stack $S_1$, the first battery management ($C_{BM1}$) code in storage device 216 includes instructions that, when executed, configure the stack processor circuitry 214 for use in management of the charge and discharge of the cells of the nodes of the stack $S_1$ based upon measured voltage, current and temperature of the nodes of the stack, for example. For instance, example first $C_{BM1}$ code configures the stack processor circuitry 214 to collect battery, current and temperature measurements from the individual nodes $N_1$-$N_N$ of the stack $S_1$ and to send the measurements to the host controller 212 for processing. The example first $C_{BM1}$ code also configures the stack processor circuitry 214 of the $S_1$ stack controller 210 to receive instructions from the host controller 212 over timing and control bus 219 to assist in determining adjustment of operation of the batteries 104 of individual nodes, to optimize overall performance of the nodes of the stack $S_1$, and to send the received instructions to the nodes $N_1$-$N_N$ to implement the adjustments. An alternative example stack controller 210 wirelessly exchanges information with the host controller 212.

In the example stack $S_1$, the first arc detection ($C_{AD1}$) code in storage device 216 includes instructions that, when executed, configure the stack processor circuitry 214 for use in detecting and responding to arc fault conditions based upon measurements of voltage and current within the nodes of the stack $S_1$. For instance, example first $C_{AD1}$ code configures the stack processor circuitry 214 to impart measurement request commands to cause the BMS nodes $N_1$-$N_N$ of the stack $S_1$ to provide synchronized voltage measurements and to provide synchronized current measurements, to collect the synchronized measurements from the nodes, and to send the synchronized measurements to the host controller 212 over timing and control bus 219 for processing. In some embodiments, voltage measurements are synchronized independently of current measurements, such that voltage measurements are not necessarily synchronized with current measurements. The example first $C_{AD1}$ code also configures the stack processor circuitry 214 to detect an occurrence of a series arc fault in the stack $S_1$ and to detect an occurrence of a parallel arc fault in the example stack $S_1$ and to cause opening of isolation switches 256 of nodes of the stack $S_1$ and/or another action in response to such occurrences. The example first $C_{AD1}$ code also configures the stack processor circuitry 214 to receive instructions from the host controller 212 over timing and control bus 219 indicating an occurrence of a system-level series arc fault or indicating an occurrence of a system-level parallel arc fault, and to cause opening of isolation switches 256 of $N_1$-$N_N$ of the stack $S_1$ and/or another action in response to such occurrences, for example. In some embodiments, the stack processor circuitry 214 is further configured to cause the soft shorting switches 259 to close in response to a detected series or parallel arc fault, to equalize voltages across the nodes. An alternative example stack controller 210 wirelessly exchanges system series arc fault information or system-level parallel arc fault information with the host controller 212.

In the example stack $S_1$, the first safety management ($C_{SM1}$) code includes instructions that, when executed, configure the stack processor circuitry 214 for use in transitioning the nodes $N_1$-$N_N$ of the stack $S_1$ between operational, bypass, floating and safe functional modes. For instance, example first $C_{SM1}$ code configures the stack processor circuitry 214 to receive instructions from the host controller 212 over timing and control bus 219 that indicate a command to transition the nodes between modes of operation of the stack. The example first $C_{SM1}$ code also configures the stack controller to send instructions to the nodes of the stack $S_1$ to selectably open and close isolation switches 256 to transition the stack between modes of operation based upon instructions received from the host controller 212. An alternative example stack controller 210 wirelessly exchanges operational, safe, floating, and low power functional mode information with the host controller 212.

The host controller 212 includes controller processor circuitry 218 operatively coupled to a storage device 220 that includes second battery management ($C_{BM2}$) code, second arc detection ($C_{AD2}$) code and second safety management ($C_{SM2}$) code that are accessible to, and executable by, the controller processor circuitry 218. Example second $C_{BM2}$ code includes instructions that, when executed, configure the controller processor circuitry 218 for use in management of the charge and discharge of the batteries of the nodes of the BMS stack $S_1$ based upon measured voltage, current and temperature of the nodes of the stack, for example. For instance, example second $C_{BM2}$ code configures the controller processor circuitry 218 to collect voltage, current and temperature measurements from the stack $S_1$ and to use information in stored tables to select instructions to adjust performance of individual batteries 104 of the stack based upon the collected measurements that are indicative of the unique and evolving performance characteristics of the individual cells, so that overall system performance is enhanced. The example second $C_{BM2}$ code also configures the controller processor circuitry 218 to send instructions to the stack processor circuitry 214 over timing and control bus 219 to cause adjustment of operation of individual batteries 104 of the stacks $S_1$-$S_K$ to optimize overall performance of the system 200. An alternative example stack controller 210 wirelessly exchanges information with the host controller 212 of the stacks $S_1$-$S_K$.

Example second $C_{AD2}$ code includes instructions that, when executed, configure the controller processor circuitry 218 for use in detecting and responding to arc fault conditions based upon synchronized measurements of voltage and synchronized measurements of current within the nodes $N_1$-$N_N$ of the stack $S_1$, as well as measured stack currents and measured stack voltages. For instance, example second $C_{AD2}$ code configures the controller processor circuitry 218 to send instructions to cause the stack controllers of the multiple stacks $S_1$-$S_K$ to collect node voltage and node current measurements in synchrony with the collection by the host controller 212 of measurements of stack voltages $V_L$ and stack currents $I_L$. However, in some embodiments, voltage measurements are synchronized independently of current measurements, such that voltage measurements are not necessarily synchronized with current measurements. The example second $C_{AD2}$ code also configures the controller processor circuitry 218 to detect an occurrence of a system-level series arc fault and to detect an occurrence of a system-level parallel arc fault in the stack and to send information over timing and control bus 219 to one or more of the stacks $S_1$-$S_K$ to cause opening of node isolation switches 256 and/or another action in response to such occurrences. An alternative example host controller 212 wirelessly exchanges information with the stack controllers of the stacks $S_1$-$S_K$.

Example second $C_{SM2}$ code includes instructions that, when executed, configure the controller processor circuitry 218 for use in transitioning the nodes of one or more of the multiple stacks $S_1$-$S_K$ between operational, bypass, floating and safe functional modes. For instance, example second $C_{SM2}$ code configures the controller processor circuitry 218 to send instructions over timing and control bus 219 to the multiple BMS stacks to indicate a mode of operation. Example second $C_{SM2}$ code also sends instructions to one or more of the example stacks $S_1$-$S_K$ to indicate which isolation switches to selectably open and close during low power operation, for example. An alternative example host controller 212 wirelessly exchanges information with the stack controllers of the stacks $S_1$-$S_K$.

Arc Faults

An example electrical storage system may experience an electrical arc, where gas (typically air) between two nearby electrical conductors at different electrical potential ionizes due to a large voltage and/or small separation distance between the electrical conductors, resulting in current flow between the electrical conductors. Such potential for an electrical arc is compounded by the fact that typical electrical storage systems include many electrical connectors and long electrical cables, thereby presenting many possible points of failure. Some electrical storage systems are vulnerable to physical damage, such as from environmental conditions, maintenance personnel working in the system's vicinity, or from an animal chewing on the system's components. An electrical arc can be classified as either a series electrical arc or a parallel electrical arc. A series electrical arc occurs across an opening in a series electrical circuit, such as across an opening caused by a connector failure, for example. A parallel electrical arc occurs between parallel voltage or current paths of an electrical system, or between a voltage or current carrying conductor and ground, such as due to an insulation failure, for example.

Electrical arc detection devices have been proposed for energy management systems, which detect an electrical arc by identifying high frequency components, or "noise," of an energy storage system current that is generated by the electrical arc. The noise's amplitude is very small and must be increased by amplification, or by use of a current transformer, for detection. Additionally, the noise must be distinguished from other high frequency components commonly present in photovoltaic system current, such as switching power converter ripple current and harmonics thereof. Thus, conventional arc detection devices typically decompose photovoltaic system current into its constituent AC components using Fast Fourier Transform (FFT) techniques, or similar techniques, to distinguish electrical arc noise from other system noise. Significant computational generally resources are required to satisfactorily perform this signal decomposition.

Government and/or industry standards often specify a certain time from when an arc is established until an arc detection system detects or interrupts the arc. For example, for a Type 1 series arc detector, UL 1699B specifies that the time shall be no longer than two (2) seconds, and for higher power arcs shall be no longer than t=750 Joules/IV. When no arc is present in the energy storage system 200 that includes multiple battery stacks $S_1$-$S_K$ that provide DC voltage and DC current, AC signal components generally are quite small except for peaks related to switching of power electronics within the system such as DC-DC converters 106 or an inverter, for example. During an occurrence of an arc, a more complex AC spectrum may occur with larger amplitude than in the no arc situation. However, even during occurrence of an arc, peaks due to switching of power electronics can be considerably larger in amplitude than electrical noise due to the arc. Furthermore, these peaks are not guaranteed to be located at a particular frequency, even for a specific piece of equipment, as it may operate at different frequencies depending upon the conditions present. In an energy storage system that includes a large number of nodes per stack such as fifty (50) to one-hundred and fifty (150) or more nodes per stack in which each node takes VIT measurements approximately at least every 5-10 milliseconds, for example, there can be greater challenges synchronizing DC voltage measurements and synchronizing DC current measurements for use in arc detection. Moreover, there is a possibility that DC measurements of voltage and current can alias large AC peaks that occur due to switching of power electronics. Thus, an arc detection scheme that uses synchronized DC voltage and synchronized DC current measurements to detect arcs must quickly and reliably detect arcs without creating nuisance trips due to other sources of noise in the system such as power electronics switching, for example.

Measurement Synchronization

Figure 3A:
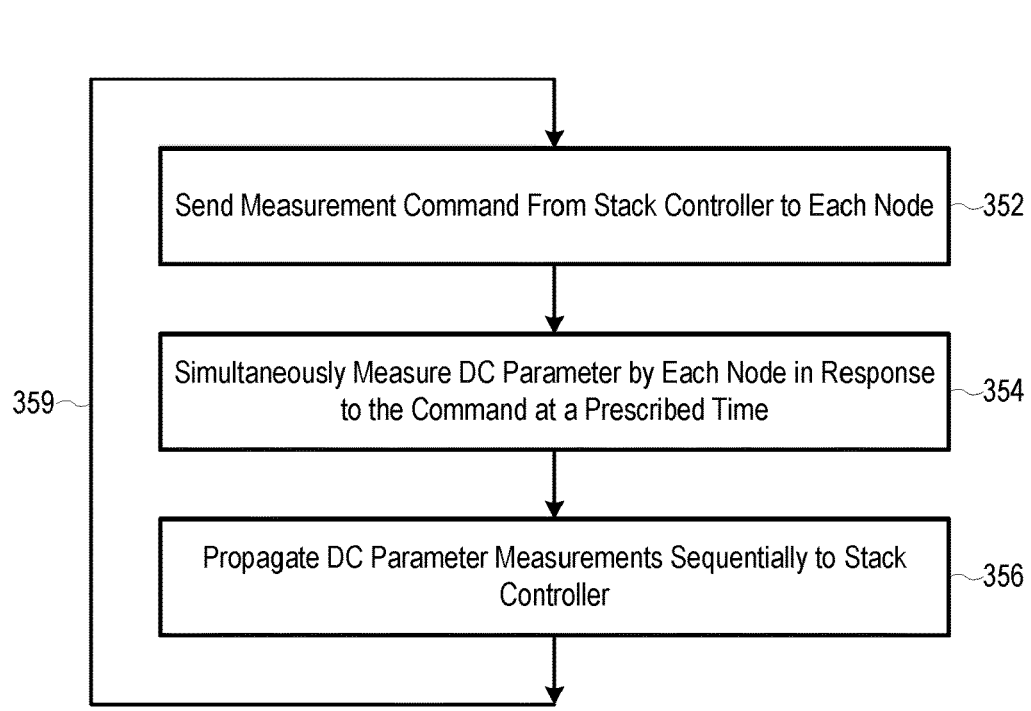
FIG. 3A is an illustrative flow diagram representing a first method to obtain synchronized DC measurement values produced by nodes of an example node stack of FIG. 2.

FIG. 3A is an illustrative flow diagram representing a first method 350 to obtain synchronized DC measurement values produced by nodes of the example node stack $S_1$ of FIG. 2. Method 350 is used, for example, to obtain synchronized electrical and/or temperature measurement values for arc fault detection and/or for managing other aspects of energy storage system 200, such as for use by processor circuitry 217-2, processor circuitry 214, and/or processor circuitry 218 to control charging and discharging of batteries 104. At step 352, the stack controller 210 sends a measurement request command to nodes $N_1$-$N_N$. At step 354, at a prescribed time, each node simultaneously measures at least one DC parameter, e.g., voltage, current, and/or temperature in response to the command. At step 356, the commanded DC measurement values are propagated through the nodes $N_1$-$N_N$ to the stack controller 210. Control next flows on loop 359 back to step 352 so that steps 352-356 repeat to thereby produce a continuing sequence of measurement samples. In an alternate embodiment, step 356 is modified so that the DC measurement values are transmitted from the nodes $N_1$-$N_N$ to the stack controller 210 is another manner, such as by wireline or wireless transmission directly from each node to the stack controller 210.

Figure 3B:
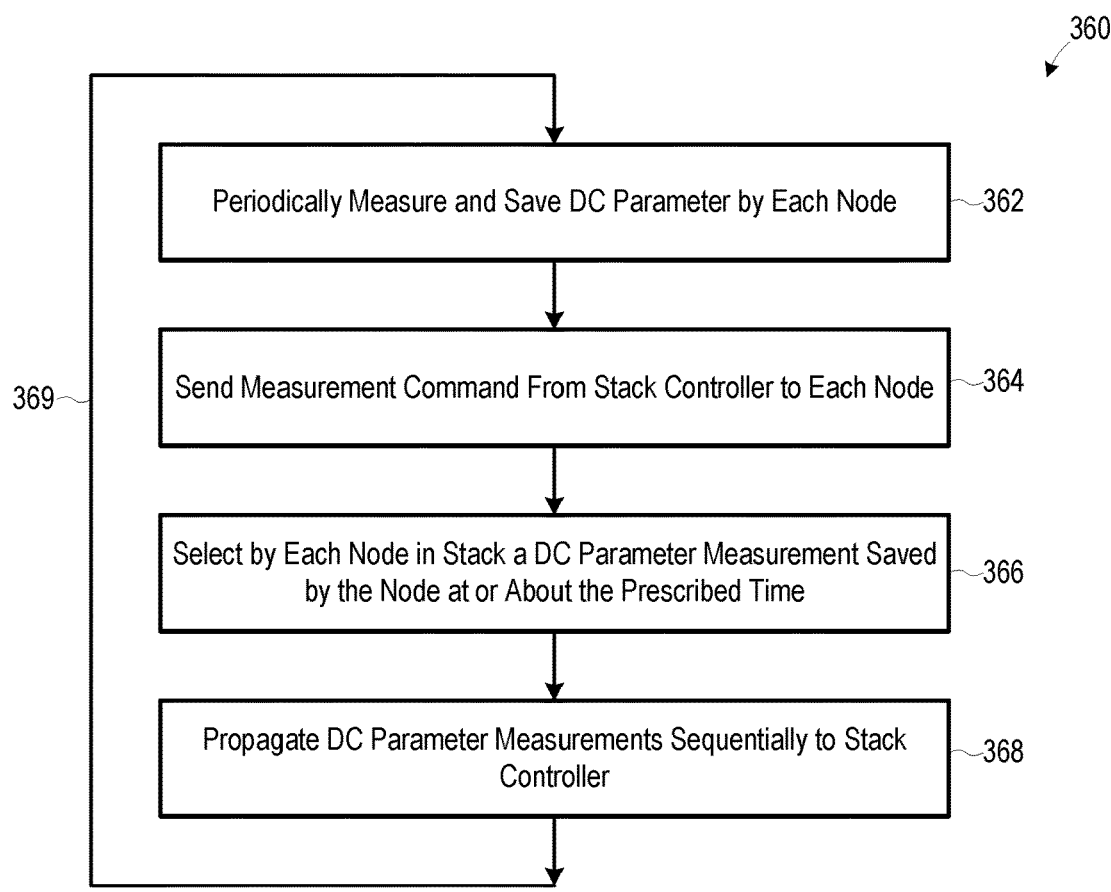
FIG. 3B is an illustrative flow diagram representing a second method to obtain synchronized DC measurement values produced by nodes of an example node stack of FIG. 2.

FIG. 3B is an illustrative flow diagram representing a second method 360 to obtain synchronized DC measurement values produced by nodes of the example node stack $S_1$ of FIG. 2. Method 360 is used, for example, to obtain synchronized electrical and/or temperature measurement values for arc fault detection and/or for managing other aspects of energy storage system 200, such as for use by processor circuitry 217-2, processor circuitry 214, and/or processor circuitry 218 to control charging and discharging of batteries 104. At step 362, each node $N_1$-$N_N$ of the stack $S_1$ periodically measures and saves to its storage 217-3 one or more DC parameters, e.g., voltage, current and temperature. As explained above, an example node performs voltage, current and temperature ('VIT') measurements at least once every 5-10 milliseconds, for example. Each node $N_1$-$N_N$ optionally time stamps each measurement.

At step 364, the stack controller 210 sends a measurement request command to nodes $N_1$-$N_N$. At step 366, each node selects one or more saved measurements, e.g., voltage and/or current corresponding to a time or time window prescribed by the measurement request command, in response to the measurement request command. For example, each node $N_1$-$N_N$ may select one or more saved measurement values corresponding to a time or time window prescribed by the measurement command, or each node $N_1$-$N_N$ may select a plurality of measurement values that are available in storage at the time when the node receives the measurement command. In some embodiments, each node $N_1$-$N_N$ has a common time reference, to enable the node to select saved time measurement values corresponding to the time or time window prescribed by the measurement command.

In some other embodiments, each node $N_1$-$N_N$ selects saved measurement values based at least partially on the node's position in a string and a time required for the measurement request command to propagate from one node to another. For example, assume that a propagation time between adjacent nodes in the string is $\Delta t$. A third node in the string may select stored measurement values corresponding to a time that is 3*$\Delta t$ before a time when the third node receives the measurement request command, to compensate for propagation delay of the measurement request command in the string.

In yet some other embodiments, stack controller 210 may provide a custom timing reference to each node $N_1$-$N_N$, to enable the node to select one or more measurement values corresponding to a prescribed time or time window. Stack controller 210 determines custom timing references, for example, based on measured propagation delay between stack controller 210 and each node $N_1$-$N_N$. Stack controller 210 measures propagation delay, for example, at start-up or on a periodic basis.

At step 368, the selected DC measurements, which optionally include time stamps, are propagated through the nodes of the stack to the stack controller 210. Control next flows on loop 369 back to step 362 so that steps 362-368 repeat to thereby produce a continuing sequence of measurement samples. In an alternate embodiment, step 368 is modified so that the DC measurement values are transmitted from the nodes $N_1$-$N_N$ to the stack controller 210 in another manner, such as by wireline or wireless transmission directly from each node to the stack controller 210.

It will be appreciated that the first method 350 involves performing synchronized measurement values and the second method 360 involves selecting previously saved measurement values. The measurements performed at step 354 during the first method 350 are performed synchronously at multiple nodes at a time determined based upon a measurement request command signal. The measurements selected during the second method 360 include measurements saved previously at multiple nodes and that are selected during a time window determined based upon a measurement command request signal. Both the first and second methods 350, 360 obtain measurement values for each of multiple nodes. As explained more fully below, the measurement values are optionally processed to remove potential aliasing due to switching of circuit components and to produce measurement values indicative of whether or not an arc fault may be occurring. In the case of measurement values obtained through the second method 360, processing can involve temporally aligning measurements selected from within a time window at different nodes.

Figure 4A:
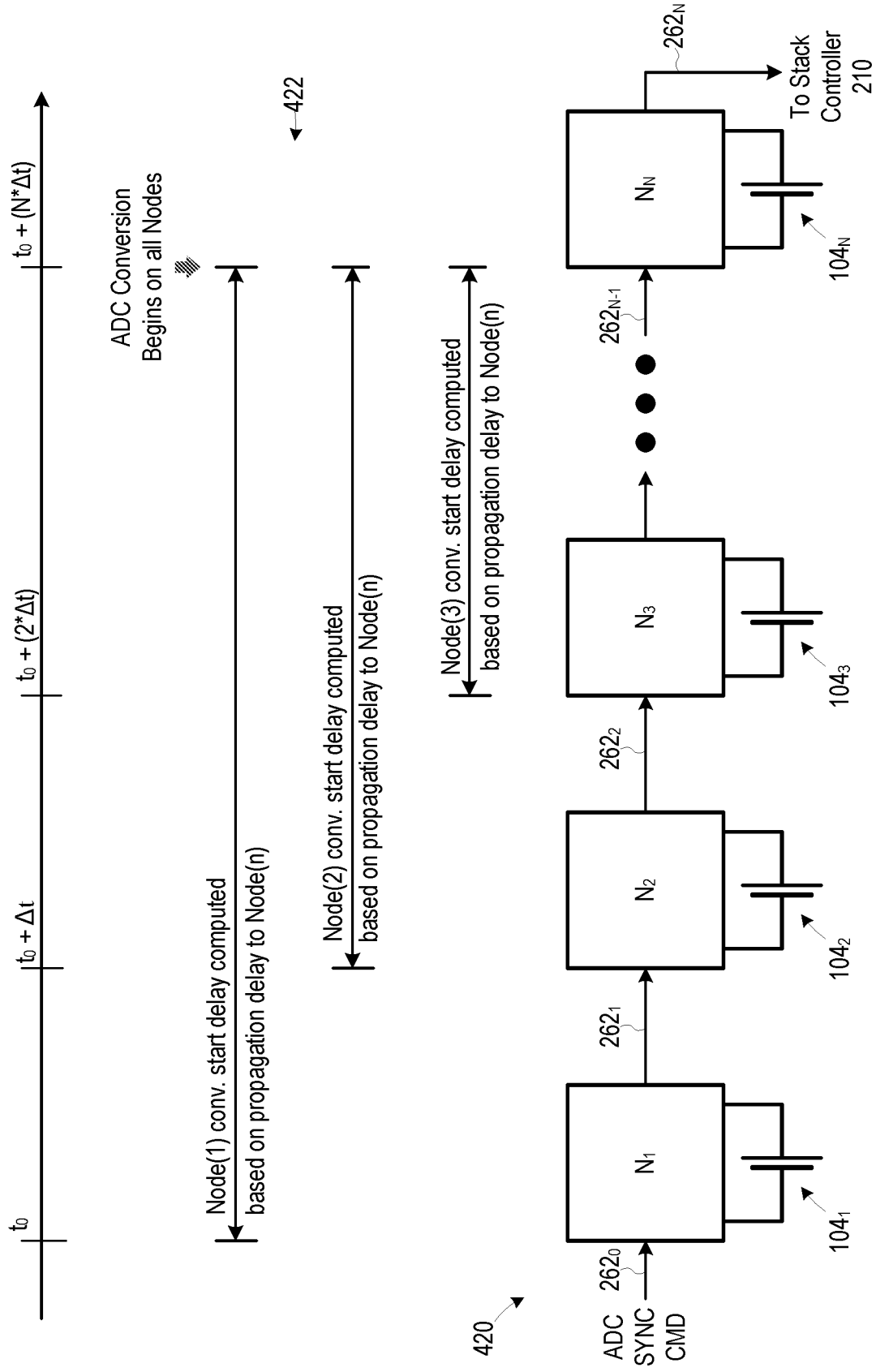
FIG. 4A is an illustrative block diagram showing nodes of a first example embodiment of a stack of FIG. 2 and an example timing diagram showing propagation delay of signals transmitted between the nodes.

FIG. 4A is an illustrative block diagram showing nodes $N_1$-$N_N$ of a first example stack 420, which is an embodiment of a stack S of FIG. 2, and an example timing diagram 422 showing propagation delay of signals transmitted between the nodes. Synchronized voltage measurements at the nodes $N_1$-$N_N$ are used to detect and protect against series arc faults, as explained below, and/or for managing one or more other aspects of energy storage system 200. Synchronized current measurements at the nodes $N_1$-$N_N$ also are used to detect and protect against parallel arc faults, as explained below, and/or for managing one or more other aspects of energy storage system 200. In some embodiments, voltage measurements are synchronized independently of current measurements, so that voltage measurements are not necessarily synchronized with current measurements.

The first example stack embodiment 420 of FIG. 4A is operable according to the first method 350 of FIG. 3A and is operable according to the second method 360 of FIG. 3B. Referring to FIG. 3A and FIG. 4A, when operating according to the first method 350, at step 352 the stack controller 210 of the first example stack embodiment 420 sends a measurement request command over communication bus 262 to command each of the nodes $N_1$-$N_N$ to perform synchronized measurements. More specifically, at step 352, the stack controller 210 transmits a measurement request command over the communication bus segment $262_0$ to node $N_1$. Node $N_1$ in turn, transmits the measurement request commands over the communication bus segment $262_1$ to node $N_2$, and so on until node $N_{N-1}$ transmits the measurement commands over communication bus segment $262_{N-1}$ to node $N_N$.

At step 354, at a prescribed time, each node simultaneously measures one or more DC parameters in response to the measurement request command, e.g., voltage and/or current. The prescribed time is determined to allow adequate time for the measurement request command to propagate sequentially to each node in the stack 420 before the nodes simultaneously measure the commanded parameters. More specifically, at step 354, after each of node $N_1$ through node $N_N$ has received the measurement request command, the nodes $N_1$-$N_N$ synchronously use their ADCs 217-1 to digitally perform the commanded DC measurements at each of the nodes $N_1$-$N_N$. Referring to FIG. 2 and FIG. 4A, in an example embodiment, the host controller 212 provides a master clock signal over timing and control bus 219 to stack controllers of each of the stacks $S_1$-$S_K$, which in turn, provide the master clock signal to the nodes for use to synchronize measurements at the nodes of individual stacks and to synchronize measurements across different stacks of the system 200. The master clock also can be used for time stamping of the synchronized measurements.

In an example stack $S_1$, the nodes $N_1$-$N_N$ delay measurement in response to receipt of a measurement request command until the last node in the ordered sequence, $N_N$, receives the measurement request command. In the example stack $S_1$, the nodes are aware of the total number of nodes in the stack and their sequential locations in the stack. In the first example stack embodiment 420, the nodes are configured to synchronize digitally capturing voltage measurements and to synchronize digitally capturing current measurements, for example, based upon propagation delay in transmission of measurement request command signals between the nodes. In the first example stack embodiment 420, propagation delay is $\Delta t$ between a time when a node receives a voltage measurement request command or a current measurement request command and a time when a next node in the sequence receives the voltage or current measurement request command. Thus, assuming for example, that $N_1$ receives a command at time t0, then $N_2$ receives the command at t0+$\Delta t$, $N_3$ receives the command at t0+2$\Delta t$, and so on, until node $N_N$ receives the command at t0+N$\Delta t$. In the first example stack embodiment 420, to achieve synchronous measurements in response to a measurement command, each node in the sequence delays performing a commanded measurement at least until the last node in the sequence receives the measurement command. More particularly, in the first example stack embodiment 420, $N_1$ delays measurement for at least a time interval N$\Delta t$; $N_2$ delays measurement for at least a time interval (N−1)$\Delta t$, and so on, and node N measure without a $\Delta t$ related delay.

Referring to FIG. 3A and FIG. 4A, at step 356, the time stamped commanded DC measurements are propagated through the nodes of the stack to the stack controller 210. More particularly, within the first example stack embodiment 420, following a synchronous digital capture of the commanded voltage and current measurements, for example, each node transmits a time stamped voltage measurement and a time stamped current measurement to the stack controller 210 via the communication bus 262. For example, $N_1$ transmits its measurements over bus segment $262_1$ to $N_2$, which in turn transmits $N_1$'s measurements over bus segment $262_2$ to $N_3$, and so on until $N_1$'s measurements reach $N_N$, which in turn, transmits $N_1$'s measurements over bus segment $262_N$ to the stack controller 210. Moreover, for example, $N_{N-1}$ transmits its commanded measurements over bus segment $262_{N-1}$ to $N_N$, which in turn, transmits $N_{N-1}$'s measurements over bus segment $262_N$ to the stack controller. Node $N_N$, for example, transmits its measurements directly to the stack controller 210 over bus segment $262_N$. An example stack controller 210 at each stack processes voltage and current measurements, as explained below, received from the respective nodes within its stack to identify occurrences of arc fault conditions within its stack.

Referring to FIG. 3B and FIG. 4A, when operating according to the second method 360, at step 362 each node performs routine periodic voltage, current and temperature measurements, for example, to determine state of charge estimates for the battery 104 and/or to dynamically control charge and discharge of the battery 104. Each node also optionally time stamps and stores at least a portion of the periodic measurements to its local storage 217-3. In certain embodiments, the host controller 212 provides a master clock signal over timing and control bus 219 to stack controllers 210 of each of the stacks $S_1$-$S_K$, which in turn, provide the master clock signal to the nodes for use to time stamp the saved measurements and to synchronize collection of the saved measurements across nodes of an individual stack and across different stacks. In some embodiments, at step 364, the stack controller 210 of the first example stack embodiment 420 sends a measurement request command over communication bus 262 to command each of the nodes $N_1$-$N_N$ to perform synchronized collection of measurements made previously by the nodes $N_1$-$N_N$ as described above with reference to step 352. The measurement request command is propagated node-to-node with the propagation delays described above. At step 366, each node in the first example embodiment of a stack 420 selects one or more saved measurements that were performed within a prescribed time window or at a prescribed time. Assuming, for example, that each node performs one DC voltage measurement and one DC current measurement at 5-10 millisecond intervals, then a time window having a duration of 5-10 milliseconds can encompass one voltage and one current measurement and a time window having a duration of 50-100 milliseconds can encompass ten voltage and ten voltage measurements, for example. At step 368, the time stamped measurements collected in response to the command are propagated through the nodes of the stack to the stack controller 210 as described above with reference to step 356.

Figure 4B:
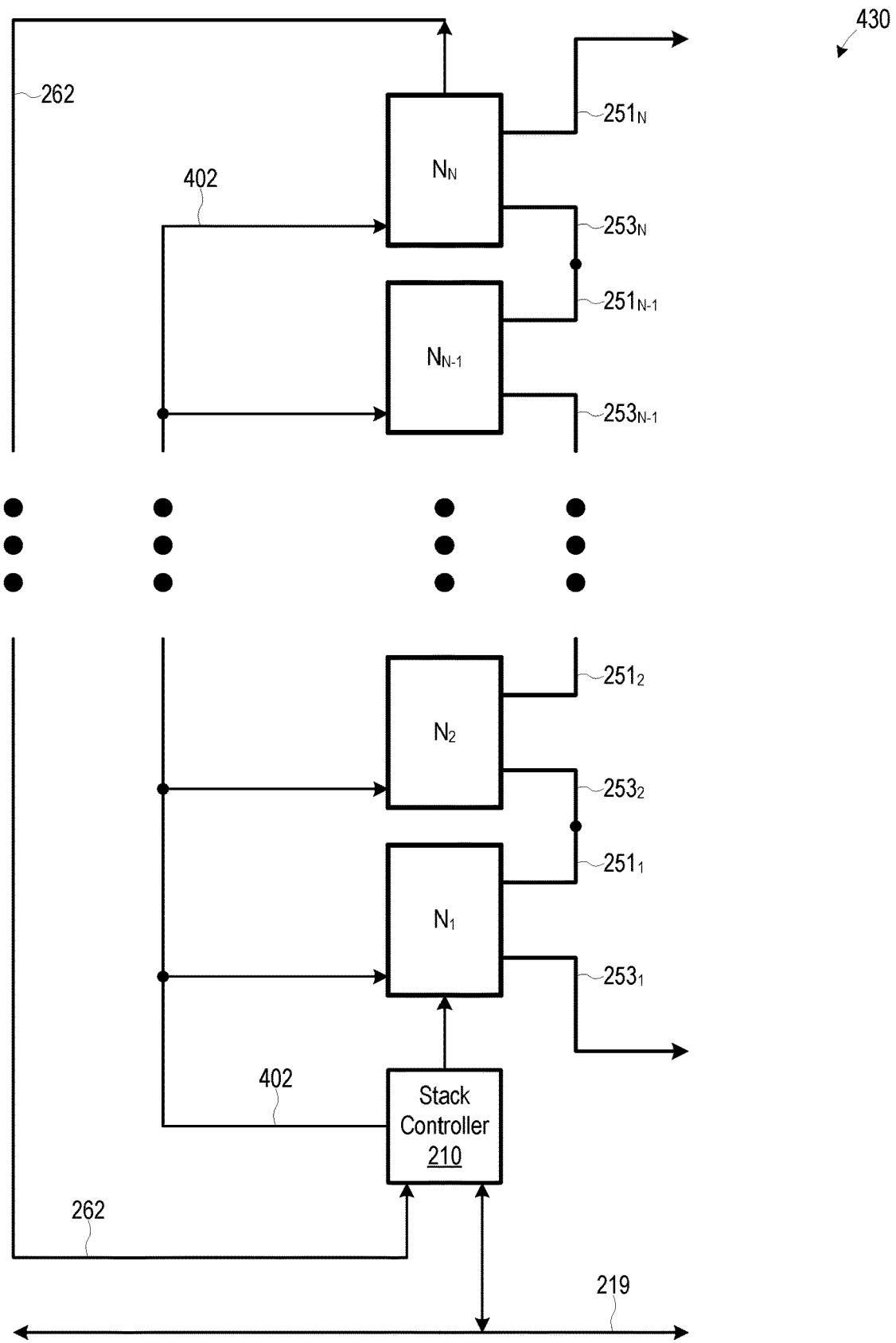
FIG. 4B is an illustrative block diagram showing nodes of a second example embodiment of a stack of FIG. 2.

FIG. 4B is an illustrative block diagram showing nodes $N_1$-$N_N$ of a second example embodiment of a stack 430 of FIG. 2. The second example embodiment of a stack 430 includes a synchronous command bus 402 coupled to synchronously provide measurement request commands to multiple nodes without propagation delay, although a communication bus 262 that couples signals between the nodes experiences propagation delays like those described above with reference to FIG. 4A. The synchronous bus 402 also acts as an alarm line to transmit alarm signals such as to force the energy storage system into bypass mode, floating mode, or safe mode, or to suddenly change from charging to discharging or back again, for example. An advantage of this alternative implementation is ease of synchronization and faster results. Measurements still are transmitted along the daisy chain bus (N*Delta t) but there is no need for a measurement request command to also propagate through the bus (another N*Delta t). To avoid unnecessary complexity of presentation and to promote illustrative clarity of explanation, components of the second example embodiment of a stack 430 that correspond to components of the first example embodiment of a stack 420 will not be described again.

The second example stack embodiment 430 of FIG. 4B is operable according to the first method 350 of FIG. 3A and is operable according to the second method 360 of FIG. 3B. Referring to FIG. 3A and FIG. 4B, when operating according to the first method 350, at step 352 the stack controller 210 of the second example stack embodiment 430 sends a measurement request command over the synchronous command bus 402 to provide a measurement request command simultaneously to nodes $N_1$-$N_N$. At step 354, at a prescribed time, the nodes $N_1$-$N_N$ simultaneously measure one or more parameters in response to the measurement request command, e.g., voltage and/or current. The prescribed time can be instantaneous upon receipt of the measurement request command over the bus 402, for example. The host controller 212 provides a master clock signal over timing and control bus 219, which is used for time stamping of the synchronized measurements. At step 356, the time stamped measurements performed in response to the command are propagated through the nodes of the stack to the stack controller 210 as described above. In certain embodiments, measurements performed in one stack $S_1$-$S_K$ are synchronized with measurements performed in each other stack $S_1$-$S_K$, such as based on a master clock signal from host controller 212.

Referring to FIG. 3B and FIG. 4B, when operating according to the second method 360, at step 362 the nodes $N_1$-$N_N$ perform routine periodic voltage, current and temperature measurements, such as to determine state of charge estimates for the battery 104 and/or to dynamically control charge and discharge of the battery 104 as described above. The host controller 212 provides a master clock signal over timing and control bus 219, which is used for time stamping of the measurements. At step 364, the stack controller 210 of the second example stack embodiment 430 sends a measurement request command over the synchronous command bus 402 to provide a measurement request command simultaneously to nodes $N_1$-$N_N$. At step 366, at a prescribed time, each node selects one or more saved measurement, e.g., voltage and/or current, in response to the measurement request command. More particularly, at step 366, each node in the second example embodiment of a stack 430 selects one or more saved measurements that were performed within a prescribed time window or at a prescribed time. In some embodiments, measurements performed in a prescribed time window might not be performed at the same time, such as due to propagation delays or processing delays. In such cases, saved measurements are optionally aligned in time, such as by using an interpolation technique. At step 368, the selected measurements with time stamps are propagated through the nodes of the stack to the stack controller.

Figure 4C:
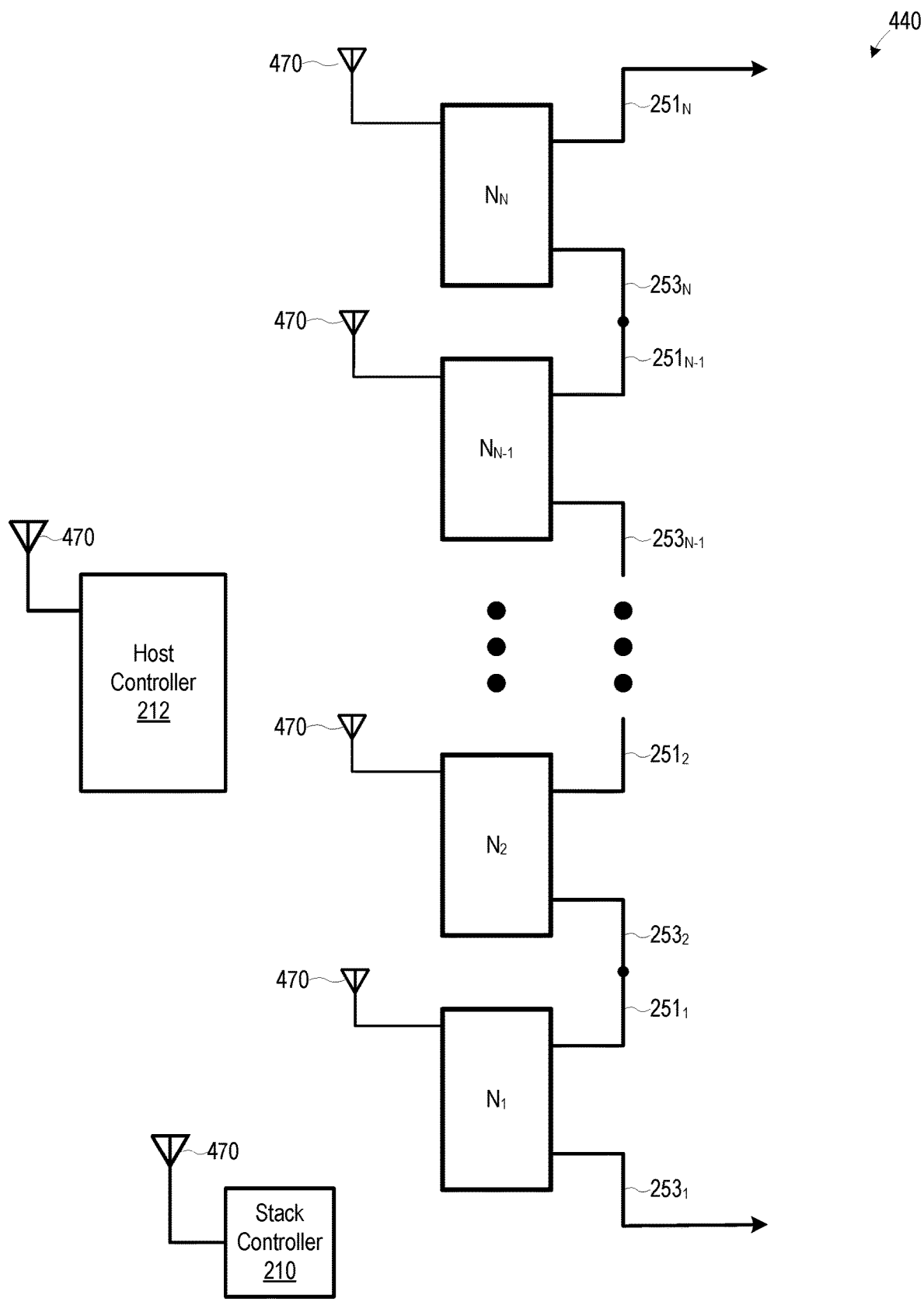
FIG. 4C is an illustrative block diagram showing nodes of a third example embodiment of a stack.

FIG. 4C is an illustrative block diagram showing nodes $N_1$-$N_N$ of a third example embodiment of a stack 440. The nodes $N_1$-$N_N$, stack controller 210 and host controller 212 of the third example stack embodiment 440 include wireless transceivers 470 for wireless communication among them. Wireless communication supplants the synchronous command bus 402 and supplants the communication bus 262, in this embodiment. In an example system 400, the nodes, stack controller and the host controller are configured to operate as a wireless mesh communications area network. The third example stack embodiment 440 of FIG. 4C is operable generally in accordance with the first method 350 of FIG. 3A and is operable generally in accordance with the second method 360 of FIG. 3B, although the transceivers 470 at the nodes may obviate the need to propagate signals sequentially between nodes. Instead, nodes can communicate directly, wirelessly, with the stack controller 210, for example, in some embodiments. Persons skilled in the art will understand the applicability of the first and second methods 350, 360 based upon the above explanations with reference to FIGS. 4A-4B, and therefore, to avoid unnecessary complexity of presentation and to promote illustrative clarity of explanation, details of application of the first and second processes 350, 360 are not set forth with reference to FIG. 4C.

Stack-Level Series Arc Fault Detection

Figure 5A:
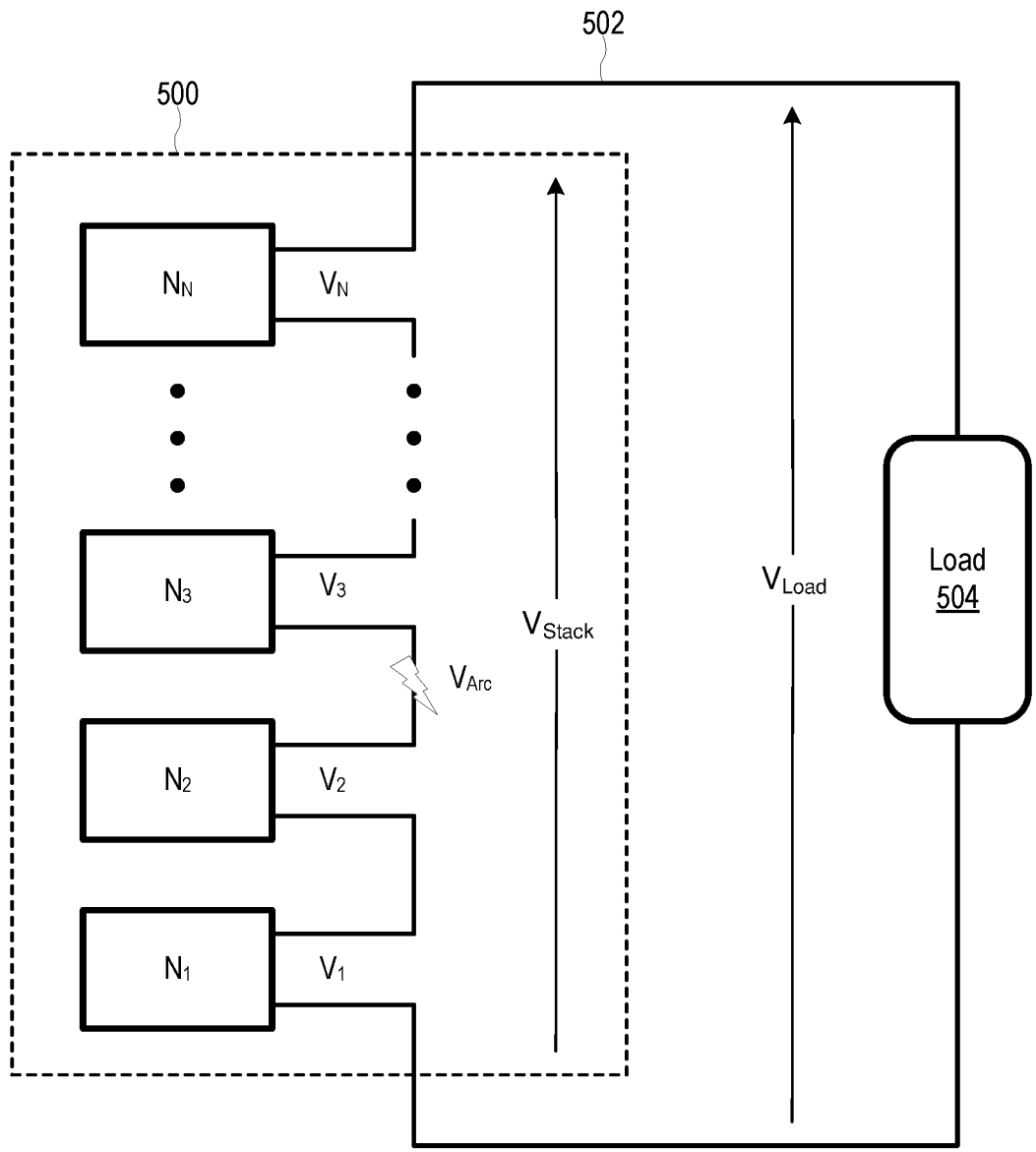
FIG. 5A is an illustrative diagram of an example stack including multiple nodes showing an occurrence of a stack-level series arc fault within the stack.

FIG. 5A is an illustrative diagram of an example BMS stack 500 including multiple nodes $N_1$-$N_N$ showing an occurrence of a stack-level series arc fault within the stack. A series arc is the result of the failure of the intended continuity of a conductor or connector in an electrical circuit. As used herein, a stack-level series arc fault refers to an arc within an individual stack instead of in the connections between stacks. The stack 500 is coupled in parallel with an electrical load 504. Each node $N_1$-$N_N$ produces a corresponding node output voltage $V_1$-$V_N$, which are coupled in series. The series-coupled node voltages $V_1$-$V_N$ are coupled by a conductor network 502 in parallel with the load 504. During normal operation when no series arc fault occurs within the stack 500, a sum of the node voltages within the stack 500 matches a setpoint voltage for the stack and is consistent with, e.g. equals, a measured voltage for the stack.

$$V_{STACK} = V_1 + V_2 + V_3 + \ldots + V_N$$

However, an occurrence of a series arc fault at a node within the stack 500 adds a series voltage element to the stack voltage, $V_{STACK}$. An occurrence of a series arc fault will cause $V_{STACK}$ across the stack 500 to be greater than or less than the setpoint sum of the voltages $V_1 \ldots V_N$ across the individual nodes $N_1$-$N_N$ of the stack 500 and to be greater than or less than a measured sum of $V_1 \ldots V_N$ across the individual nodes $N_1$-$N_N$ of the stack 500. For example, if a series arc fault voltage $V_{ARC}$ occurs between node $N_2$ and node $N_3$ within the stack 500 then, $$V_{STACK} = V_1 + V_2 + V_3 + \ldots + V_N + V_{ARC}$$

Figure 5B:
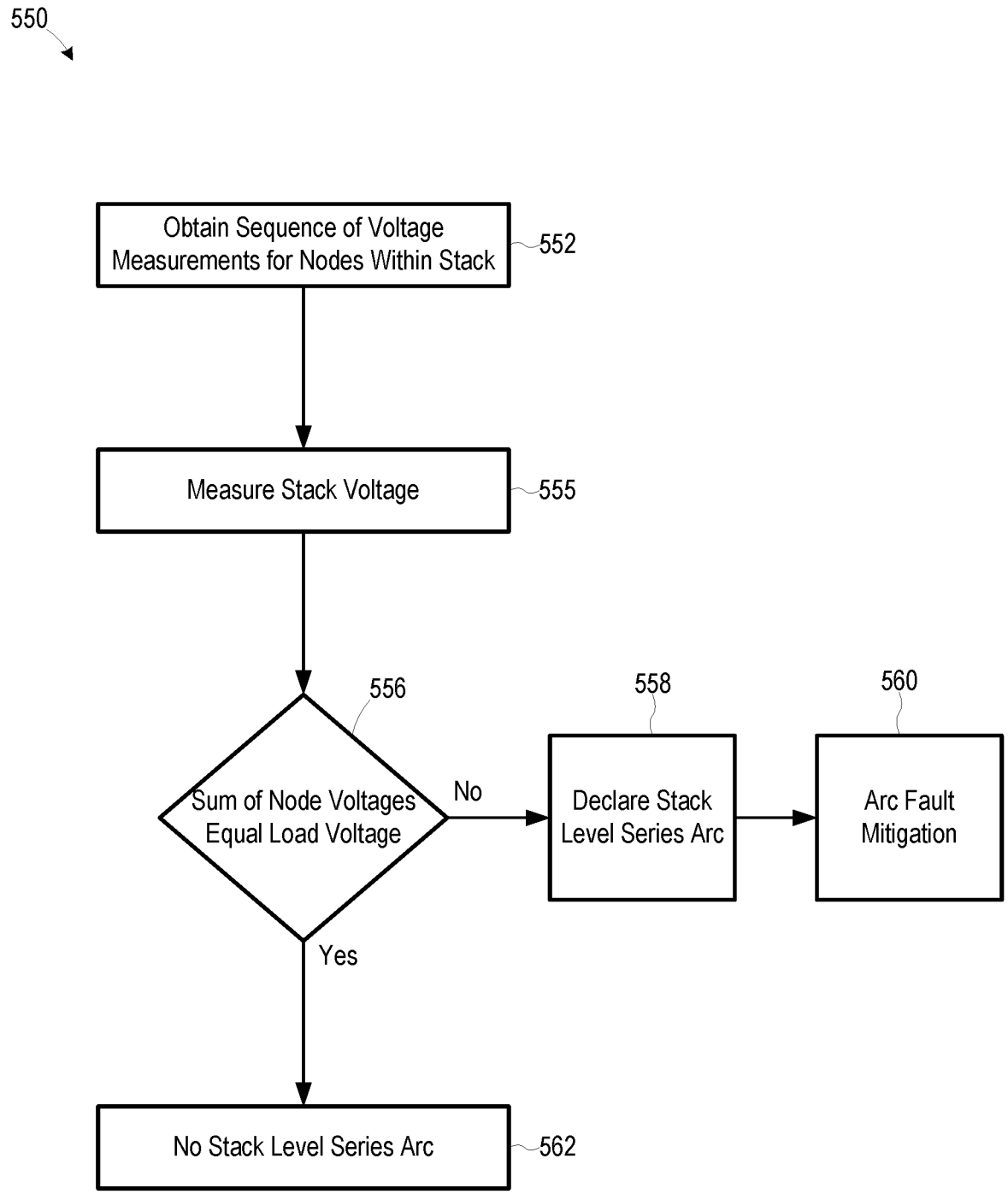
FIG. 5B is an illustrative flow diagram representing a method to detect and react to a series arc fault within the stack of FIG. 5A.

Thus, in this illustrative example, a series arc voltage $V_{ARC}$ within a stack causes voltage, $V_{STACK}$, across the stack 500 to not match the sum of the node output voltages of the stack. FIG. 5B is an illustrative flow diagram representing of a method 550 to detect and react to a series arc fault within the stack of FIG. 5A. Code instructions $C_{AD1}$ and $C_{AD2}$ are used to configure a stack's stack controller (not shown) to perform the method of FIG. 5B. At step 552 a voltages measurement value is obtained for each node of the stack. An example step 552 can involve the first method 350 of FIG. 3A resulting in obtaining node voltage measurements that are synchronized across nodes with a measurement command signal. An alternative example step 552 can involve the second method 360 of FIG. 3B resulting in obtaining node voltage measurements that contain measurements that fall within a common time window or a performed at a common time. In some embodiments, the node voltage measurements obtained in step 552 are filtered, such as by using one or more low-pass filters, to remove noise injected by power conversion circuitry and associated harmonics that may otherwise interfere with arc fault detection.

At step 555 a stack voltage $V_{stack}$ is measured synchronously with the synchronous node voltage measurements. Decision step 556 determines whether the summation of the measured node voltages of the stack is consistent with, e.g. matches, the measured stack voltage. At step 558 a stack-level series arc fault is declared, i.e. an occurrence of a voltage $V_{ARC}$, in response to a determination that the summation of the measured node voltages $V_1 + V_2 + V_3 + \ldots + V_N$ does not match the stack voltage and differs from the stack voltage by at least a prescribed threshold amount. In an example system 500, the prescribed difference is large enough to indicate an occurrence of a series arc as opposed to normal variation in stack voltage level that can occur due to the voltage drop across resistance in series with the nodes from connectors and wires, for example. In addition, the prescribed difference may be large enough to account for normal variations due to measurement tolerance. In an example system 500, with a stack voltage in a range 500V-1000V, a 1%, 2% or even up to 5% difference or a several volt up to about 20V difference between a sum of node voltages and stack voltage sustained for at least a prescribed minimum time interval such as at least one second typically is indicative of an occurrence of a stack-level series arc fault. In some other embodiments, decision step 556 detects that there is a mismatch between the sum of measured node voltages and the measured stack voltage only if the mismatch persists for a predetermined amount of time or a predetermined number of measurement cycles.

In still other embodiments, at least some of the voltages considered in step 556 are filtered to achieve a desired arc fault detection profile. For example, in particular embodiments, (a) an error value equal to a difference between the sum of the measured node voltages and the measured stack voltage is determined, (b) the error value is filtered by a low-pass filter, and (c) a stack-level series arc fault is determined in response to the filtered error value meeting or exceeding a prescribed threshold amount, in step 556. The low-pass filter weights the arc fault detection profile by increasing required magnitude or duration of an arc fault voltage for detection in step 556.

At step 560, nodes are controlled so as to safely extinguish the arc. This can include isolating any energy storage cells that can feed power to the arc while providing the desired node output characteristic (floating, shorted, low-power or power-limited state) and with or without emergency cell discharge, as needed. These fault reactions are discussed in more detail below. Alternately or additionally, stack 500 could be controlled to discharge its batteries into load 204 or into another stack, such as in a manner which limits discharge current magnitude to a safe value, to help extinguish the arc. The method 550 repeats periodically. During active fault management in an example system 500, the method 550 is repeated multiple times per second, every few seconds, or every few minutes, for example. Alternatively, the method 550 can be repeated less frequently, on the order of once per day at power up to avoid overly taxing computer resources.

System-Level Series Arc Fault Detection

Figure 6A:
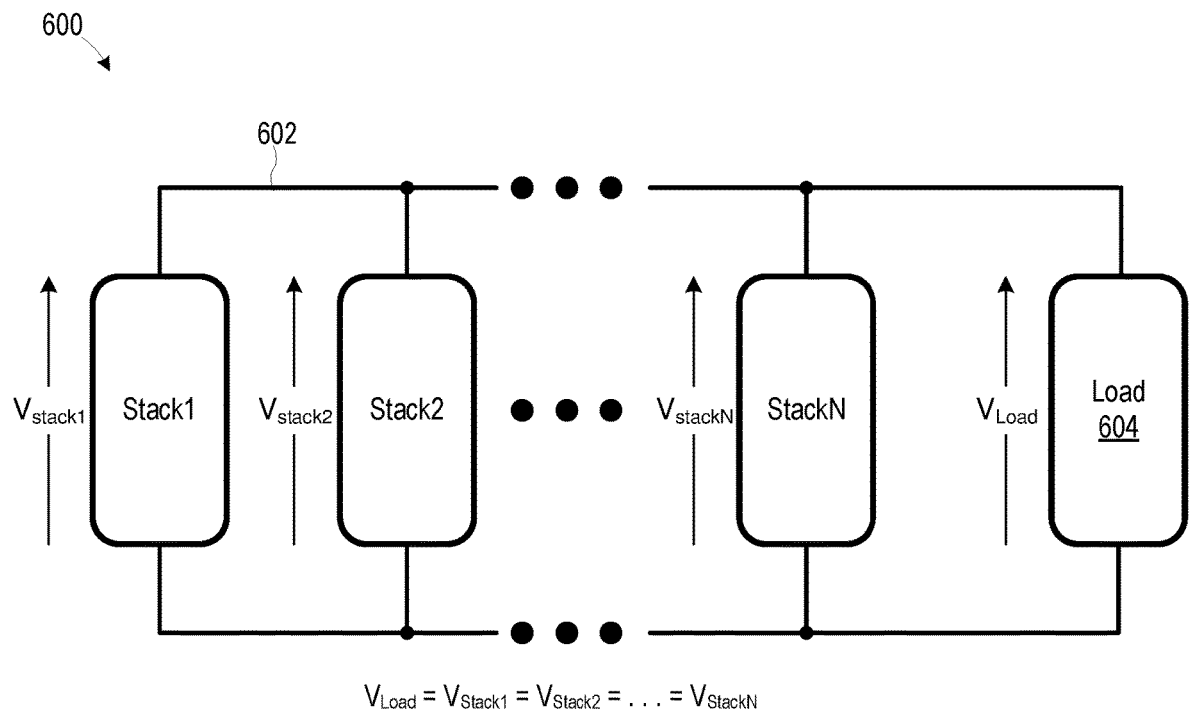
FIG. 6A is an illustrative diagram of an example energy storage system during normal operation with no arc fault occurrences.
Figure 6B:
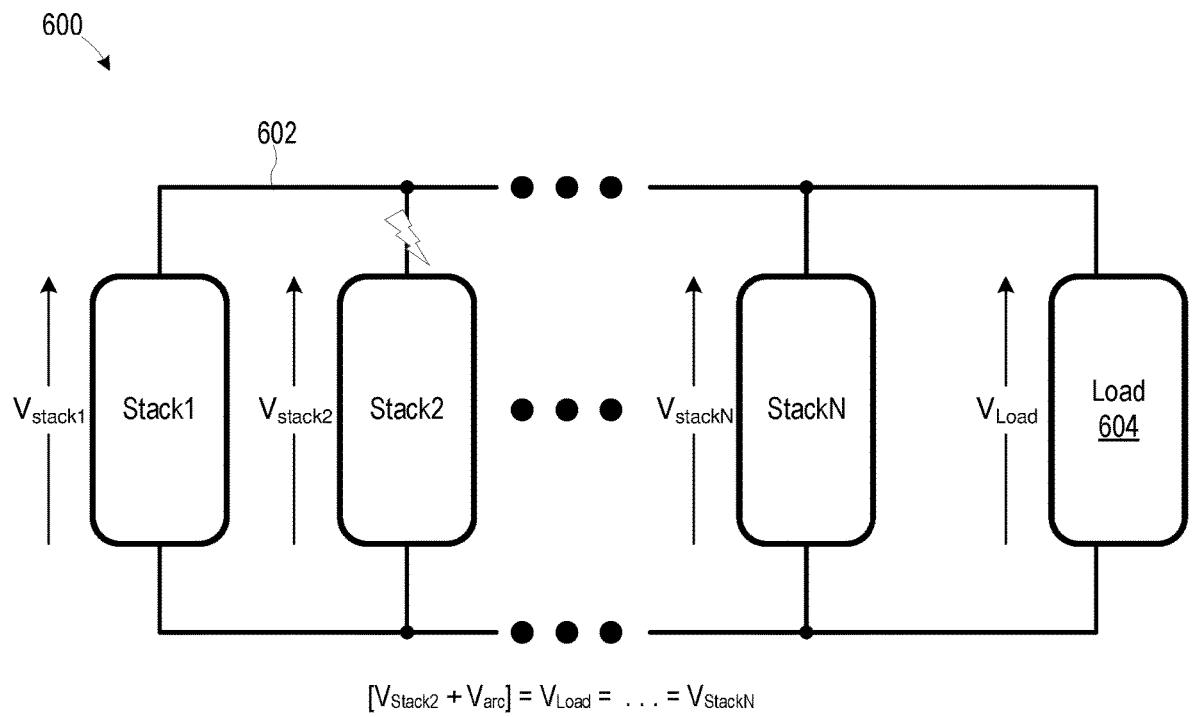
FIG. 6B is an illustrative diagram of the example energy storage system of FIG. 6A during an occurrence of a system-level series arc fault.

FIG. 6A is an illustrative diagram of an example energy storage system 600 during normal operation with no arc fault occurrences. FIG. 6B is an illustrative diagram of the example energy storage system 600 of FIG. 6A during an occurrence of a system-level series arc fault. As used herein, a system-level series arc fault refers to a series arc fault that occurs outside of a node stack in an electrical connection between node stacks or in an electrical connection between the node stacks and a load. Each stack includes one or more nodes, and the stack voltage for a stack is a sum of measured voltages of the nodes of the stack. Alternately, the stack voltage is a measured voltage across the stack as described above with reference to FIGS. 5A-5B. The stack voltages can be summed locally at stack controllers (not shown) of individual stacks and be reported to a host controller, or alternatively the node voltages at the individual stacks can be reported to a host controller (not shown), which sums node voltages received from individual stacks to determine individual stack voltages. The stack voltages and a load voltage are compared at a host controller (not shown). The system 600 includes multiple BMS stacks, Stack1, Stack2, Stack3 coupled in parallel by a conductor network 602 with an electrical load 604. To avoid unnecessary complexity of presentation and to promote illustrative clarity of explanation, details of stacks are omitted. However, it will be appreciated that an example system 600 can have a topology like that of system 200 of FIG. 2, for example. During normal operation represented by FIG. 6A, when no series arc fault present, the stacks have matching stack voltages across them, which matches a voltage $V_L$ across the load:

$$V_{LOAD} = V_{STACK1} = V_{STACK2} = \ldots = V_{STACKN}$$

However, an arc fault in series with one of the stacks will result in a voltage reading that is different (higher or lower) than the voltages across the other stacks and different from the voltage $V_L$ across the load. For example, as represented by FIG. 6B, if a series arc fault $V_{ARC}$ occurs in series with Stack2 then, $$V_{LOAD} = V_{STACK1} = [V_{STACK2} + V_{ARC}] \ldots = V_{STACKN}$$

Thus, in this illustrative example, a system-level arc fault, with voltage $V_{ARC}$ across a stack, causes a voltage measured across Stack2, $V_{STACK2}$, to be lower than the other stack voltages and the load voltage, $V_{LOAD}$. The arc, for example, can be in a wire itself or the connections from a wire to the stack or from a wire to the bus. In the event that one of the stack voltages does not match the other stack voltages, the host controller can determine that a system-level series arc fault has occurred at that mismatching stack. In this example, the host is configured to identify the location of the arc as being in an electrical connection between Stack2 based upon a determination at the host that the voltage across Stack2 does not match voltages of the other stacks and does not match a load voltage, $V_{LOAD}$. In an example system, a host controller (not shown) can send a command to the stack controller (not shown) of the mismatching stack to cause that stack to control the nodes of the stack so as to extinguish the arc while the other stacks remain operational, for example. Mitigation techniques can include putting the stack into a disconnect state or a low-power safe state, while optionally discharging the cells to improve safety, for example. In one example, the batteries 104 can be isolated from the nodes with the node outputs floating so as to extinguish the current path for the series arc. Moreover, alternatively, for example, the nodes of the mismatching stack can be transitioned to a safe mode in which technicians can more safety, explained below, trouble-shoot to locate the source of the system-level series arc fault.

Figure 6C:
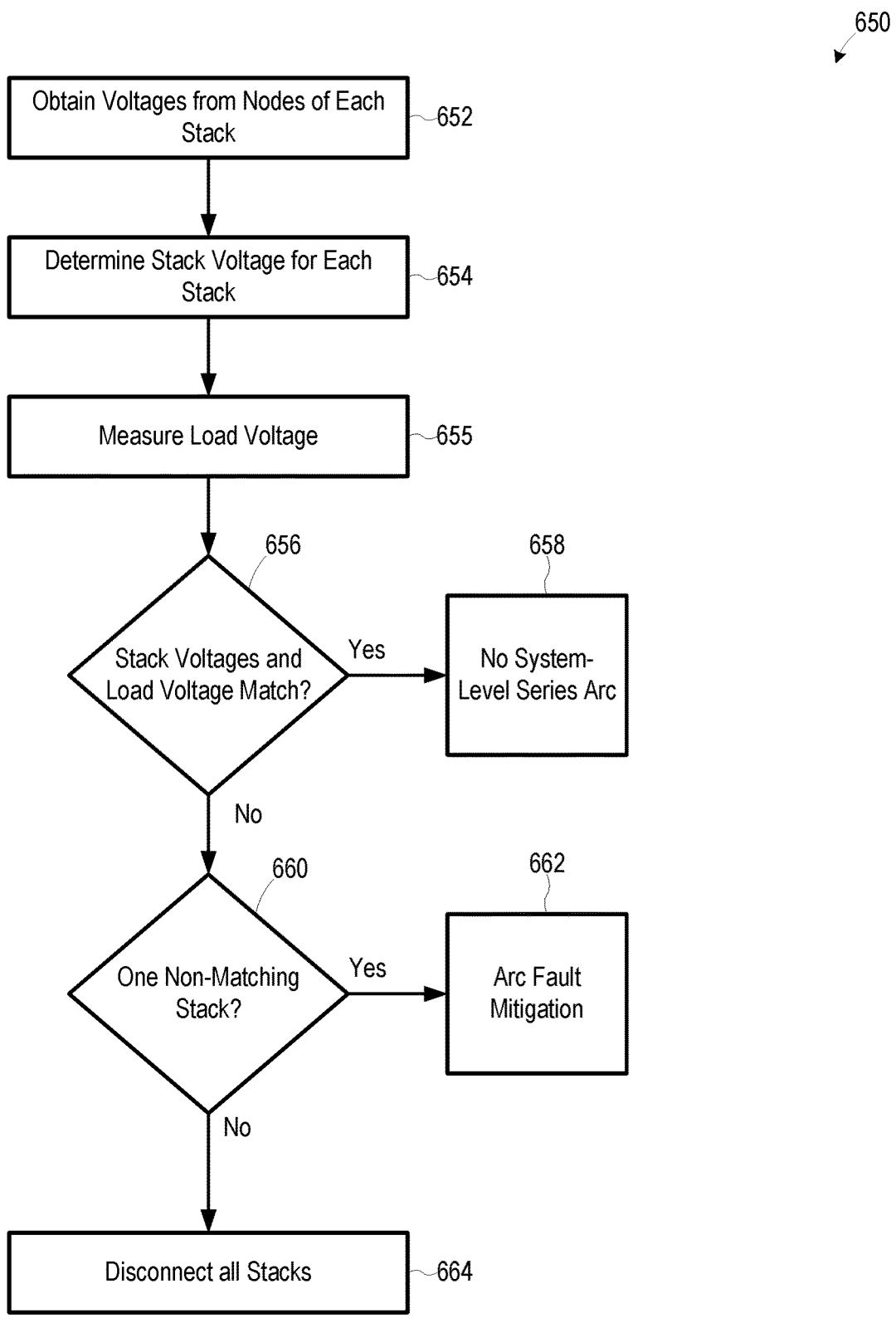
FIG. 6C is an illustrative flow diagram representing a method to detect and react to the system-level series arc fault voltage of FIG. 6B.

FIG. 6C is an illustrative flow diagram representing a method 650 to detect and react to the system-level series arc fault voltage of FIG. 6B. Code instructions $C_{AD1}$ and $C_{AD2}$ are used to configure the stack controllers (not shown) and a host controller (not shown) of the system 600 of FIGS. 6A-6B to cooperate to perform the method of FIG. 6C. At step 652, node voltages measurements are obtained for each node of each stack, Stack1, Stack2, Stack3. An example step 652 can involve the first method 350. An alternative example step 652 can involve the second method 360. At step 654, a summation of the measured voltages is determined for each stack to determine stack voltages $V_{STACK1}$, $V_{STACK2}$, $V_{STACK3}$, for the stacks. In an alternate embodiment, steps 652 and 654 are replaced with a step of obtaining respective measured stack voltages for each stack. At step 655 a load voltage $V_L$ is measured synchronously with the stack voltage measurements.

In some embodiments, the voltage measurements obtained in steps 654 and 655 are filtered, such as by using one or more low-pass filters, to remove noise injected by power conversion circuitry and associated harmonics that may otherwise interfere with arc fault detection. In certain embodiments, one or more low-pass filters that are used to filter measured load voltage values have substantially the same bandwidth as one or more low-pass filters that are used to filter stack voltage measurements and/or node voltage measurements. In this document, first and second low-pass filters are considered to have substantially the same bandwidth if a bandwidth of the first low-pass filter differs from a bandwidth of the second low-pass filter by no more than ten percent.

Decision step 656 determines whether the stack voltages match one another and match the load voltage. In some embodiments, at least some of the voltages considered in decision step 656 are filtered to achieve a desired arc fault detection profile, such as in a manner analogous to that discussed above with respect to step 556 of FIG. 5B. Step 658 determines that there is no system-level series arc in response to a determination that all stack voltages match one another and match the load voltage. Decision step 660 determines whether a single stack voltage mismatches the other stack voltages. Step 662, in response to a system-level series arc fault, nodes are controlled so as to safely extinguish the arc. This can include isolating any energy storage cells that can feed power to the arc while providing the desired node output characteristic (floating, shorted, low-power or power-limited state) and with or without emergency cell discharge, as needed. Step 664 electrically isolates each of the nodes of each stack from all other stacks and from the load in response to a determination that more than a single stack voltage mismatches other stack voltages or that the load voltage mismatches the stack voltages. The method 650 repeats periodically. During active fault management in an example system 600, the method 650 is repeated multiple times per second, every few seconds, or every few minutes, for example. Alternatively, the method 650 can be repeated less frequently, on the order of once per day at power up to avoid overly taxing computer resources.

In some embodiments, stack controllers 210 and/or host controller 212 perform both of methods 550 and 650, either sequentially or concurrently, to achieve hierarchical series arc fault detection. More specifically, stack controllers 210 and/or host controller 212 perform method 550 to realize a first level of series arc fault detection, i.e. stack-level series arc fault detection to detect a series arc fault within a stack. Additionally, stack controllers 210 and/or host controller 212 perform method 650 to realize a second level of series arc fault detection, i.e. system-level series arc fault detection to detect a series arc fault outside of the stacks. Consequently, these embodiments are advantageously capable of detecting a series arc fault at any location in the energy storage system 200, i.e. both within the stacks and outside of the stacks. Additionally, methods 550 and 650 optionally share measured stack voltage values and/or measured node voltage values, which helps minimize measurement acquisition and processing requirements. Furthermore, the concept of hierarchical series arc fault detection could be extended to include additional levels. For example, in some alternate embodiments where the stacks include multiple modules, series arc fault detection is performed at a module-level, as well as at the aforementioned stack-level and system-level, to achieve hierarchical series arc fault detection.

Stack-Level Parallel Arc Fault Detection

Figure 7A:
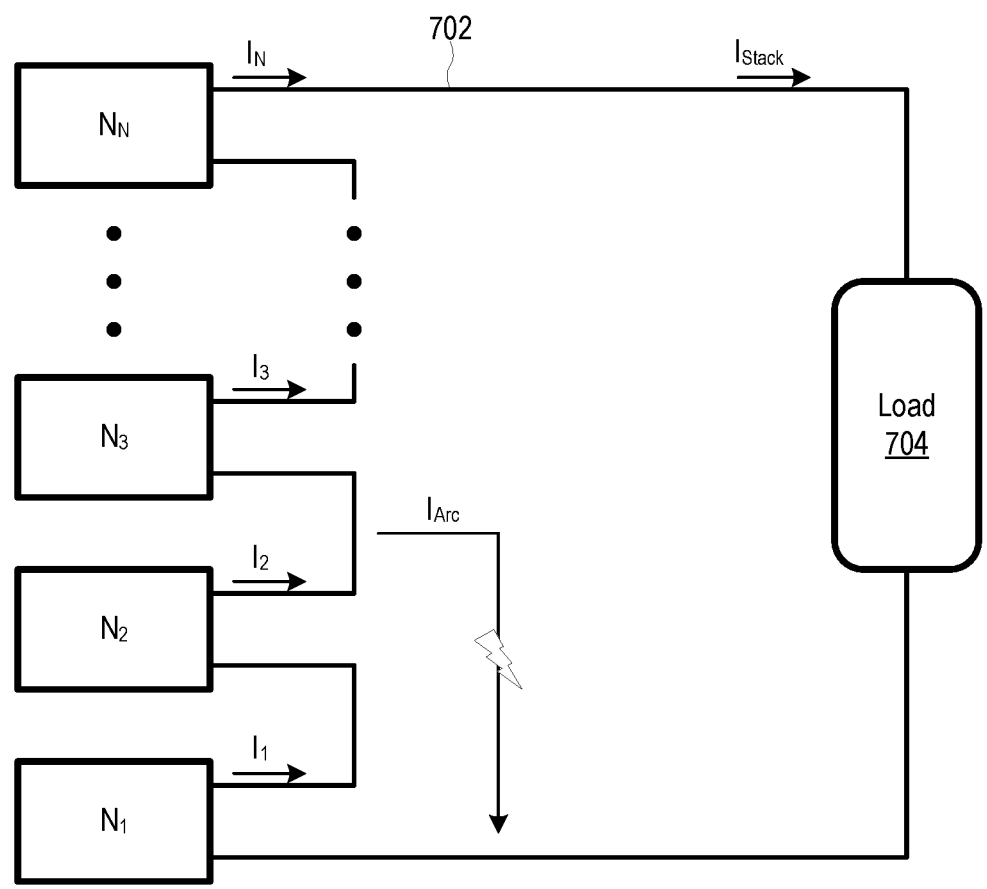
FIG. 7A is an illustrative diagram of an example stack including multiple nodes showing an occurrence of a stack-level parallel arc fault within the stack.

FIG. 7A is an illustrative diagram of an example BMS stack 700 including multiple nodes $N_1$-$N_N$ showing an occurrence of a stack-level parallel arc fault within the stack. To avoid unnecessary complexity of presentation and to promote illustrative clarity of explanation, details of the stack 700 are omitted. However, it will be appreciated that an example stack 700 can have a topology like that of stack $S_1$ of FIG. 2, for example. As used herein, a stack-level parallel arc fault refers to an arc from a point inside the stack to another point inside the stack or to electrical ground. The stack 700 is coupled in parallel with an electrical load 704. Each node $N_1$-$N_N$ produces a corresponding node output current $I_1$-$I_N$. The series-coupled nodes are coupled by a conductor network 702 in parallel with the load 704. During normal operation when no parallel arc fault occurs within the stack 700, a sum of the currents within the stacks $I_1$-$I_N$ match.

$$I_{STACK} = I_1 = I_2 = I_3 = \ldots = I_N$$

However, a parallel arc fault current within the stack 700 results in a parallel arc fault current $I_{ARC}$ that can add to or subtract from some of the currents within the stack. For ground faults and parallel arc faults within a stack, the arc fault current $I_{ARC}$ results in node currents no longer being equal. For example, if a sustained parallel arc fault $I_{ARC}$ occurs between nodes $N_2$ and $N_3$ then, $$I_1 = I_2 \neq I_3 = \ldots = I_N, \text{ and}$$

$$I_{STACK} = I_N = I_3 = I_2 + I_{ARC} = I_1 + I_{ARC}$$

It will be appreciated that a direction of an arc fault current can vary, and therefore, it could add or subtract current from nodes; the above illustrative example assumes addition of the arc fault. Thus, in this illustrative example, an occurrence of a stack-level parallel current fault $I_{ARC}$ causes the current through at least one of the nodes to not match current through other nodes.

A node location, within a stack, of a stack-level parallel arc fault is determined by an arc fault location process that includes steps of comparing currents of a sequence of adjacent nodes within the stack. A stack's stack controller is configured to perform an arc fault location process that determines whether current in adjacent pairs of nodes matches. The process identifies a node where current within the node does not match current within a node adjacent to that node. A node location in a sequence of nodes where the current changes from matching the current of its adjacent nodes to not matching at least one of its adjacent nodes is determined to be a node location of a stack-level parallel arc fault. Therefore, a location of a stack-level parallel arc fault within the stack is determined by finding where in the stack the current changes. For example, referring to FIG. 7A, $I_1 = I_2$ and $I_3 = I_4 = \ldots = I_N$. However, $I_2 = I_3 + I_{ARC}$. In this example, there is extra current flowing from the connection between $N_2$ and $N_3$ to another point in the stack, and an arc is determined to be occur at either node $N_2$ or node $N_3$.

Figure 7B:
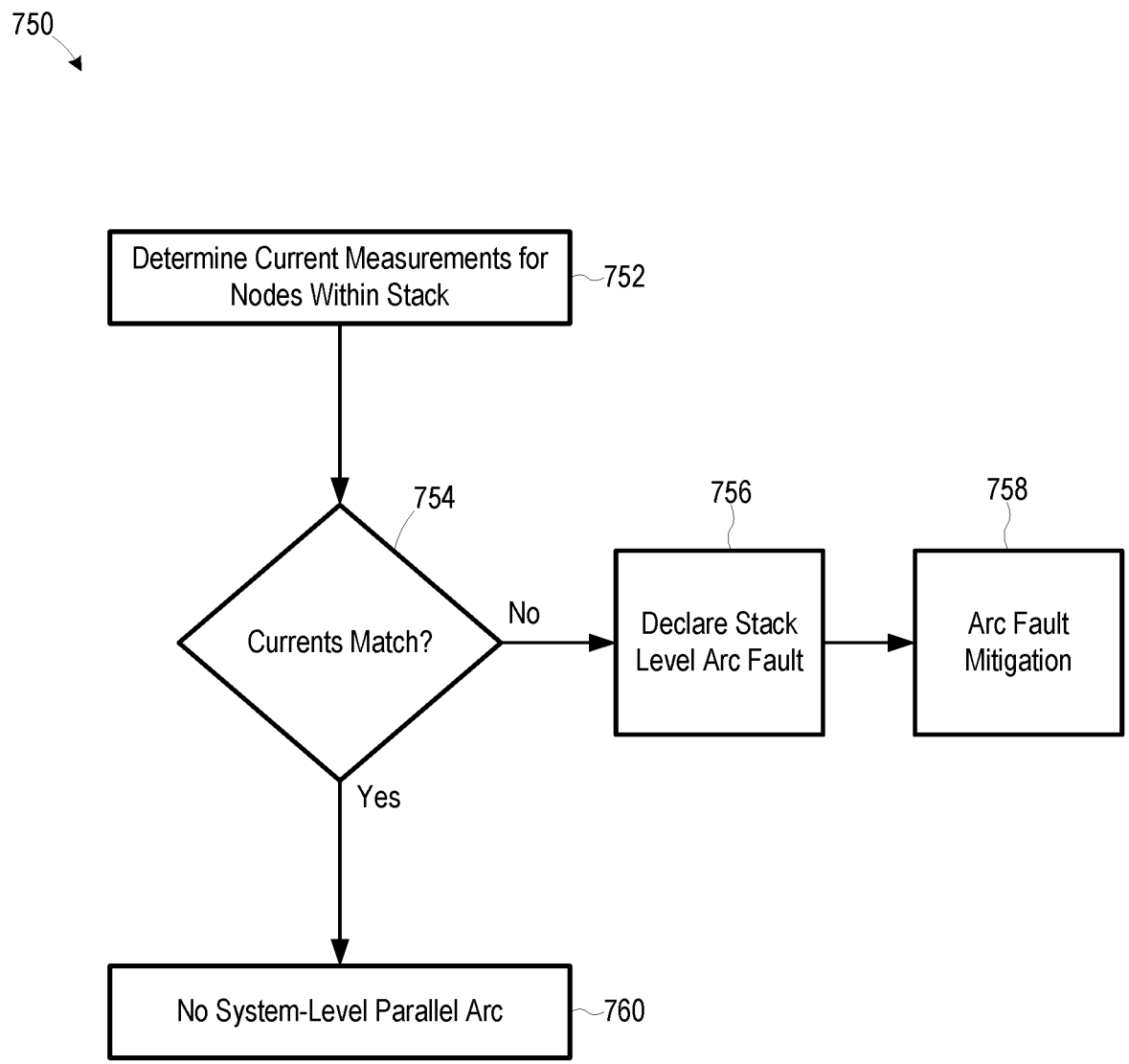
FIG. 7B is an illustrative flow diagram representing a method to detect and react to a stack-level parallel arc fault current within the stack of FIG. 7A.

Thus, a location of the parallel current can be determined to be at a point in the stack of nodes where a series current discontinuity occurs, that is where a current magnitude changes, e.g., at a juncture between node $N_2$ and node $N_3$ in the example. The arc fault location process can be used, for example, by a maintenance technician to more rapidly locate and repair the fault. In an example system, the stack's stack controller can send a command to the nodes of the stack to isolate their battery devices and thereby de-energize the nodes and extinguish the arc. Moreover, alternatively, a subset of the nodes of stack 700 can be transitioned to a safe mode in which technicians can more safely trouble-shoot to locate the source of the stack-level parallel arc fault. FIG. 7B is an illustrative flow diagram representing of a method 750 to detect and react to a stack-level parallel arc fault current within the stack of FIG. 7A. Code instructions $C_{AD1}$ and $C_{AD2}$ are used to configure a stack controller (not shown) and a host controller (not shown) associated with the stack of FIG. 7A to perform the method of FIG. 7B. At step 752, node current measurements are obtained for each node of the stack. For example, the current at each DC-DC 106 converter is measured. An example step 752 can involve the first method 350 of FIG. 3A resulting in obtaining node currents that are synchronized across nodes with a measurement command signal. An alternative example step 752 can involve the second method 360 of FIG. 3B resulting in obtaining node currents that contain measurements that fall within a synchronized time window or at a synchronized time.

In some embodiments, the node currents are estimated instead of being directly measured. For example, measured battery 104 current may be scaled by a transfer ratio of a respective DC-DC converter 106 to obtain estimated node current. DC-DC converter 106 efficiency may be considered when determining estimated node current to improve estimation accuracy. In some embodiments, the node current measurements obtained in step 752 are filtered, such as by using one or more low-pass filters, to remove noise injected by power conversion circuitry and associated harmonics that may otherwise interfere with arc fault detection.

Decision step 754 determines whether all measured node currents match. In an example stack 700, a determination of not matching is reached in response to a one percent (1%) or greater, a two percent (2%) or greater or even a five percent (5%) or greater difference for a duration of up to one second or more. Current measurements are often no more accurate than one percent (1%) or so, although measurement accuracy may improve with use of precision equipment or new technology. Additionally, dynamic node operation may also cause discrepancy in node currents. Otherwise, these currents should very closely match. Thus, it will be appreciated that we are, in other words, simply avoiding "measurement error" in setting a one percent (1%), two percent (2%), or five percent (5%) error. At step 756 a stack-level parallel arc fault is declared in response to a determination that not all measured node currents match. In some other embodiments, decision step 754 detects that there is a mismatch in node currents only if the mismatch persists for a predetermined amount of time or a predetermined number of measurement cycles.

In some embodiments, at least some of the currents considered in step 754 are filtered to achieve a desired arc fault detection profile. For example, in particular embodiments, (a) an error value equal to a difference between node currents is determined, (b) the error value is filtered by a low-pass filter, and (c) a stack-level parallel arc fault is detected in response to the filtered error value meeting or exceeding a prescribed threshold amount, in step 754. The low-pass filter weights the arc fault detection profile by increasing required magnitude or duration of an arc fault current for detection in step 754.

At step 758, in response to a declaration of a stack-level parallel arc fault, isolation switches (not shown) of the nodes are controlled so as to safely extinguish the arc. This can include isolating any batteries that can feed power to the arc while providing the desired node output characteristic (floating, shorted, low-power or power-limited state) and with or without emergency cell discharge, as needed. At step 760 a determination of no stack-level parallel arc fault is declared in response to a determination that the measured node currents of the stack all match one another.

System-Level Parallel Arc Fault Detection

Figure 8A:
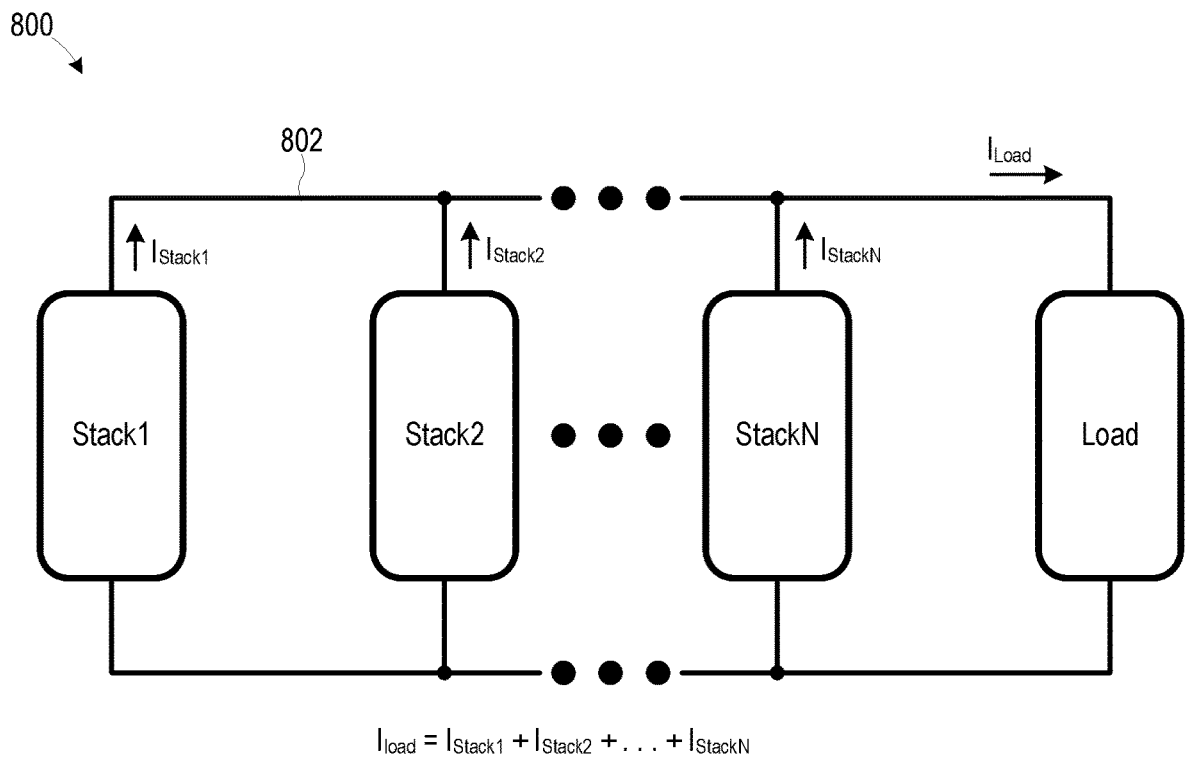
FIG. 8A is an illustrative diagram of an example energy storage system during normal operation with no arc fault occurrences.
Figure 8B:
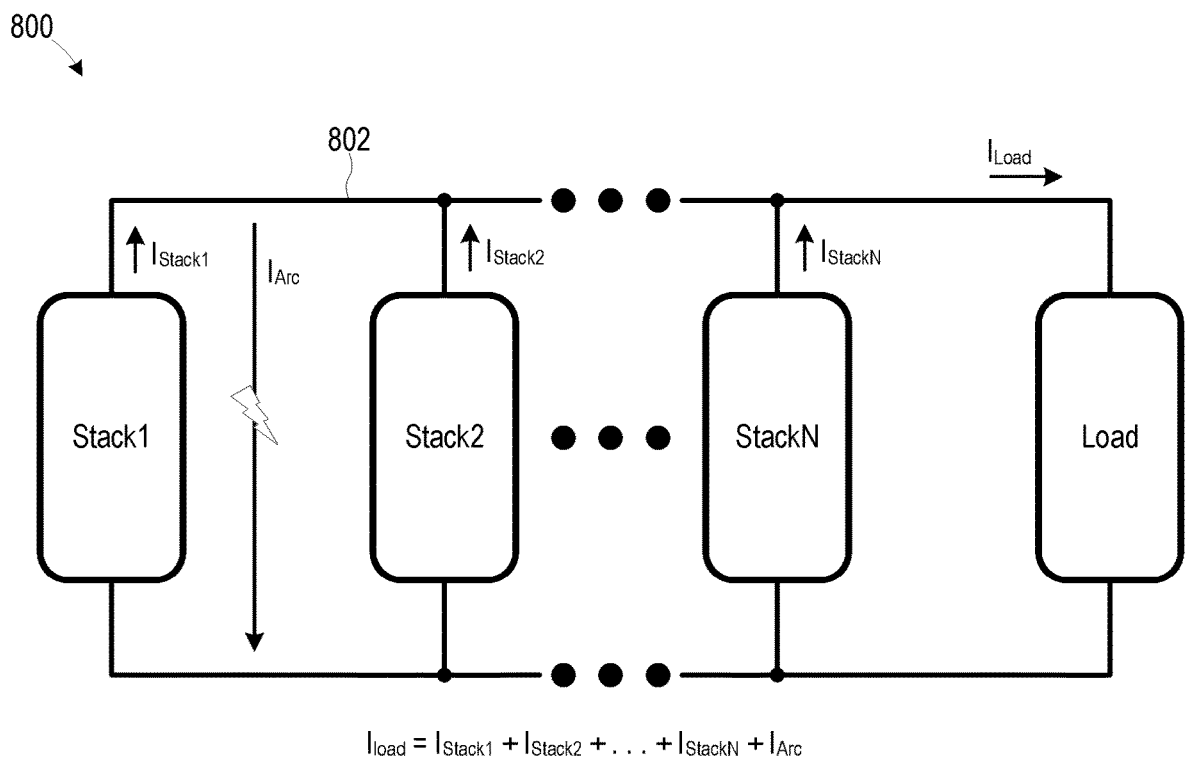
FIG. 8B is an illustrative diagram of the example energy storage system of FIG. 8A during an occurrence of a system-level parallel arc fault.

FIG. 8A is an illustrative diagram of an example energy storage system 800 during normal operation with no arc fault occurrences. FIG. 8B is an illustrative diagram of the example energy storage system 800 of FIG. 8A during an occurrence of a system-level parallel arc fault. A parallel arc fault occurs due to an unintended current path between conductors of an intended current path. As used herein, a system-level parallel arc refers to an arc from a point outside the stack to another point outside the stack, most commonly to electrical ground—sometimes referred to as a ground fault. The system 800 includes multiple BMS stacks, Stack1, Stack2, Stack3 coupled in parallel by a conductor network 802 with an electrical load 804. To avoid unnecessary complexity of presentation and to promote illustrative clarity of explanation, details of stacks are omitted. However, it will be appreciated that an example system 800 can have a topology like that of system 200 of FIG. 2, for example. During normal operation represented by FIG. 8A, when no system-level parallel arc fault occurs, the sum of the currents through individual stacks equals the current through the load:

$$I_{LOAD} = I_{STACK1} + I_{STACK2} + \ldots + I_{STACKN}$$

The individual stack current determinations can be made within stack controllers, (not shown) such as using method 350 of FIG. 3A or method 360 of FIG. 3B. Additionally, stack currents can be estimated, such as from a mean or median value of individual node currents. However, a system-level parallel arc fault adds a parallel current that causes a sum of individual stack currents to not be equal to the current through the load. For example, as represented by FIG. 8B, if a sustained parallel arc fault $I_{ARC1}$ occurs within Stack1 then, $$I_{LOAD} = [I_{STACK1} + I_{ARC1}] + I_{STACK2} + \ldots + I_{STACKN}$$

Thus, in this illustrative example, an occurrence of a system-level parallel current fault $I_{ARC}$, causes the load current $I_L$ to not match a sum of currents through the stacks.

Figure 8C:
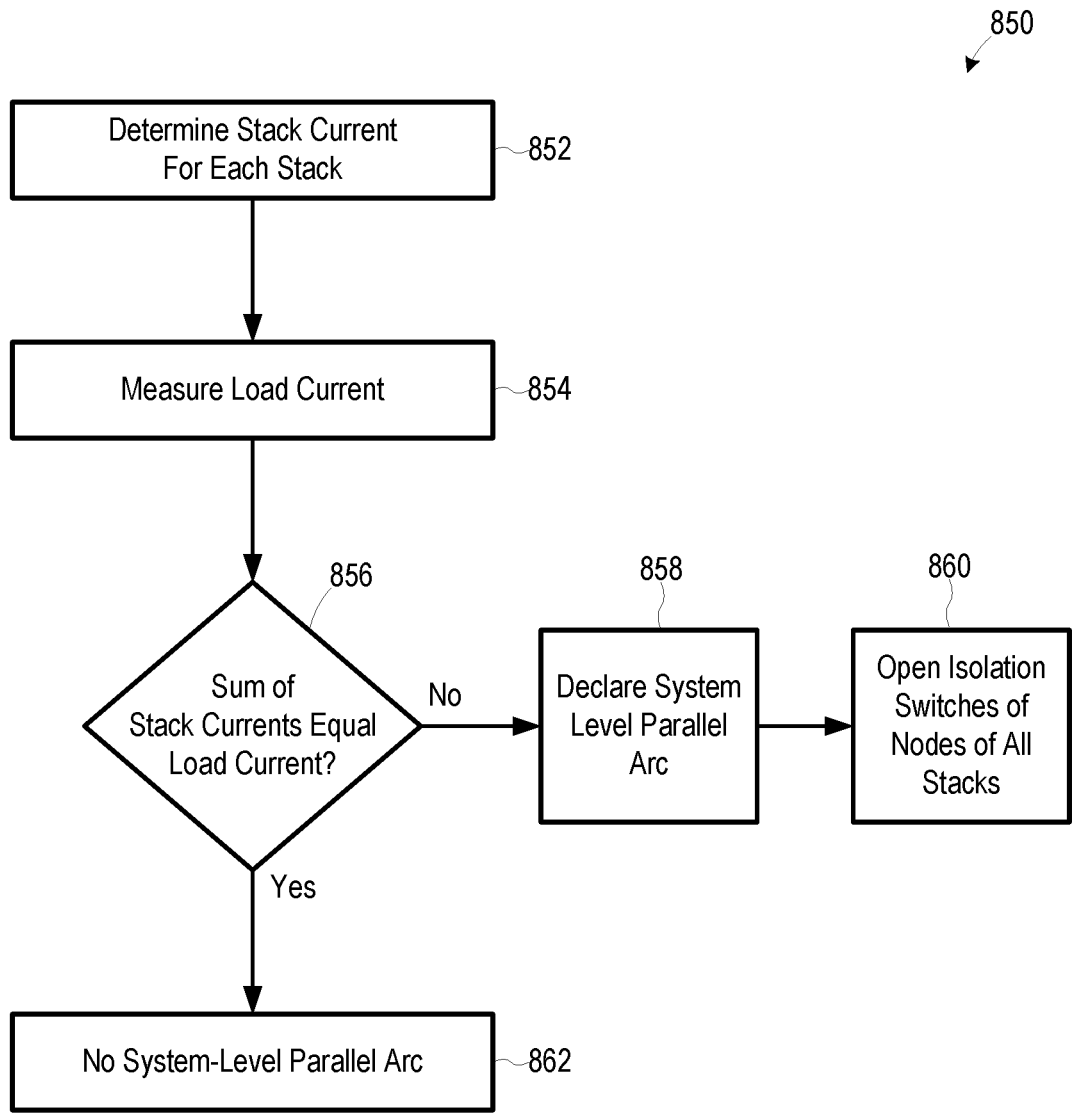
FIG. 8C is an illustrative flow diagram representing a method to detect and react to a parallel arc fault within the stack of FIG. 8B.

FIG. 8C is an illustrative flow diagram representing of a method 850 to detect and react to a system-level parallel arc fault current. Code instructions $C_{AD1}$ and $C_{AD2}$ are used to configure stack controllers (not shown) and a host controller (not shown) of the system of FIGS. 8A-8B to perform the method of FIG. 8C. At step 852, current value stack currents $I_{STACK1}, \ldots I_{STACKN}$ are determined for each stack. Each stack current is determined according to step 752 of FIG. 7B, for example. At step 854 a load current $I_L$ is measured synchronously with the stack-level current measurements.

In some embodiments, the current measurements obtained in steps 852 and 854 are filtered, such as by using one or more low-pass filters, to remove noise injected by power conversion circuitry and associated harmonics that may otherwise interfere with arc fault detection. In certain embodiments, one or more low-pass filters that are used to filter measured load current values have substantially the same bandwidth as one or more low-pass filters that are used to filter stack current measurements and/or node current measurements.

Decision step 856 determines whether a summation of the measured stack currents equals the load current. The stack currents are measured at the individual stacks and the stack current measurements are communicated to the host controller 212 for summation and comparison with the load current. In some embodiments, at least some of the currents considered in decision step 856 are filtered to achieve a desired arc fault detection profile, such as in a manner analogous to that discussed above with respect to step 754 of FIG. 7B.

Referring again to FIG. 8C, at step 858 a system-level parallel arc fault is declared in response to a determination that a summation of the stack currents does not equal the load current. In an example system 800, a determination of not matching is reached in response to a one percent (1%) or greater, a two percent (2%) or greater or even a five percent (5%) or greater difference for a duration of up to one second or more. At step 860, isolation switches (not shown) of the nodes are controlled so as to safely extinguish the arc. This can include isolating any energy storage cells that can feed power to the arc while providing the desired node output characteristic (floating, shorted, low-power or power-limited state) and with or without emergency cell discharge, as needed. At step 862 a determination of no system-level parallel arc fault is reached in response to a determination that the summation of the stack currents equals the load current. The method 850 repeats periodically. During active fault management in an example system 800, the method 850 is repeated multiple times per second, every few seconds, or every few minutes, for example. Alternatively, the method 850 can be repeated less frequently, on the order of once per day to avoid overly taxing computer resources.

In some embodiments, stack controllers 210 and/or host controller 212 perform both of methods 750 and 850, either sequentially or concurrently, to achieve hierarchical parallel arc fault detection. More specifically, stack controllers 210 and/or host controller 212 perform method 750 to realize a first level of parallel arc fault detection, i.e. stack-level parallel arc fault detection to detect a parallel arc fault within a stack. Additionally, stack controllers 210 and/or host controller 212 perform method 850 to realize a second level of parallel arc fault detection, i.e. system-level series parallel fault detection to detect a parallel arc fault outside of the stacks. Consequently, these embodiments are advantageously capable of detecting a parallel arc fault at any location in the system, i.e. both within the stacks and outside of the stacks. Additionally, methods 750 and 850 optionally share measured stack current values, which helps minimize measurement acquisition and processing requirements. Furthermore, the concept of hierarchical series arc fault detection could be extended to include additional levels, in a manner analogous to that discussed above with respect to FIG. 6C.

Operating, Bypass, Floating and Safe Modes of Operation

Figure 9A:
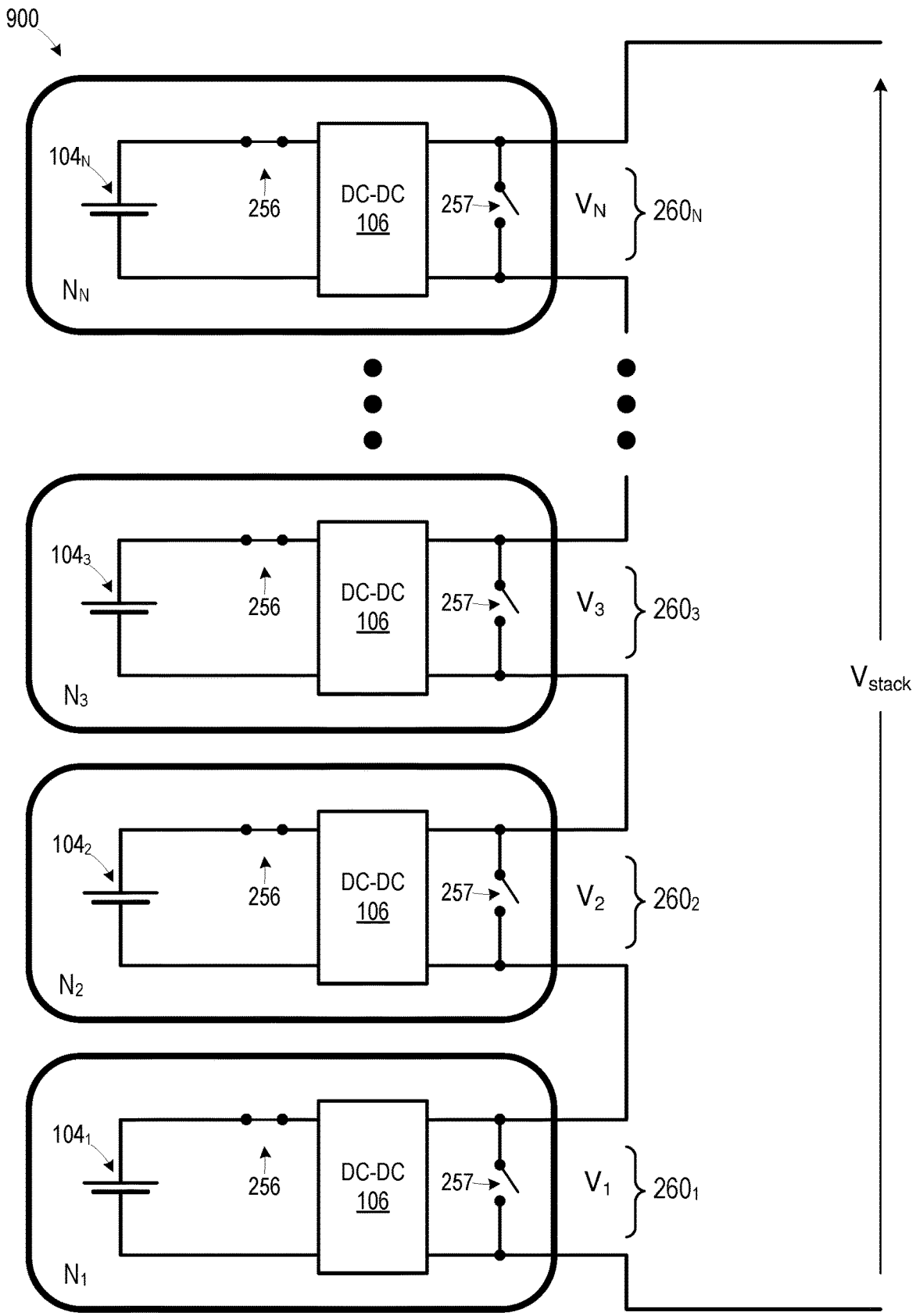
FIG. 9A is an illustrative diagram representing an example stack in an operating mode.
Figure 9B:
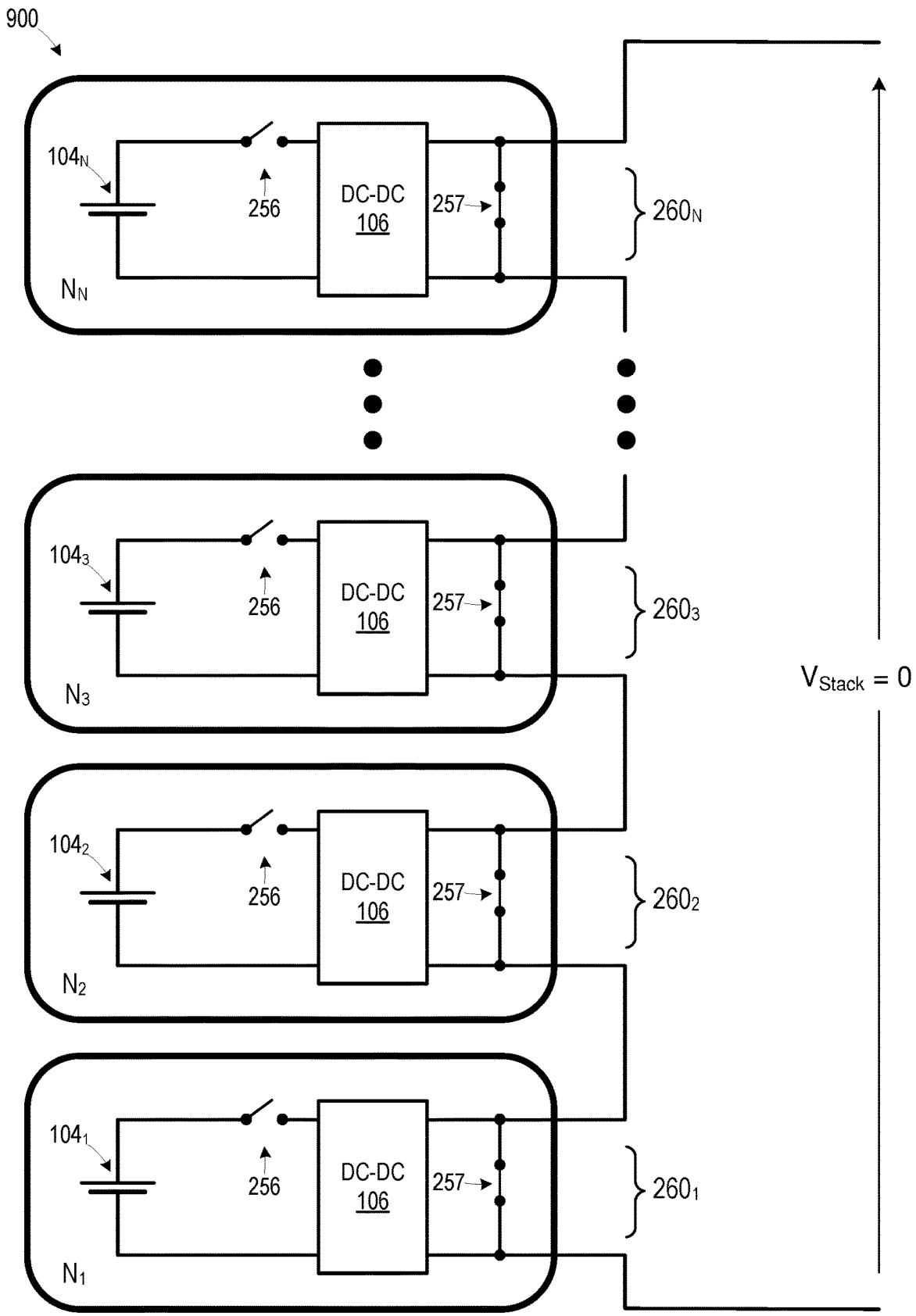
FIG. 9B is an illustrative diagram representing an example stack in a bypassed mode.
Figure 9C:
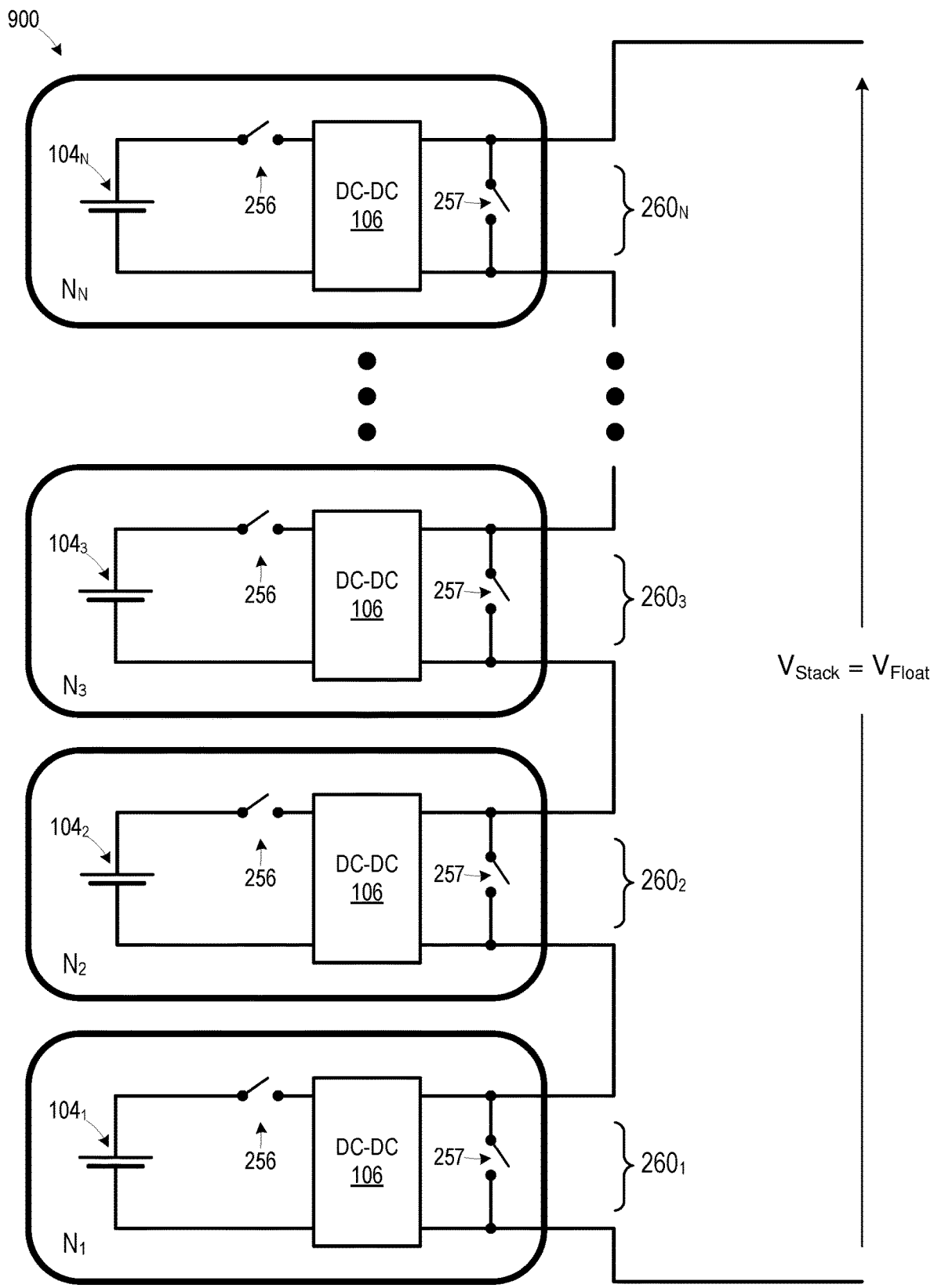
FIG. 9C is an illustrative diagram representing an example stack in a floating mode.
Figure 9D:
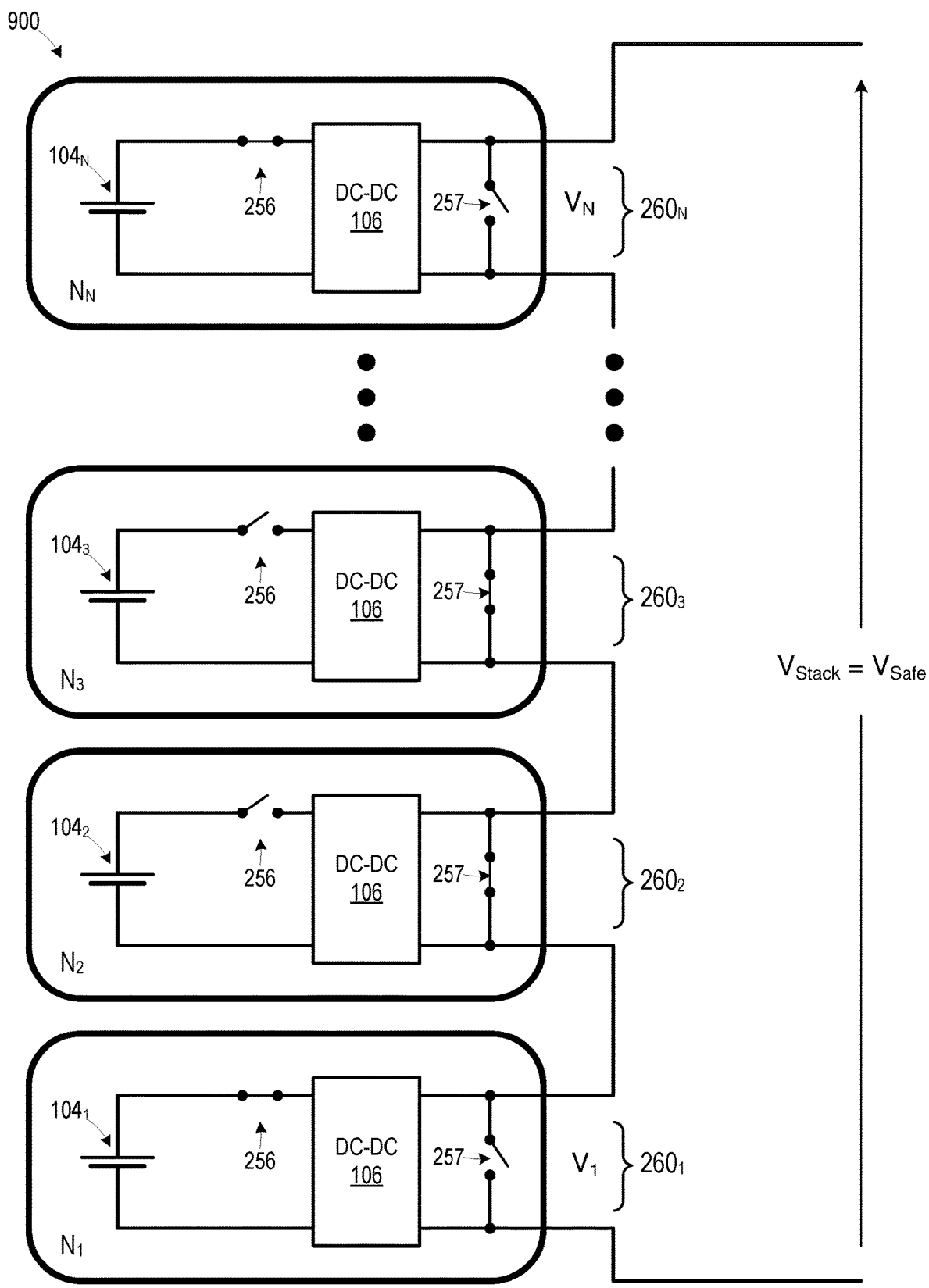
FIG. 9D is an illustrative diagram representing an example stack in a safe mode.

FIGS. 9A, 9B, 9C, 9D are illustrative drawings representing an example BMS stack 900 in an operating mode (FIG. 9A), a bypassed mode (FIG. 9B), a floating mode (FIG. 9C) and safe mode (FIG. 9D). Each node in FIGS. 9A, 9B, 9C, 9D includes a battery 104, a DC-DC converter 106, an isolation switch 256, and a node output shorting switch 257. Each node can (and typically will) include additional elements, such as those discussed above with respect to FIG. 1, but these additional elements are not shown in FIGS. 9A, 9B, 9C, and 9D for illustrative clarity. In an operational mode, shown in FIG. 9A, the isolation switches 256 of the example stack 900 are closed to connect respective batteries 104 to respective DC-DC converters 106 within nodes $N_1$ to $N_N$, which convert respective battery 104 voltages to respective node output voltages $V_1, \ldots V_N$ at respective output ports $260_1$-$260_N$. The serially connected output voltages of the nodes $N_1$-$N_N$ of the stack collectively provide a stack output voltage, $V_{STACK}$, that equals a summation of the node output voltages of the stack:

$$V_{STACK} = V_1 + V_2 + \ldots + V_N$$

In a bypassed mode, shown in FIG. 9B, the isolation switches 256 of the nodes of the example stack are open to electrically decouple and isolate each battery $104_1$-$104_N$ from the respective DC-DC converters 106 within nodes $N_1$ to $N_N$, and node output shorting switches 257 are closed, such that each node provides a 0V node output voltage. As a result, collectively the nodes of the stack provide a stack output voltage $V_{STACK}$=0V.

In a floating mode, shown in FIG. 9C, the isolation switches 256 of the nodes of the example stack are open to electrically decouple and isolate each battery $104_1$-$104_N$ from the respective DC-DC converters 106 within nodes $N_1$ to $N_N$, and switches 257 are opened (or absent) such that the output nodes voltages of nodes $N_1$ to $N_N$ are not coupled to ground but rather are floating. A floating mode is a preferred response to a system-level series arc fault, for example, since the floating mode eliminates a current path for an arc, but there is still a voltage drop across the stack. In the floating mode, the stack is high impedance and the voltage across the stack is determined by its load. Alternately, some embodiments further include a soft shorting switch 259 and resistor 261 (not shown in FIG. 9C) electrically coupled in series across the output port 260 of each node, as discussed above with respect to FIG. 1. In these embodiments, the soft shorting switch 259 is closed during the floating mode to provide a controlled impedance across the stack 900. The controlled impedance is determined, for example, by the sum of the resistance values of resistors 261.

In the safe mode, shown in FIG. 9D, isolation switches 256 of a first subset of nodes of the example stack are closed to couple batteries 104 to respective DC-DC converters 106, which convert battery voltage to node output voltage. In a second subset of nodes of the example stack, isolation switches 256 are open to isolate batteries 104 from respective DC-DC converters 106 and associated node output ports 260. Additionally, switches 257 of the second subset of nodes are closed, such that each node of the second subset is bypassed. The number of nodes within the first and second subsets are selected such that the nodes of the first subset collectively provide an output voltage, current, and power that are limited to safe levels, while the nodes of the second subset are bypassed. In an example energy storage system, for instance, typical safe levels are 30V, 8A, and 240 W. In the example switch configuration shown in FIG. 9D, nodes $N_1$ and $N_N$ are in the first subset with isolation switches 256 closed to couple their associated batteries $104_1$ and $104_N$ to their respective DC-DC converters 106, and nodes $N_2$ and $N_3$ are in the second subset with isolation switches 256 open to isolate their associated batteries $104_2$ and $104_3$ from their respective DC-DC converters 106. Each node is a member of either the first subset or the second subset when stack 900 operates in its safe mode.

In an example node, DC-DC converter 106 is embodied by a boost converter circuit, described below with reference to FIG. 11, that boosts a voltage of battery 104 to produce an output node output voltage that is greater than the voltage level of the battery 104. For instance, in an example BMS stack 900, each node includes a battery 104, which provides a voltage of 4V and includes a boost converter that boosts the voltage nominally to 5V. Moreover, an example stack 900 includes two-hundred nodes, such that a total voltage across the stack is 1,000V during a normal operating mode (FIG. 9A). To achieve a safe output voltage level of 30V across the stack 900 during safe mode (FIG. 9D), the isolation switches 256 of a first subset that includes six nodes are closed and the isolation switches 256 of a second subset of nodes that includes the remaining one hundred and ninety-four are opened. While the stack 900 is in the safe mode, node membership in the first and second subsets can be changed. During a first time interval, for example, nodes $N_1$-$N_6$ (not all shown) can be selected as members of the first subset and the remaining nodes can be selected as members of the second subset. During a second time interval, for example, nodes $N_7$-$N_{12}$ (not shown) can be selected as members of the first subset and the remaining nodes can be selected as members of the second subset; during a third time interval, nodes $N_{13}$-$N_{18}$ (not shown) can be selected as members of the first subset and the remaining nodes can be selected as members of the second subset; etc. In some embodiments, node membership is changed on a periodic basis or in response to a signal to change one or more of stack voltage or stack current.

In an alternate embodiment, each DC-DC converter 106 is capable of reducing stack voltage, and stack 900 operates in its safe mode by causing each DC-DC converter 106 to reduce its output voltage, such that $V_{stack}$ is a safe voltage. For example, if N is equal to 100 such that there are one hundred nodes, each DC-DC converter 106 could transform its respective battery voltage to a node voltage of 0.1 volts in the safe mode, such that Vstack is safe voltage of ten volts.

During normal operation mode, the stack 900 can be used to provide a prescribed voltage required to provide a normal power level to an electrical load, which for example, can be approximately 600V for a US residential battery energy storage system and approximately 1000V-1500V for a utility-scale application. In bypass mode, each node output voltage is shorted so that the entire stack is connected to electrical ground. Alternatively, in a floating or open circuit mode, all nodes can be left floating (i.e. not coupled to ground) or at predetermined impedance values. Both bypass and floating modes can be safe but since the nodes are inoperative, there is no visibility as to whether individual nodes or stacks actually are operable (i.e. ready for normal operation). The safe mode permits operation of each node to be observed to determine proper system operation and interconnection while maintaining overall safe voltage and power levels. Additionally, rotation of active nodes in the safe mode, such as by changing membership of the first and second subsets as discussed above, facilitates quick identification of a non-functioning node because stack output voltage drop during active node rotation is indicative of one or more non-functioning nodes. Accordingly, safe mode is especially useful for installation and maintenance. Safe mode also can be beneficial for firefighting by eliminating the potential for a firefighter to be exposed to dangerously high voltages and currents.

Figure 9E:
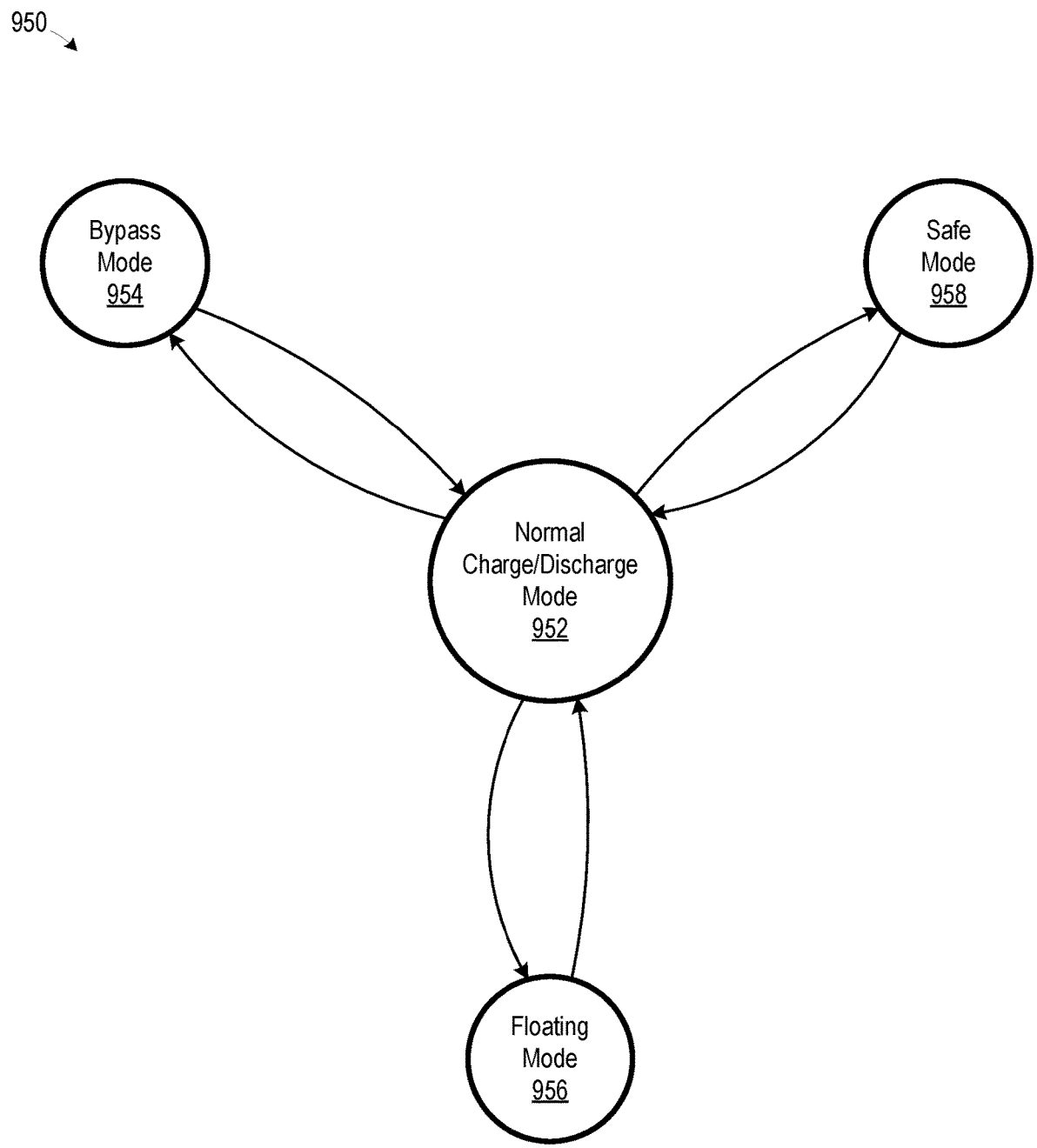
FIG. 9E is a Fault Response state diagram illustrating examples of how a stack can transition between operating modes.

FIG. 9E is a Fault Response state diagram 950 illustrating examples of how the example stack 900 of FIGS. 9A-9D could transition between the operational mode, the bypass mode, the floating node, and the safe mode. Code instructions $C_{SM1}$ and $C_{SM2}$ are used to configure a stack controller (not shown) and a host controller (not shown) to transition between modes. State 952 is a normal charge/discharge mode, which in some embodiments, is equivalent to the operational mode discussed above with respect to FIG. 9A. The stack 900 can transition from the normal charge/discharge mode 952 to any one of the bypass mode 954, the floating mode 956, and the safe mode 958, such as in response to detection of a fault. Examples of such faults include, but are not limited to, an arc fault or failure of a communication subsystem or other subsystem of energy storage system 200. For example, the stack 900 could be configured to transition a defective stack from the normal charge/discharge mode 952 to the floating mode 956 in response to detecting a series arc fault in the defective stack, such as using method 550 discussed above. Operating in the floating mode would extinguish the arc in the defective stack while allowing the remaining stacks to continue operating, thereby ensuring safety while minimizing impact of the arc fault on system operation. Additionally, the system could be configured to transition all stacks from the normal charge/discharge mode 952 to any one of the bypass mode 954, the floating mode 956, and the safe mode 958 in response to detecting a system-level series arc fault, such as using method 650 describe above. Any one of the bypass mode 954, the floating mode 956, and the safe mode 958 would extinguish the arc, although the system would be inoperable until the system defect is repaired.

Furthermore, the stack 900 could be configured to transition a defective stack from the normal charge/discharge mode 952 to the floating mode 956 in response to detecting a parallel arc fault within the defective stack, such as using method 750 discussed above. Operating in the floating mode would extinguish the arc in the defective stack while allowing remaining stacks to continue operating, thereby ensuring safety while minimizing impact of the arc fault on system operation. Additionally, the stack could identify the arc location in a manner like that discussed above with respect to FIG. 7A, to expedite repair of the defective stack. Moreover the system could be configured to transition all stacks from the normal charge/discharge mode 952 to any one of the bypass mode 954, the floating mode 956, and the safe mode 958 in response to detecting a system-level parallel arc fault, such as using method 850 described above. Any one of the bypass mode 954, the floating mode 956, and the safe mode 958 would extinguish the arc, although the system would be inoperable until the system defect is repaired. Additionally, the stack 900 could transition from the normal charge/discharge mode 952 to any one of the bypass mode 954, the floating mode 956, and the safe mode 958 in response to a user command, such as in preparation for system maintenance or service, in response to an emergency (e.g. a fire) in the vicinity of the system, or for any other reason.

Stack 900 can also transition from any one of the bypass mode 954, the floating mode 956, and the safe mode 958 back to the normal charge/discharge mode 952, such as when the system is determined to safely free of arcs, short, or other defects, or in response to a user command. Additionally, while not illustrated in FIG. 9E, some embodiments of the stack 900 are capable of transitioning from any one of the bypass mode 954, the floating mode 956, and the safe mode 958 to any other one of these modes, without first transitioning to the normal charge/discharge mode 952.

It should be appreciated that the present systems and method not only promote safety, but they also achieve significant additional advantages. For example, in some embodiments, it is unnecessary to shut down an entire energy storage system in response to a fault or other abnormality. Instead, a problematic portion of the energy storage system can be disabled and/or isolated from the remainder of the energy storage system, thereby allowing the energy storage system to continue to safely operate, albeit with reduced capacity. For example, in some embodiments, a defective battery 104 can be isolated from healthy batteries 104 by opening an isolation switch 256, and the battery's respective node can be bypassed by closing a node output shorting switch 257, thereby enabling the energy storage system to safely operate with the defective battery 104 isolated from healthy batteries 104. Additionally, the defective battery 104 is optionally safely discharged, such as using the devices discussed below. As another example of isolating a defective energy storage system portion from the system remainder, a defective stack can be isolated from healthy stacks by transitioning the defective stack from its normal charge/discharge mode 952 to its floating mode 956, so that the defective stack is disabled without interfering with healthy stack operation. Accordingly, the present systems and methods help minimize energy storage system downtime, which promotes energy storage system reliability and economy by reducing, or even eliminating, the need for redundant energy storage systems.

Additionally, the present systems and methods advantageously help minimize ongoing energy storage system operations and maintenance expense, which can be as much as five to ten percent of overall lifetime cost in conventional energy storage systems. For example, safe mode 958 allows an energy storage system portion, or even an entire energy storage system, to continue to operate in a low-power state despite presence of a fault or other abnormality. Such low power operation may significantly ease locating a fault, as it is typically much easier to locate a fault in a powered system than in an unpowered system. Additionally, as discussed above, some embodiments can identify an arc fault's location in an energy storage system, which can further expedite fault diagnosis and repair. Furthermore, some embodiments are configured to automatically send a signal to a third party, e.g. to an energy storage system service company, in response to occurrence of a fault or other abnormality. The signal may, for example, identify the fault type as well as the fault's location, thereby enabling the third party to remotely assess the urgency of fault repair and need for replacement parts, which further promotes efficient and economical energy storage system operation and maintenance.

Moreover, the fact that an energy storage system may continue to safely operate despite presence of a fault reduces the need for unscheduled system maintenance and repair, which also helps minimize operations and maintenance cost. For example, a defective battery in a conventional energy storage system may require shutdown of the entire system, thereby necessitating an urgent service call to replace the defective battery and enable the energy storage system to be returned to operation. In certain embodiments of the present systems and methods, in contrast, a defective battery 104 may be isolated from healthy batteries 104 such that the energy storage system can continue to safely operate, thereby enabling battery replacement to be deferred until a regularly scheduled maintenance call.

Furthermore, the present system and methods may enable more aggressive safety measures to be taken than is practical with conventional energy storage systems, thereby further promoting safety. In particular, identification of a fault or other abnormality in a conventional energy storage system typically requires that the entire energy storage system be shut down, as discussed above. Consequently, conventional energy storage systems must conservatively identify faults, to prevent false fault identification which necessitates costly and inconvenient shut down of the entire energy storage system. The present systems and methods, in contrast, enable a fault or other abnormality to be addressed with shutdown of only a portion of an energy storage system, e.g. only a single node or only a single stack, which allows the remainder of the energy storage system to continue functioning. Consequently, the cost of a false fault identification is lower in the present energy storage systems than in conventional energy storage systems, which allows for more aggressive fault detection than is practical with conventional energy storage systems.

Identifying an Unsafe Battery

A battery may, itself, become unsafe. For example, lithium plating, dendrite growth and mechanical shorting may all lead to intermittent cell-level arcs or shorts. Continued operation of an unsafe battery is hazardous and can result in dangerous current levels, thermal runaway and fire. As used herein, an unsafe battery is one whose electrical behavior suggests an unsafe risk of failure even if the battery device has not yet exceeded absolute limits, and therefore, has not yet failed. Early identification of an unsafe node permits preventive action such as disconnecting the battery from the node, discharging the battery to a safe state of charge or voltage, shutting down the entire system, and replacement of the unsafe battery before occurrence of potentially catastrophic battery failure. The electrical signatures of an unsafe risk can be identified by unexpected electrical response of the battery to external stimuli such as host controller commands and load changes. Battery models, such as thermal, electrochemical and equivalent electric circuit models, such as State-of-Charge (SOC) models, are used to describe the expected electrical response. Electrical signatures of unsafe cells can also be determined experimentally, by observing electrical signals as known failure modes are induced in similar cells. Machine learning algorithms can be trained on experimentally-gathered data or fleetwide field data to improve the sensitivity and accuracy of the unsafe risk detection algorithm or to reduce the nuisance flagging of false failures.

Figure 10:
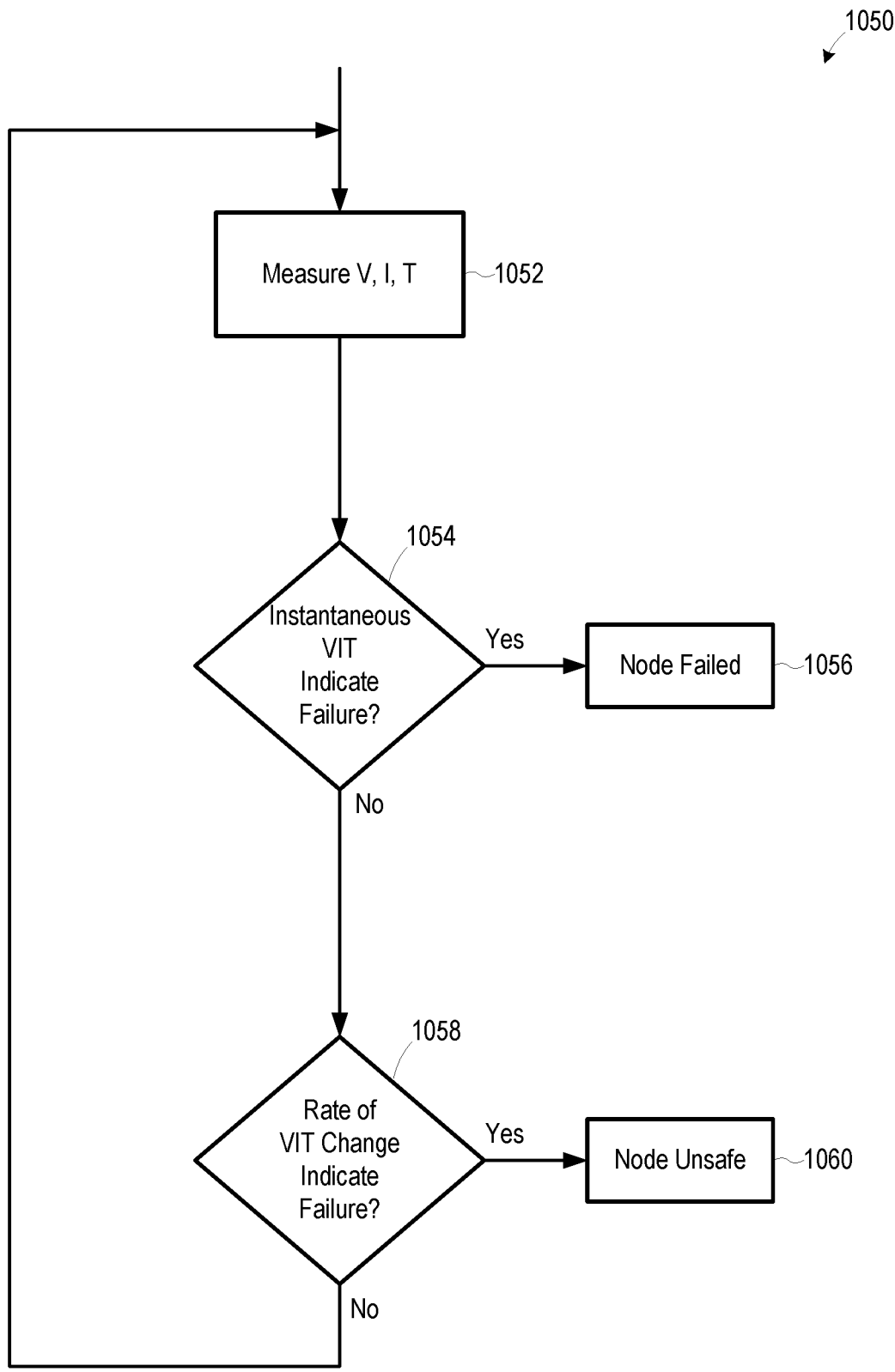
FIG. 10 is an illustrative drawing representing a method for detecting an unsafe battery before it enters thermal runaway.

FIG. 10 is an illustrative drawing representing a method 1050 for detecting an unsafe battery before it enters thermal runaway. Method 1050 is performed, for example, by the processor circuit 217-2 of a node 100, a stack controller 210 of a stack, and/or the host controller 212. In step 1052, the cell voltage (V), current (I) and temperature (T) are measured, such as using the techniques discussed above with respect to FIG. 1. Step 1054 compares the instantaneous VIT measurements against their expected values from a battery model and flags an unsafe battery if any of the instantaneous values are outside the expected range. For example, a lower than expected voltage reading and/or a higher than expected current reading and/or a higher than expected temperature reading all might indicate an intermittent short or arc (state 1056), prompting a fault response which decouples the unsafe battery from the system, and/or depending on the severity of the fault response, an emergency cell discharge (described below).

If the instantaneous VIT readings are not indicative of an unsafe battery, the rates of change of V, I and T are compared to their expected values from battery models, or other thresholds, to identify an unsafe battery. For example, rapid change in V, I and/or T that is not explained by commands from the host controller 212 or changes in the load 204 are flagged as an unsafe battery, prompting a fault response.

The order of Steps 1054 and 1058 can be interchanged, or the two steps can be performed concurrently. Step 1058 can also be performed in the frequency domain, with Fast Fourier Transforms of V, I, T sequences compared to expected values.

Expected values considered in steps 1054 and 1058 are determined, for example, from models of batteries 104. Each battery may have its own respective model or "digital twin." In some embodiments, the battery 104 models are at least partially derived from VIT measurements from BMS nodes of energy storage system 200. Examples of battery 104 models include, but are not limited to, equivalent circuit models of batteries 104, state of charge models of the batteries 104, and thermal models of batteries 104. In some embodiments, one or more of the models are refined with use, such as by using a Kalman filtering or analogous procedure where battery 104 model parameters are estimated and subsequently updated in response to measurement values.

Figure 15:
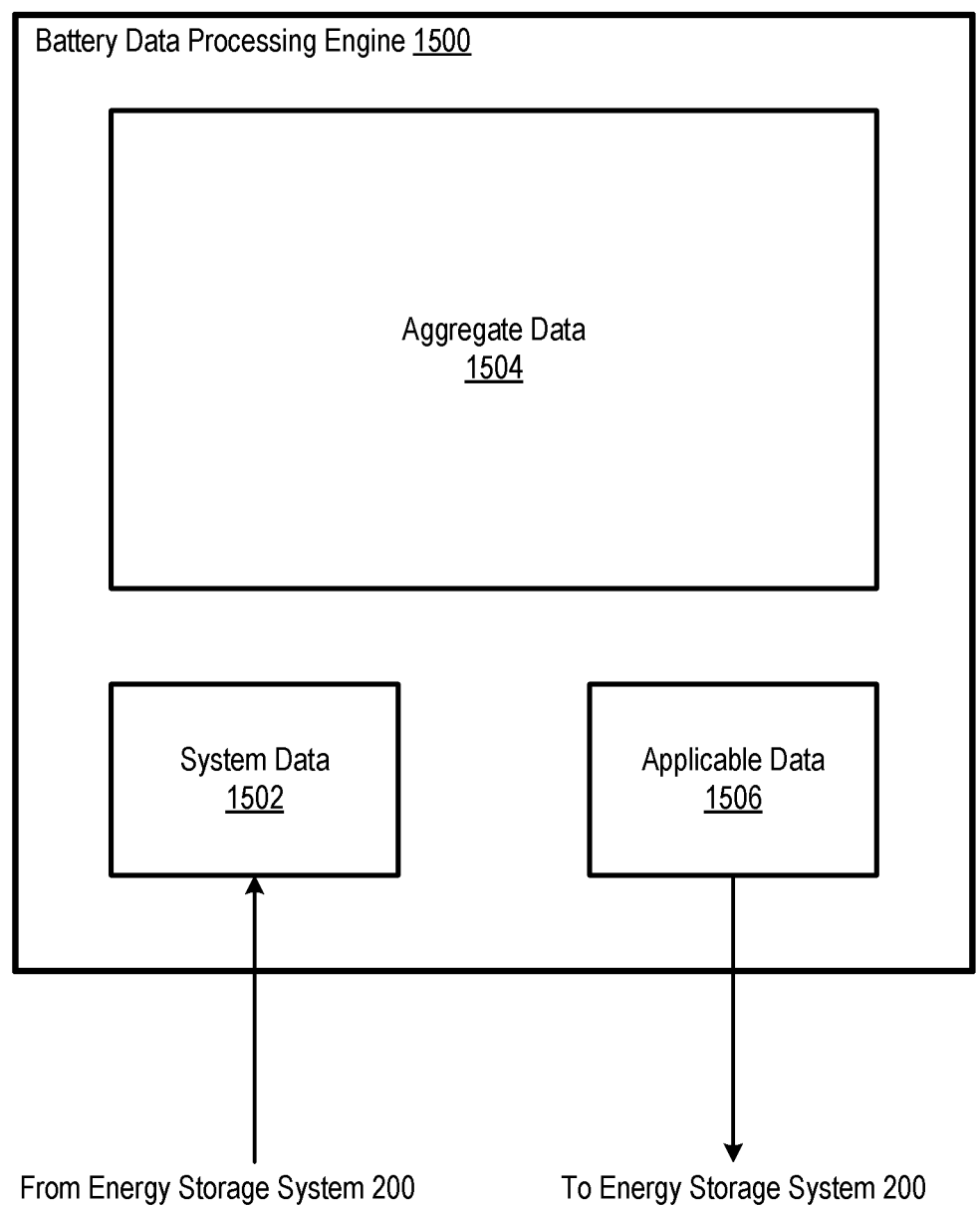
FIG. 15 is an illustrative diagram representing an example of a battery data processing engine.

Moreover, some embodiments of energy storage system 200 use data from other energy storage systems to perform one or more functions, such as to generate battery models, detect an unsafe battery, to detect an arc fault, or to determine fault responses. For example, in certain embodiments, a stack controller 210 instance and/or the host controller 212 send system data 1502 to a battery data processing engine 1500, illustrated in FIG. 15. In some embodiments, the battery data processing engine 1500 is external to the energy storage system 200. For example, the battery data processing engine 1500 may be implemented by a computer server, or by a distributed computing system, that is external to the energy storage system 200. In some other embodiments, the battery data processing engine 1500 is part of energy storage system 200. For example, in a particular embodiment, the battery data processing engine 150 is implemented by host controller 212.

The system data 1502 sent to the battery data processing engine 1500 represents one or more characteristics of the energy storage system 200. For example, the system data 1502 may include node VIT data, fault status, and/or information about the energy storage system 200, such as the type of batteries 104 in the energy storage system 200, the configuration of the batteries 104 in the energy storage system 200, manufacturing information for the batteries 104 in the energy storage system 200, operating history of the batteries 104 in the energy storage system 200, maintenance history of the batteries 104 in the energy storage system, etc. The system data 1502 is optionally encrypted, compressed, and/or preprocessed (e.g., identifying various degradation mechanisms) before being sent from the energy storage system 200 to the battery data processing engine 1500.

The battery data processing engine 1500 compares the system data 1502 to aggregate data 1504 to find common traits between the two data sets. Aggregate data 1504 includes data from multiple energy storage systems, e.g. from tens, hundreds, or even thousands of energy storage systems. The battery data processing engine 1500 optionally adds information it receives from energy storage systems to the aggregate data 1504, such that the aggregate data 1504 grows over time. Examples of common traits between the system data 1502 and the aggregate data 1504 include, but are not limited to, batteries operating under the same or similar conditions, batteries with the same or similar operation duration, batteries with the same or similar energy throughput, batteries from a common manufacturing lot, batteries with the same or similar installation, batteries stored under the same or similar conditions, batteries with the same or similar maintenance history, and batteries with similar arc fault signatures. In some embodiments, the battery data processing engine 1500 uses self-learning methodologies (e.g., machine-learning, deep-learning, or even multi-modal machine learning) to identify common traits between the system data 1502 and the aggregate data 1504.

The battery data processing engine 1500 subsequently identifies data that is applicable to energy storage system 200 (applicable data 1506) from the common traits between the system data 1502 and the aggregate data 1504. More specifically, the battery data processing engine 1500 identifies data in aggregate data 1502 that is associated with energy storage systems having common traits with energy storage system 200, as being applicable data 1506. For example, the battery data processing engine 1500 may identify data from an energy storage system having the same type of batteries as energy storage system 200 as being applicable data 1506. As another example, the battery data processing engine 1500 may identify data from an energy storage system operating under similar conditions to energy storage system 200 as being applicable data 1506. The applicable data 1506 may be either indirectly related or directly related to data associated with energy storage systems having coming traits with energy storage system 200. In some embodiments, the battery data processing engine 1500 uses self-learning methodologies (e.g., machine-learning, deep-learning, or even multi-modal machine learning) to identify the applicable data 1506 from aggregate data 1504.

The battery data analysis engine 1500 sends the applicable data 1506 to energy storage system 200, such as to the host controller 212 and/or to one or more stack controllers 210. The energy storage system 200 optionally uses the applicable data 1506 to manage one or more aspects of energy storage system 200. For example, in particular embodiments, the host controller 212 and/or a stack controller 210 use the applicable data 1506 to build or refine models of batteries 104, such as to control battery charging/discharging or for use in unsafe battery identification and associated fault response. As another example, in certain embodiments, the host controller 212 and/or a stack controller 210 use the applicable data 1506 to detect and respond to arc faults. For instance, the applicable data 1506 could include arc fault signatures and associated fault responses for energy storage systems similar to energy storage system 200, and such signatures could be used in decision steps 556, 656, 754, and/or 856 and mitigation steps 560, 662, 664, 758, and/or 860 in the arc fault detection methods 550, 650, 750, and 850, respectively. For example, low-pass filter values used in decision steps 556, 656, 754, and/or 856 could be determined at least partially based on arc fault signatures in the applicable data 1506, to achieve an arc fault detection profile that is optimized for detecting the arc fault signatures in the applicable data 1506. As another example, a decision to transition from the normal charge/discharge mode 952 to one of the bypass mode 954, the floating mode 956, and the safe mode 958 (FIG. 9) may be based at least in part on prior experience with similar fault scenarios, as determined by the battery data analysis engine 1500 and conveyed to the energy storage system 200 via the applicable data 1506.

Discharging an Unsafe Node

A battery that is deemed unsafe can remain a hazard so long as it is charged. For example, highly charged batteries increase risk of short circuits and arc faults, and highly charged batteries are more likely to experience thermal runaway than lightly charged batteries. Therefore, it is desirable to discharge an unsafe battery or a battery that is subject to being charged or discharged in an uncontrolled manner by a faulty system. The following discharge circuits enable a node to safely discharge a battery within the node itself. The example discharge circuits are configured to discharge a battery 104 in response to determination that the battery or system is unsafe as described above, or in response to a command to discharge the battery, such as in preparation for performing system maintenance or service.

Figure 11:
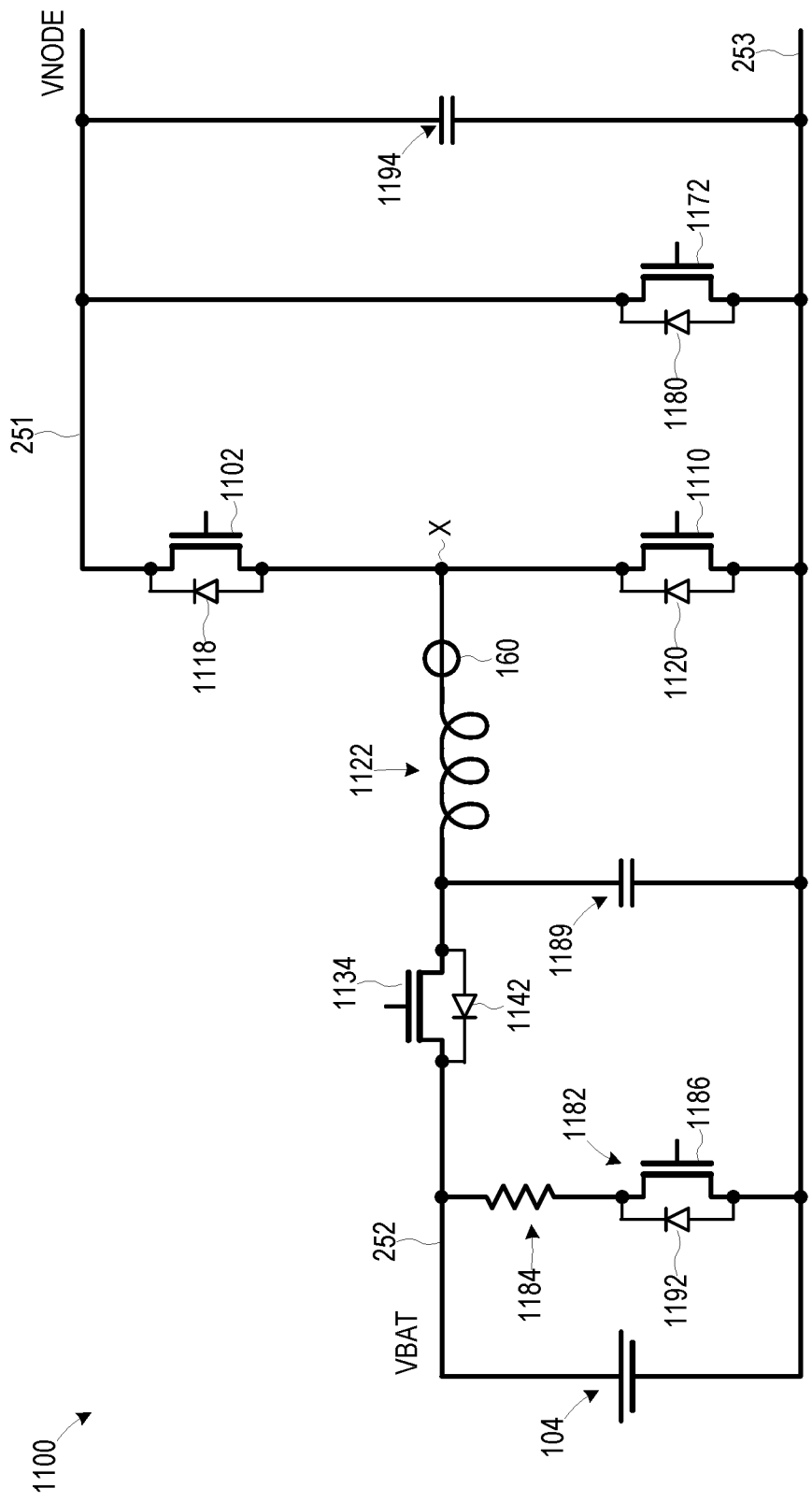
FIG. 11 is an illustrative circuit diagram of a first example bi-directional DC-DC converter circuit for use in an example node of FIG. 1.

FIG. 11 is an illustrative circuit diagram of a first example bi-directional DC-DC converter circuit 1100 for use in an example node 100 as DC-DC converter 106. DC-DC converter circuit 1100 acts as a boost converter during discharge and as a buck converter during charge. The first converter 1100 includes a first transistor switch 1102 that includes a first parasitic body diode 1118. The first switch 1102 is coupled between the positive power bus terminal 251 and a circuit node X. The source and drain terminals of the first transistor switch 1102 are chosen so that the first body diode 1118 conducts current from circuit node X toward the positive power bus terminal 251. In other words, the first parasitic diode 1118 has forward bias diode current flow direction from circuit node X toward the positive power bus terminal 251. The DC-DC converter 1100 includes a second switch 1110 that includes a second parasitic body diode 1120. The second switch 1110 is coupled between the circuit node X and the negative power battery device terminal 253. The second parasitic diode 1120 has forward bias diode current flow direction from the negative battery device/bus terminal 253 toward the circuit node X. First and second switches 1102 and 1110, along with an inductor 1122, collectively form a DC-DC converter core which operates as a boost converter when discharging battery 104 and as a buck converter when charging battery 104.

A third transistor switch 1134 that includes a third parasitic body diode 1142 and is coupled in series between the positive battery device terminal 252 and circuit node X, in series with inductor 1122. The third parasitic diode 1142 has forward bias diode current flow direction from circuit node X toward battery 104. The third switch 1134 acts as a battery isolation (or disconnect) switch, and third switch 1134 is therefore an embodiment of battery isolation switch 256 of FIG. 1. The inductor 1122 is electrically connected between the third circuit switch 1134 and the circuit node X. A capacitor 1189 is coupled between the inductor 1122's second terminal and the negative power battery device terminal 253. A capacitor 1194 is coupled between positive terminal 251 and negative terminal 253.

An optional fourth transistor switch 1172 that includes a fourth parasitic body diode 1180 is coupled between the positive power bus terminal 251 and the negative power battery device/bus terminal 253. The fourth body diode 1180 has forward bias diode current flow direction from the negative power battery device/bus terminal 253 toward the positive power bus terminal 251. The fourth switch 1172 acts as a node output shorting switch to provide continuity of series-connected nodes when the battery is disconnected. The function of switch 1172 can be replaced by turning on switches 1102 and 1110 after $I_L$ has been ramped to zero, as long as third switch 1134 is open. Accordingly, fourth switch 1172 is an embodiment of switch 257 of FIGS. 9A-9D. DC-DC converter optionally further includes soft shorting switch 259 and resistor 261 of FIG. 1 (not shown in FIG. 11).

The DC-DC converter 1100 further includes an auxiliary discharge circuit 1182 that provides a current-limited auxiliary circuit to safely discharge battery 104. The auxiliary discharge circuit includes a fifth transistor switch 1186 including a body diode 1192 and electrically coupled in series with resistor 1184, whose value is chosen to limit discharge current to an acceptable value. During auxiliary discharge operation, the third switch 1134 is turned off (open) to isolate the battery 104 from the inductor 1122. The fifth switch 1186 is turned on (closed) so that current can flow from the battery 104 through the positive battery device terminal 252 through the resistor 1184 and to the negative power battery device terminal 253, to safely discharge the battery 104 via resistor 1184. Third switch 1134 can be implemented by one or more different transistors, or by another type of switching device, such as a relay or contactor, without departing from the scope hereof.

Figure 12:
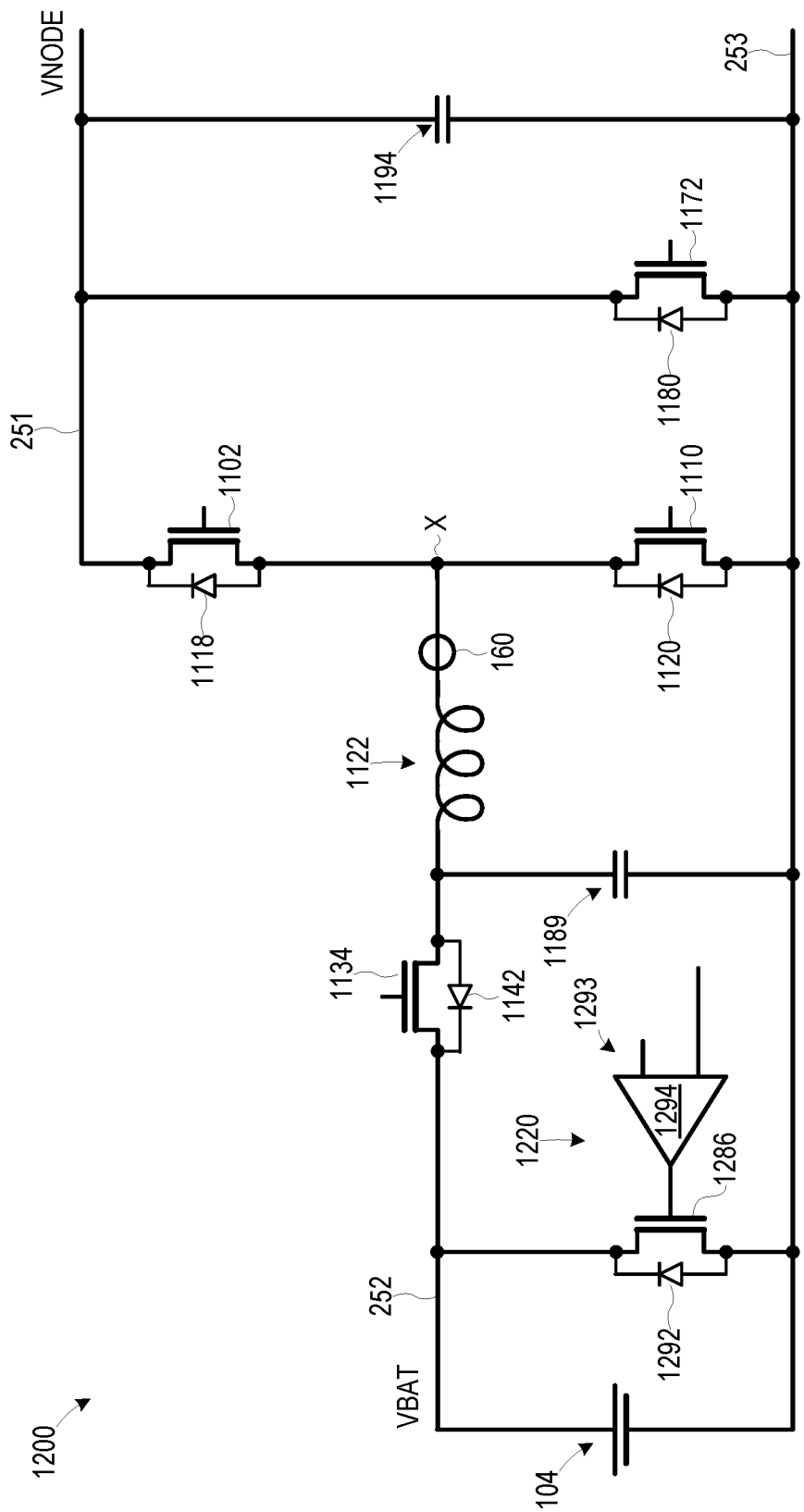
FIG. 12 is an illustrative circuit diagram of a second example bi-directional DC-DC converter circuit for use in an example node of FIG. 1.

FIG. 12 is an illustrative circuit diagram of a second example bi-directional DC-DC converter circuit 1200 for use in an example node 100 as DC-DC converter 106. For efficiency of description, components of the second converter circuit 1200 that correspond to components of the first converter circuit 1000 of FIG. 12 will not be described again. A battery discharge circuit 1220 includes (a) a fifth switch 1286 with a parasitic diode 1292 and (b) a current control circuit 1293, which includes an amplifier circuit 1294 coupled to control first switch 1286 and thereby discharge the battery 104 at a selectable current. In one embodiment, the current is fixed to discharge a fully-charged cell in a pre-determined period of time, such as one hour (a 1 C discharge) to 15 minutes (a 4 C discharge). In another embodiment, the current is controlled to regulate battery or circuit temperature to promote rapid, yet safe, discharge. During auxiliary discharge mode operation, the third switch 1134 is turned off (open) and amplifier 1294 controls fifth switch 1286 to act as a current source and thereby safely discharge battery 104, as discussed above.

Alternatively, processor 117-2, stack controller 210, and/or host controller 212 can utilize the existing load and take a battery offline at the most opportunistic time to achieve a safe discharge while still delivering energy to the load 204. In this embodiment, no additional discharge circuitry is required. Once an unsafe battery is identified, it is never charged. Rather, it is taken offline until one or more regular discharge cycles discharge it to a safe SOC or voltage, such as below about 20% state of charge. The discharges are optionally controlled to be at a different rate than those of the healthy cells. For example, a higher discharge rate could be deemed necessary for a battery at greater risk of failure from storage at SOC. A lower discharge rate could be deemed necessary for a battery with abnormally high series resistance to avoid self-heating. Once safely discharged, the battery can remain bypassed in its low SOC state until inspection and possible repair or replacement. Battery 104 discharge rate is controlled, for example, by controlling the battery 104's respective DC-DC converter 106 to vary node output voltage, i.e. voltage across output port 260. For example, battery 104's discharge rate could be increased by controlling the DC-DC converter 106 such that node output voltage is greater than that of other nodes in the stack, and battery 104's discharge rate could be decreased by controlling the DC-DC converter 106 such that node output voltage is less than that of other nodes in the stack.

FIG. 13A is an illustrative circuit diagram of a simplified example bi-directional DC-DC converter circuit 1300 for use in an example node 100. Details of the converter circuit will be understood from the description of FIG. 11. FIGS. 13B-13C are illustrative signal diagrams representing a process to discharge an unsafe battery device. During normal operation, the battery 104 is charged and discharged by the load, as illustrated in FIG. 13B. During a discharging operating mode, in contrast, DC-DC converter 1300 operates to discharge the unsafe battery 104 into load 204 as quickly as possible while avoiding catastrophic failure. During charging operations, the unsafe battery 104 is bypassed by DC-DC converter 1300, such as by turning off switch 1134 and turning on switch 1172 so that battery 104 is not recharged when other battery devices are recharged, as shown in FIG. 13C. The battery 104 continues discharging in subsequent discharge cycles until the desired safe voltage or state of charge is achieved. This unidirectional operation of DC-DC converter 1300, i.e. causing battery 104 to participate in only discharge cycles, may be particularly useful in situations where it is desired to minimize cost of addressing a defective battery, such in situations where battery 104 is only possibly defective or is only mildly defective.

Referring again to FIGS. 1 and 2, in some embodiments, processor circuit 217-2, stack controller 210, and/or host controller 212 are configured to send commands to load 204, and load 204 is configured to perform one or more actions in response to these commands. For example, in particular embodiments, one or more of processor circuit 217-2, stack controller 210, and host controller 212 are configured to send a command to load 204 to increase its power consumption, and load 204 is configured to respond accordingly, to expedite safe discharge of one or more batteries 104, in response to determining that the batteries are unsafe and/or in response to a signal to perform a controlled discharge of batteries 104. Further in some embodiments, processor circuit 217-2, stack controller 210, and/or host controller 212 are configured to send commands to load 204 to set magnitude of voltage $V_L$ and/or current $I_L$, thereby enabling the energy storage system 200 to further control discharge of one or more batteries 104. In certain embodiments, one or more of processor circuit 217-2, stack controller 210, and host controller 212 are configured to dynamically control magnitude of voltage $V_L$ and/or current $I_L$ via commands to load 204, such as according to one or more battery or node parameters. Examples of these parameters include, but are not limited to, battery 104 temperature, battery 104 state of charge, battery 104 state of degradation, battery 104 state of health, and battery 104 safety characteristics. Additionally, processor circuit 217-2, stack controller 210, and/or host controller 212 may be configured to command load 204 to decrease power consumption, adjust voltage $V_L$ and/or current $I_L$, in response to one or more batteries 104 being in a safe condition, such as in response to battery voltage or battery state of charge crossing a threshold value.

Moreover, in some embodiments where load 204 is a photovoltaic device or photovoltaic system, processor circuit 217-2, stack controller 210, and/or host controller 212 are configured to command nodes in one or more stacks to set voltage $V_L$ to a value that is sufficiently high to transfer power from one or more batteries 104 to the photovoltaic device or system 104, to facilitate safe discharge of the batteries 104. Furthermore, in these embodiments, processor circuit 217-2, stack controller 210, and/or host controller 212 are optionally configured to command nodes in one or more stacks to set magnitude of current $I_L$ to a desired value during safe battery 104 discharge, such as to expedite battery 104 discharge while not overloading the photovoltaic device or system.

Node Isolation

Figure 14A:
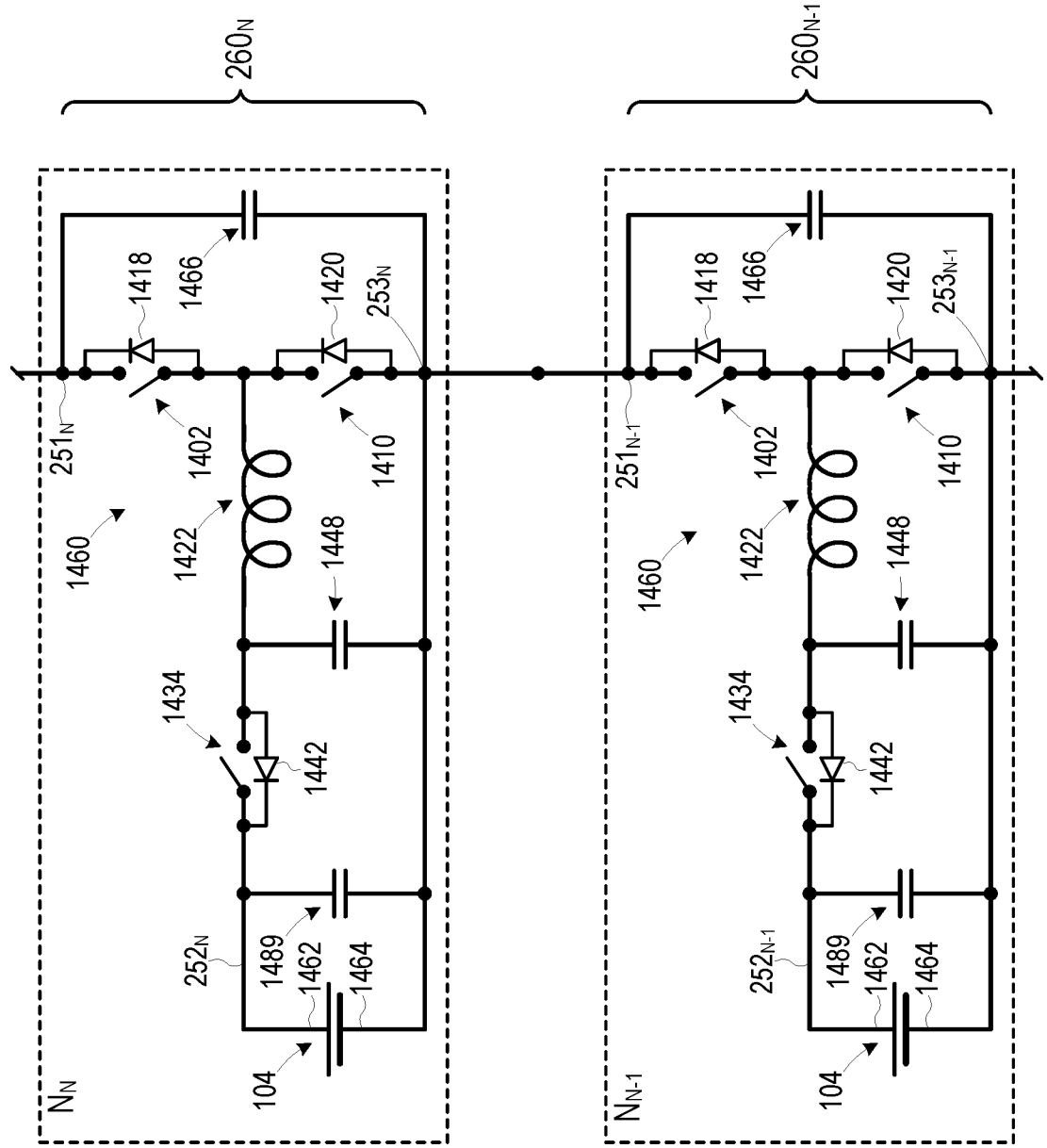
FIG. 14A is an illustrative circuit diagram showing portions of two series-connected example nodes of a stack that lacks failure mode protection from reverse voltage in a disconnect state.
Figure 14B:
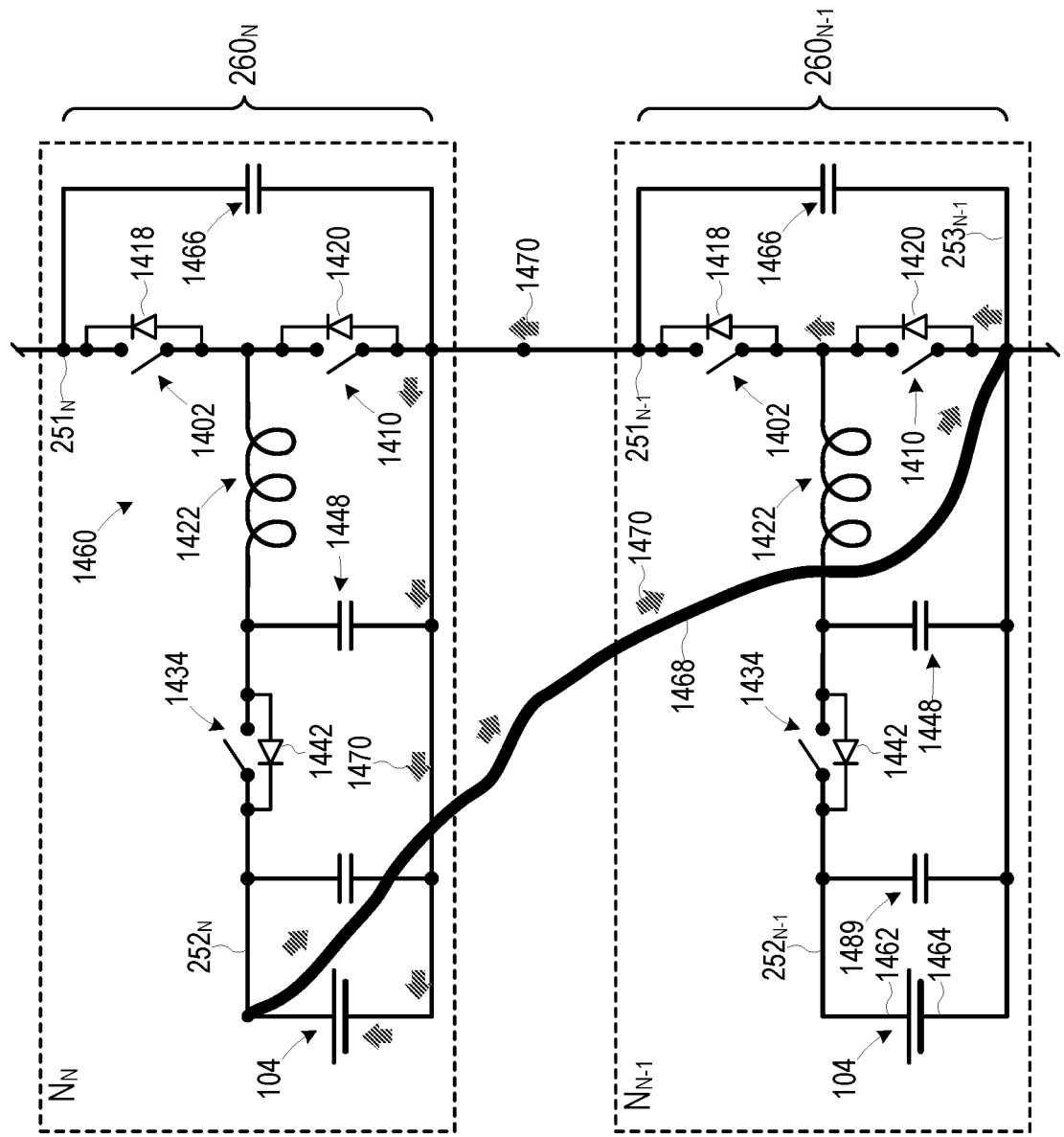
FIG. 14B is an illustrative circuit diagram showing short circuit current flow between the nodes of the stack of FIG. 14A during a short circuit failure from reverse voltage in a disconnect state.

FIG. 14A is an illustrative circuit diagram showing portions of an example series-connected nodes $N_N$ and $N_{N-1}$ of a stack that lacks reverse voltage failure mode protection in a disconnect state. In a floating disconnect state, all switches are turned off (open). FIG. 14B is an illustrative circuit diagram showing short circuit current flow between the nodes $N_N$ and $N_{N-1}$ of the stack of FIG. 14A during a reverse voltage short circuit failure in a floating disconnect state. In other words, FIG. 14B illustrates that a reverse voltage (a short from the positive terminal of one battery to the negative terminal of the node below) is unprotected, despite isolation switch 1434 being open. The unprotected reverse voltage causes a cell short through the body diodes 1420 and 1418 of switches 1410 and 1402 with large current which is likely to cause thermal runaway and lead to fire.

Each node N includes a battery 104 with a positive terminal 1462 and a negative terminal 1464, a capacitor 1489, a capacitor 1448, a capacitor 1466, an inductor 1422, a first switch 1402 including a body diode 1418, a second switch 1410 including a body diode 1420, and a third switch 1434 including a body diode 1434. Some instances of these elements are not labeled for illustrative clarity. First switch 1402, second switch 1410, and inductor 1422 form a core of a DC-DC converter 1460 including an output port 260 configured for electrically coupling in series with additional nodes N. The third switch 1434 is electrically coupled between the positive terminal 1462 of the battery 104 and the DC-DC converter 1460, and it is configured to selectably connect and disconnect the battery 1434 from the DC-DC converter 1460. In some alternate embodiments, the third switch 1434 is instead electrically coupled between the negative terminal 1464 of the battery 104 and the DC-DC converter 1460. In some embodiments, the processor circuitry 217-2 controls the switches of each node, optionally with assistance of the stack controller 210 and/or the host controller 212.

Referring to FIG. 14A, during normal operation, each battery 104 provides a voltage, for example, of VBAT=~3.6V. When in a disconnect state, each of the first switch 1402, the second switch 1410, and the third switch 1434 are turned off (open). In an example stack, node $N_{N-1}$ can fail if a negative voltage in a range −1V is applied across the node's output, between the respective nodes positive and negative output terminals $251_{N-1}$ and $253_{N-1}$. The critical node voltage is given by the sum of the two body diodes 1418, 1420 forward voltages (2X~0.5V). If the critical node voltage is reached at node $N_{N-1}$, then a large current can flow through the two body diodes 1418 and 1420 and eventually cause permanent damage to example node $N_{N-1}$ and/or node $N_N$. For example, the battery 104 of node $N_N$ discharges quickly, which can result in thermal run away.

Referring to FIG. 14B, during an example failure mode, the positive battery device terminal $252_N$ of node $N_N$ is shorted to the negative power terminal $253_{N-1}$ of node $N_{N-1}$. A negative voltage across diodes 1418, 1420 becomes equivalent to voltage of the battery 104, e.g. about 3.6V. The first and second body diodes 1418, 1420 are forward biased and an uncontrolled current can flow through them. An aberrant electrical connection 1468 results in a short circuit current 1470 that flows from the positive battery device terminal $252_N$ of node $N_N$ to the negative power terminal $253_{N-1}$ of node $N_{N-1}$, through diodes 1418 and 1420. The aberrant electrical connection 1468 can be caused by a short circuit, such as a loose wire fragment that shorts the two, for example. The battery 104 of node $N_N$ feeds current and power to the short. If the short is applied for a long enough time, on the order of seconds, then it can cause catastrophic failure such as fire. In alternate embodiments where the third switch 1434 is electrically coupled between the negative terminal 1464 of the battery 104 and the DC-DC converter 1460, a short circuit current can flow between nodes $N_N$ and $N_{N-1}$ if the positive battery device terminal 252$_N$ is shorted to the negative terminal 1464 of the battery of node NN-1, even if each of the first switch 1402, the second switch 1410, and the third switch 1434 are turned off (open).

Figure 14C:
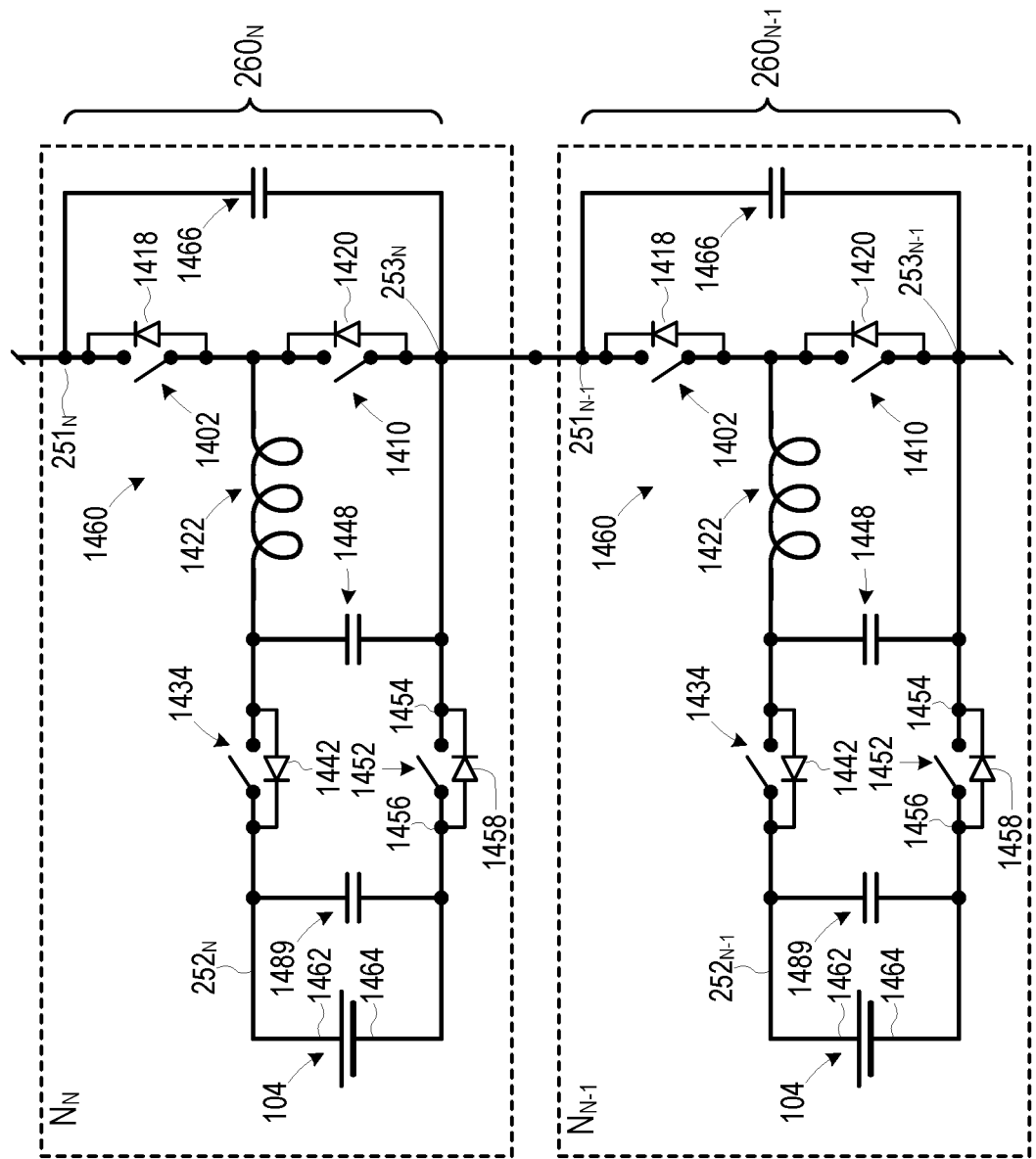
FIG. 14C is an illustrative circuit diagram showing portions of two series-connected example nodes of a stack, which include first example reverse voltage failure mode protection circuitry in a disconnect state during failure mode operation.
Figure 14D:
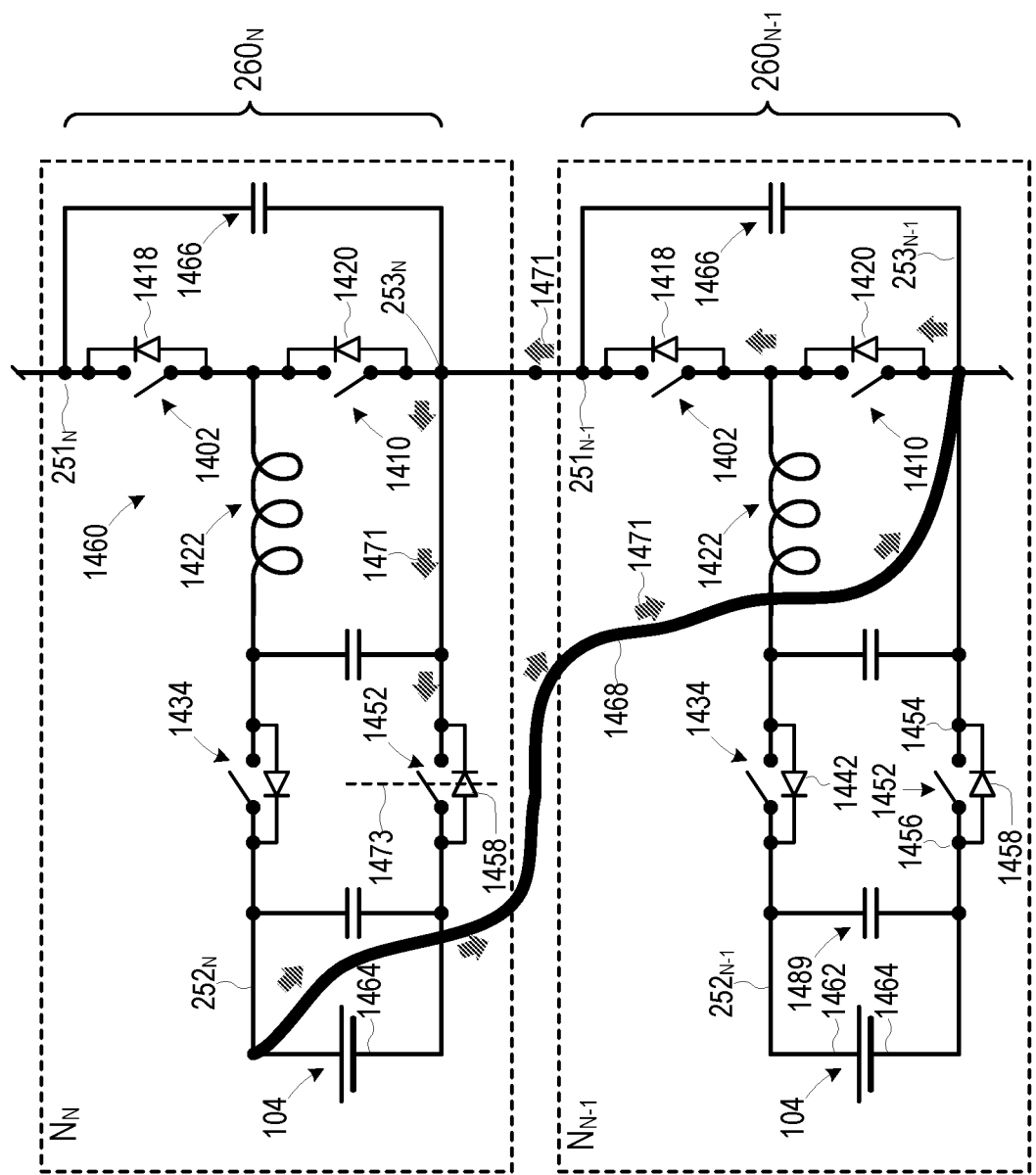
FIG. 14D is an illustrative circuit diagram showing blocked short circuit flow between the nodes of the stack of FIG. 14C during a short circuit failure from reverse voltage in a disconnect state.

FIG. 14C is an illustrative circuit diagram showing portions of an example series-connected nodes $N_N$ and $N_{N-1}$ of a BMS stack, which include first example reverse voltage failure mode protection circuitry in the form of an isolation switch 1452 including a body diode 1458, in a disconnect state during failure mode operation. FIG. 14D is an illustrative circuit diagram showing blocked short circuit flow between the nodes of the stack of FIG. 14C during a short circuit failure from reverse voltage in a disconnect state. For efficiency of description, circuit components shown in FIGS. 14C-14D that correspond to circuit components described in FIGS. 14A-14B will not be explained again.

Referring to FIG. 14C, example node $N_{N-1}$ includes an isolation switch 1452 that includes a first terminal 1454 and a second terminal 1456. The first terminal 1454 of the isolation switch 1452 is coupled to the second switch 1410. The second terminal 1456 of the isolation switch 1452 is coupled to the negative power terminal 1464 of battery 104 of node $N_{N-1}$. Thus, the isolation switch 1452 is coupled in series with the negative power terminal 1464 of battery 104 of node $N_{N-1}$. An advantage of this series arrangement is that a ground-referenced gate drive yields ease of implementation for an n-channel type switch; the switch can also be low voltage with a voltage rating a small margin above the voltage of the battery. The isolation switch 1452 is oriented such that its body diode 1458 does not provide a path for short circuit current 1471. Specifically, the anode of the body diode 1458 is connected to the negative terminal 1464 of the battery 104, and the cathode of the body diode 1458 is connected to the DC-DC converter 1460. Alternately, the isolation switch 1452 could be replaced with a switching device that does not include a body diode. Similarly, example node $N_N$ (and each of the other nodes of the BMS stack) includes an isolation switch 1452 and an associated body diode 1458 that are similarly coupled.

Referring to FIG. 14D, during an example failure mode, the positive power bus terminal 252$_N$ of example node $N_N$ has an aberrant electrical connection 1468 with the negative power terminal 253$_{N-1}$ of node $N_{N-1}$. The aberrant connection 1468 creates a risk of aberrant current flow 1471 from the positive battery device terminal 252$_N$ of node $N_N$ through diodes 1418 and 1420 to the negative power terminal 253$_{N-1}$ of node $N_{N-1}$. However, as represented by dashed line 1473, the open isolation switch 1452 prevents a short circuit current from flowing from the positive power terminal 252$_N$ of battery 104 of node $N_N$ to the negative power terminal 253$_{N-1}$ of node $N_{N-1}$. Thus, battery 104 of node $N_N$ cannot feed the short circuit and the stack is protected. Isolation switches 1452 are closed during normal charging/discharging operation.

Figure 14E:
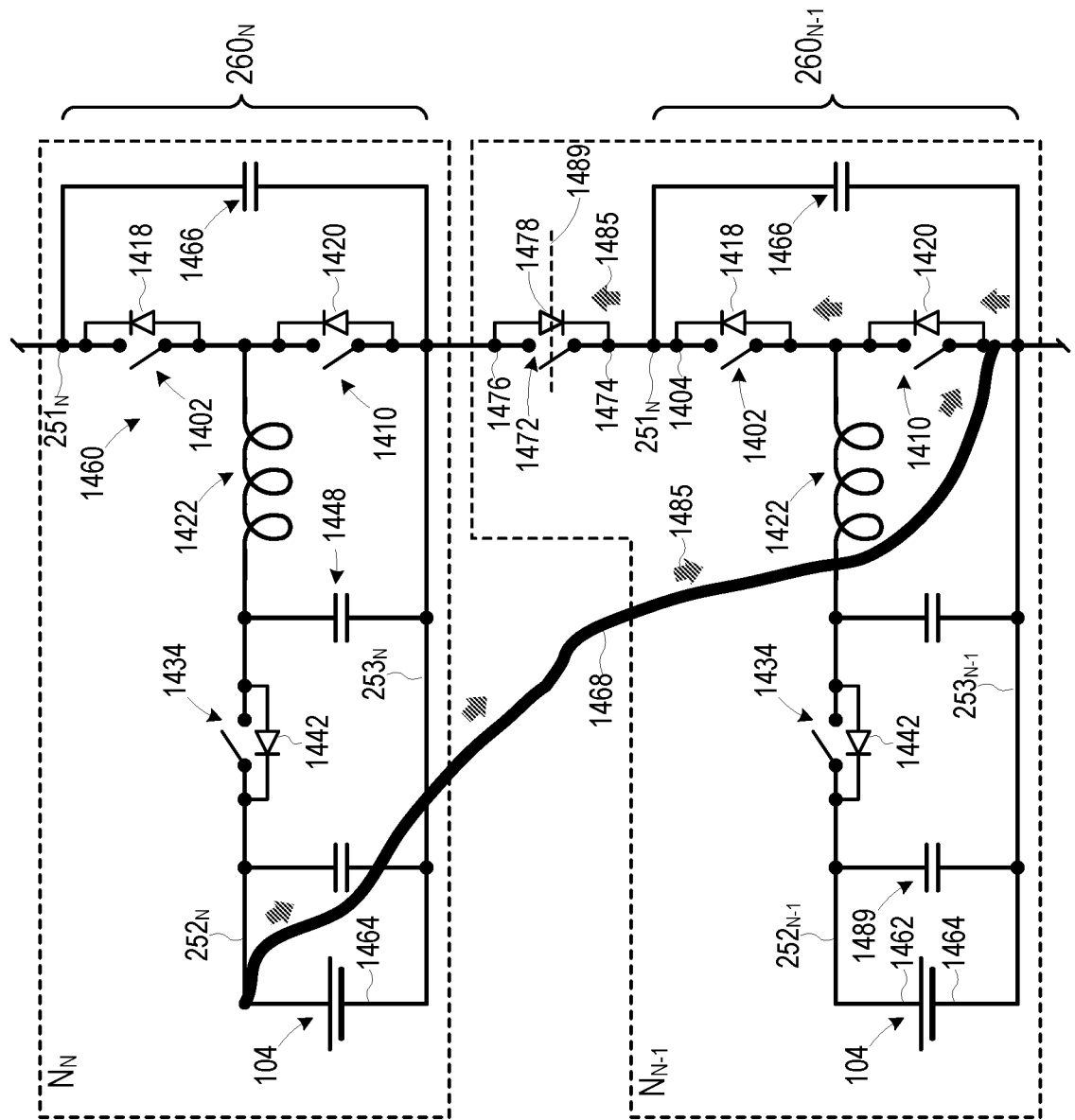
FIG. 14E is an illustrative circuit diagram showing portions of two series-connected example nodes of an example stack, which include second example reverse voltage failure mode protection circuitry in a disconnect state during failure mode operation.

Isolation switch 1452 can be replaced with one or more alternative isolation switches which also prevent the flow of electric current through the battery 104 of node $N_N$ in event of a short circuit with node $N_{N-1}$. For example, FIG. 14E is an illustrative circuit diagram showing portions of an example series-connected nodes $N_N$ and $N_{N-1}$ of a BMS stack, which include second example reverse voltage failure mode protection circuitry in the form of an isolation switch 1472 including a body diode 1478, in a disconnect state during failure mode operation. For efficiency of description, circuit components shown in FIG. 14E that correspond to circuit components described in FIGS. 14A-14D will not be explained again. Example node $N_{N-1}$ includes the isolation switch 1472 with a first terminal 1474 and a second terminal 1476. The first terminal 1474 of the isolation switch 1472 is coupled to a first terminal 1404 of a first switch 1402 of node $N_{N-1}$. The second terminal 1476 of the isolation switch 1472 is coupled to the negative power terminal 253$_N$ of node $N_N$. The isolation switch 1472 is oriented such that its body diode 1478 does not provide a path for short circuit current 1485. Specifically, the cathode of the body diode 1478 is connected to the positive terminal 251$_{N-1}$ of the output port 260$_{N-1}$. Alternately, the isolation switch 1472 could be replaced with a switching device that does not include a body diode.

During normal node operation, battery 104 current does not continuously flow through the isolation switch 1472; instead current flows through the isolation switch 1472 only when switch 1410 is in its off or non-conductive state. Consequently, the root mean square (RMS) value of current flowing though the isolation switch 1472 will be less than the RMS value of current flowing through the isolation switch 1452 of FIG. 14D, assuming equivalent operating conditions. Therefore, the isolation switch 1472 of FIG. 14E can have a larger on-resistance than the isolation switch 1452 of FIG. 14D for the same switch conduction losses. In some embodiments, the isolation switch 1472 is either a n-channel field effect transistor or a p-channel field effect transistor, depending on gate driver circuitry design.

Still referring to FIG. 14E, in an example failure mode, the positive bus terminal 252$_N$ of example node $N_N$ has an aberrant electrical contact 1468 with the negative power terminal 253$_{N-1}$ of node $N_{N-1}$. The aberrant connection 1468 creates a risk of aberrant current flow 1485 from the positive battery device terminal 252$_N$ of node $N_N$ through diodes 1418 and 1420 to the negative power terminal 253$_{N-1}$ of node $N_{N-1}$. However, as represented by dashed line 1489, the open switch 1472 prevents potential 1485 current from flowing from the positive battery terminal 252$_N$ of battery 104 of node $N_N$ to the negative power terminal 253$_{N-1}$ of node $N_{N-1}$. Thus, battery 104 of node $N_N$ cannot feed the short circuit. Node $N_N$ optionally further includes an isolation switch 1472 (not shown) analogous to that of node $N_{N-1}$.

Figure 14F:
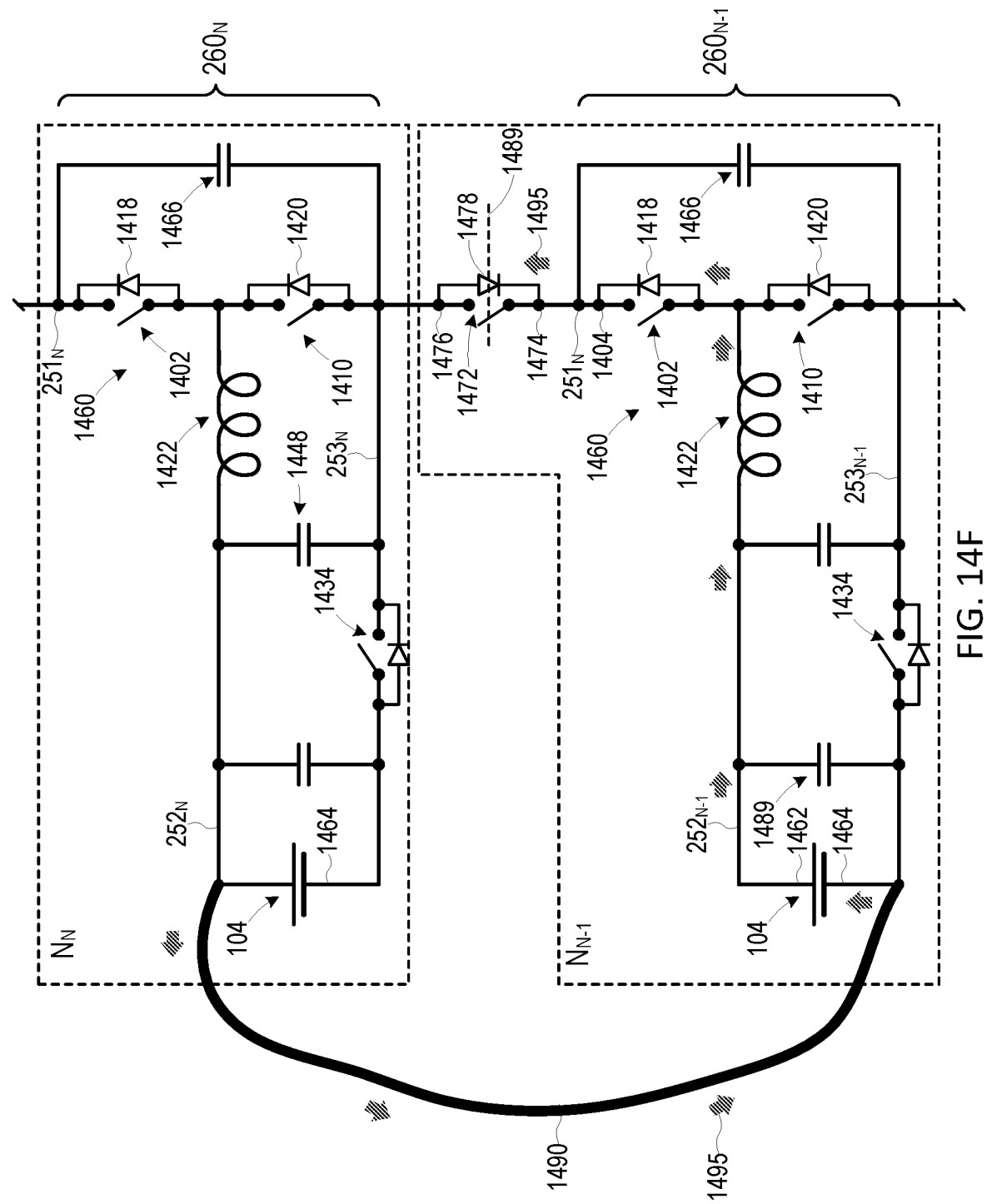
FIG. 14F is an illustrative circuit diagram showing portions of two series-connected example nodes of another example stack, which include second example reverse voltage failure mode protection circuitry in a disconnect state during failure mode operation.

The isolation switch 1472 also prevents short circuit current flow in embodiments where the third switch 1434 is electrically coupled between the negative terminal 1464 of the battery 104 and the DC-DC converter 1460, instead of between the positive terminal 1462 of the battery 104 and the DC-DC converter 1460. For example, FIG. 14F is an illustrative circuit diagram showing portions of an example series-connected nodes $N_N$ and $N_{N-1}$ of a BMS stack, which include second example reverse voltage failure mode protection circuitry in the form of the isolation switch 1472, in a disconnect state during failure mode operation. For efficiency of description, circuit components shown in FIG. 14F that correspond to circuit components described in FIGS. 14A-14E will not be explained again. The third switch 1434 is electrically coupled between the negative terminal 1464 of the battery 104 and the DC-DC converter 1460 in this example.

In an example failure mode, the positive bus terminal 252$_N$ of example node $N_N$ has an aberrant electrical contact 1490 with the negative terminal 1464 of the battery 104 of node $N_{N-1}$. The aberrant connection 1490 creates a risk of aberrant current flow 1495 from the positive battery device terminal 252$_N$ of node $N_N$ through the diode 1418 of node $N_{N-1}$ and the diode 1420 of node $N_N$. However, as represented by dashed line 1489, the open switch 1472 prevents potential current 1495 from flowing.

It will be appreciated by those skilled in the art that variations can be made to the exemplary energy storage systems, battery management system nodes, and associated methods, without departing from the spirit and scope of the present disclosure. For example, based on principles of duality of electrical circuits, variations of the exemplary DC-DC converters can be made by appropriate substitution of inductors for capacitors (and vice versa), currents for voltages, and series for parallel configurations while still achieving the desired functionality, and such variations are considered to be within the scope of the present disclosure in light of the teachings presented herein. For example, DC-DC converter 1100 of FIG. 11 could be modified such that the DC-DC converter operates as a boost converter during charging of battery 104 and the DC-DC converter acts a buck converter during discharging of battery 104. As another example, DC-DC converter 1100 could be replaced with a buck-boost converter to enable both step-up and step-down transformation of battery voltage to node voltage.

The above description is presented to enable any person skilled in the art to create and use safe battery energy management systems, safe battery management system nodes, and associated methods. Various modifications to the embodiments will be readily apparent to those skilled in the art, and the generic principles defined herein may be applied to other embodiments and applications without departing from the spirit and scope of the invention. In the preceding description, numerous details are set forth for the purpose of explanation. However, one of ordinary skill in the art will realize that the embodiments in the disclosure might be practiced without the use of these specific details. In other instances, well-known processes are shown in block diagram form in order not to obscure the description of the invention with unnecessary detail. Identical reference numerals may be used to represent different views of the same or similar item in different drawings. Thus, the foregoing description and drawings of examples in accordance with the present invention are merely illustrative of the principles of the invention. Therefore, it will be understood that various modifications can be made to the embodiments by those skilled in the art without departing from the spirit and scope of the invention, which is defined in the appended claims.

What is claimed is:

1. A method for addressing an arc fault in an energy storage system including a stack of a plurality of battery management system nodes that are electrically coupled together, the method comprising:
    determining that an arc fault has occurred in the stack, the arc fault being a flow of electrical current between electrical conductors of the stack that are at different electrical potentials, the arc fault being due to ionization of gas between the electrical conductors of the stack that are at different electrical potentials;
    in response to determining that the arc fault has occurred in the stack, electrically isolating a respective battery of each battery management system node at least partially by opening a respective isolation switch electrically coupled to the battery; and
    causing the stack to operate in a floating mode by causing a respective node output shorting switch electrically coupled across an output port of each battery management system node to operate in its off state, in response to determining that the arc fault has occurred in the stack.

2. The method of claim 1, wherein the gas between the electrical conductors of the stack that are at different electrical potentials comprises air.

3. A method for addressing an arc fault in an energy storage system including a stack of a plurality of battery management system nodes that are electrically coupled together, the method comprising:
    determining that an arc fault has occurred in the stack, the arc fault being a flow of electrical current between electrical conductors of the stack that are at different electrical potentials, the arc fault being due to ionization of gas between the electrical conductors of the stack that are at different electrical potentials; and
    in response to determining that the arc fault has occurred in the stack, electrically isolating a respective battery of each battery management system node at least partially by opening a respective isolation switch electrically coupled to the battery;
    wherein the arc fault in the stack is a series arc fault in the stack, and the method further comprises:
        obtaining electrical measurement values for the stack, and
        determining that the series arc fault has occurred in the stack in response to a mismatch between a sum of voltages across each battery management system node of the stack and a measured voltage across the stack.

4. The method of claim 3, further comprising:
    sending a measurement command to each battery management system node; and
    at each battery management system node, in response to the measurement command, obtaining a respective subset of the electrical measurement values for the stack, each subset of the electrical measurement values for the stack corresponding to a time prescribed by the measurement command.

5. The method of claim 4, further comprising propagating electrical measurement values for a first node of the plurality of battery management system nodes through at least one other node of the plurality of battery management system nodes.

6. The method of claim 3, further comprising removing power conversion switching noise and associated harmonics from the electrical measurement values for the stack, before determining that the series arc fault has occurred in the stack.

7. The method of claim 3, wherein the gas between the electrical conductors of the stack that are at different electrical potentials comprises air.

8. A method for addressing an arc fault in an energy storage system including a stack of a plurality of battery management system nodes that are electrically coupled together, the method comprising:
    determining that an arc fault has occurred in the stack, the arc fault being a flow of electrical current between electrical conductors of the stack that are at different electrical potentials, the arc fault being due to ionization of gas between the electrical conductors of the stack that are at different electrical potentials; and
    in response to determining that the arc fault has occurred in the stack, electrically isolating a respective battery of each battery management system node at least partially by opening a respective isolation switch electrically coupled to the battery;
    wherein the arc fault in the stack is a parallel arc fault in the stack, and the method further comprises:

obtaining electrical measurement values for the stack, and determining that the parallel electrical arc fault has occurred in the stack in response to a mismatch between respective currents flowing through two battery management system nodes of the stack.

9. The method of claim 8, further comprising:

sending a measurement command to each battery management system node; and at each battery management system node, in response to the measurement command, obtaining a respective subset of the electrical measurement values for the stack, each subset of the electrical measurement values for the stack corresponding to a time prescribed by the measurement command.

10. The method of claim 9, further comprising propagating electrical measurement values for a first node of the plurality of battery management system nodes through at least one other node of the plurality of battery management system nodes.

11. The method of claim 8, further comprising removing power conversion switching noise and associated harmonics from the electrical measurement values for the stack, before determining that the parallel arc fault has occurred in the stack.

12. The method of claim 8, wherein the gas between the electrical conductors of the stack that are at different electrical potentials comprises air.

13. A method for addressing an arc fault in an energy storage system including a stack of a plurality of battery management system nodes that are electrically coupled together, the method comprising:

determining that an arc fault has occurred in the stack, the arc fault being a flow of electrical current between electrical conductors of the stack that are at different electrical potentials, the arc fault being due to ionization of gas between the electrical conductors of the stack that are at different electrical potentials;

in response to determining that the arc fault has occurred in the stack, electrically isolating a respective battery of each battery management system node at least partially by opening a respective isolation switch electrically coupled to the battery; and performing a controlled discharge of each battery within its respective battery management system node, in response to determining that the arc fault has occurred in the stack.

14. The method of claim 13, wherein the gas between the electrical conductors of the stack that are at different electrical potentials comprises air.

* * * * *